United States Patent
Momma et al.

(10) Patent No.: US 12,244,007 B2
(45) Date of Patent: Mar. 4, 2025

(54) POSITIVE ELECTRODE ACTIVE MATERIAL, SECONDARY BATTERY, AND ELECTRONIC DEVICE

(71) Applicant: SEMICONDUCTOR ENERGY LABORATORY CO., LTD., Atsugi (JP)

(72) Inventors: Yohei Momma, Kanagawa (JP); Hiroshi Kadoma, Kanagawa (JP); Yoshihiro Komatsu, Kanagawa (JP); Shiori Saga, Kanagawa (JP); Shunpei Yamazaki, Tokyo (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

(21) Appl. No.: 18/608,249

(22) Filed: Mar. 18, 2024

(65) Prior Publication Data
US 2024/0266515 A1 Aug. 8, 2024

Related U.S. Application Data

(63) Continuation of application No. 16/952,189, filed on Nov. 19, 2020, now Pat. No. 11,936,036.

(30) Foreign Application Priority Data

Nov. 28, 2019 (JP) .................. 2019-215105
Dec. 10, 2019 (JP) .................. 2019-222975

(51) Int. Cl.
*H01M 4/36* (2006.01)
*H01M 4/485* (2010.01)
(Continued)

(52) U.S. Cl.
CPC .......... *H01M 4/366* (2013.01); *H01M 4/485* (2013.01); *H01M 4/525* (2013.01); *H01M 4/582* (2013.01);
(Continued)

(58) Field of Classification Search
CPC ...... H01M 4/366; H01M 4/525; H01M 4/485; H01M 4/134; H01M 4/50; H01M 4/32;
(Continued)

(56) References Cited

U.S. PATENT DOCUMENTS 6,040,087 A 3/2000 Kawakami
11,799,080 B2 10/2023 Mikami et al.
(Continued)

FOREIGN PATENT DOCUMENTS

CN 102610806 A 7/2012
CN 105655554 A 6/2016
(Continued)

OTHER PUBLICATIONS

Chen.Z et al., "Staging Phase Transitions in LixCoO2", J. Electrochem. Soc. (Journal of the Electrochemical Society), 2002, vol. 149, No. 12, pp. A1604-A1609.
(Continued)

*Primary Examiner* — Jeremiah R Smith
(74) *Attorney, Agent, or Firm* — Fish & Richardson P.C.

(57) ABSTRACT

A positive electrode active material in which a capacity decrease caused by charge and discharge cycles is suppressed is provided. Alternatively, a positive electrode active material having a crystal structure that is unlikely to be broken by repeated charging and discharging is provided. The positive electrode active material contains titanium, nickel, aluminum, magnesium, and fluorine, and includes a region where titanium is unevenly distributed, a region where nickel is unevenly distributed, and a region where magnesium is unevenly distributed in a projection on its surface. Aluminum is preferably unevenly distributed in a surface portion, not in the projection, of the positive electrode active material.

13 Claims, 53 Drawing Sheets

(51) Int. Cl.
*H01M 4/525* (2010.01)
*H01M 4/58* (2010.01)
*H01M 10/0525* (2010.01)
*H01M 4/02* (2006.01)

(52) U.S. Cl.
CPC .. *H01M 10/0525* (2013.01); *H01M 2004/028* (2013.01)

(58) Field of Classification Search
CPC .. H01M 4/582; H01M 10/0525; C01G 53/04; C01G 51/04
See application file for complete search history.

(56) References Cited

U.S. PATENT DOCUMENTS

| | | |
|---|---|---|
| 2002/0110736 A1 | 8/2002 | Kweon et al. |
| 2003/0104279 A1 | 6/2003 | Miyazaki et al. |
| 2004/0142241 A1 | 7/2004 | Nagayama |
| 2006/0263690 A1 | 11/2006 | Suhara et al. |
| 2007/0117014 A1 | 5/2007 | Saito et al. |
| 2008/0241693 A1 | 10/2008 | Fukuchi et al. |
| 2009/0087362 A1 | 4/2009 | Sun et al. |
| 2009/0104532 A1 | 4/2009 | Hosoya |
| 2010/0086854 A1 | 4/2010 | Kumar et al. |
| 2010/0247986 A1 | 9/2010 | Toyama et al. |
| 2013/0052534 A1 | 2/2013 | Fujiki et al. |
| 2013/0323596 A1 | 12/2013 | Morita et al. |
| 2015/0325855 A1 | 11/2015 | Kawakami et al. |
| 2016/0013478 A1 | 1/2016 | Satow et al. |
| 2016/0276659 A1 | 9/2016 | Choi et al. |
| 2018/0013130 A1 | 1/2018 | Ochiai et al. |
| 2018/0145317 A1 | 5/2018 | Momma et al. |
| 2018/0145368 A1 | 5/2018 | Ochiai et al. |
| 2020/0152961 A1 | 5/2020 | Momma et al. |
| 2020/0176770 A1 | 6/2020 | Takahashi et al. |
| 2021/0005887 A1 | 1/2021 | Horikawa et al. |
| 2021/0083281 A1 | 3/2021 | Mikami et al. |
| 2022/0255076 A1 | 8/2022 | Mikami et al. |
| 2022/0285681 A1 | 9/2022 | Mikami et al. |

FOREIGN PATENT DOCUMENTS

| | | |
|---|---|---|
| JP | 2000-203842 A | 7/2000 |
| JP | 2002-216760 A | 8/2002 |
| JP | 2010-080407 A | 4/2010 |
| JP | 2014-523840 | 9/2014 |
| JP | 2015-099722 A | 5/2015 |
| JP | 2016-149270 A | 8/2016 |
| JP | 2018-508116 | 3/2018 |
| JP | 2018-190700 A | 11/2018 |
| JP | 2018-195581 A | 12/2018 |
| JP | 2018-206747 A | 12/2018 |
| WO | WO-2018/203168 | 11/2018 |
| WO | WO-2018/211375 | 11/2018 |

OTHER PUBLICATIONS

Motohashi.T et al., "Electronic phase diagram of the layered cobalt oxide system LixCoO2 ($0.0 \leq x \leq 1.0$)", Phys. Rev. B (Physical Review. B), Oct. 9, 2009, vol. 80, No. 16, pp. 165114-1-165114-9.

Okumura. T et al., "Correlation of lithium ion distribution and X-ray absorption near-edge structure in O3- and O2-lithium cobalt oxides from first-principle calculation", J. Mater. Chem. (Journal of Materials Chemistry), 2012, vol. 22, pp. 17340-17348.

Counts.W et al., "Fluoride Model Systems: II, The Binary Systems CaF2—BeF2, MgF2—BeF2, and LiF—MgF2", J. Am. Ceram. Soc. (Journal of the American Ceramic Society), 1953, vol. 36, No. 1, pp. 12-17.

Belsky.A et al., "New developments in the Inorganic Crystal Structure Database (ICSD): Accessibility in support of materials research and design.", Acta. Cryst.(Acta Crystallographica Section B), Jun. 1, 2002, vol. B58, No. 3, pp. 364-369.

Matsubayashi.D et al., "20-nm-node trench-gate-self-aligned crystalline In—Ga—Zn-Oxide FET with high frequency and low off-state current", IEDM 15: Technical Digest of International Electron Devices Meeting, Dec. 7, 2015, pp. 141-144.

101

FIG. 34A
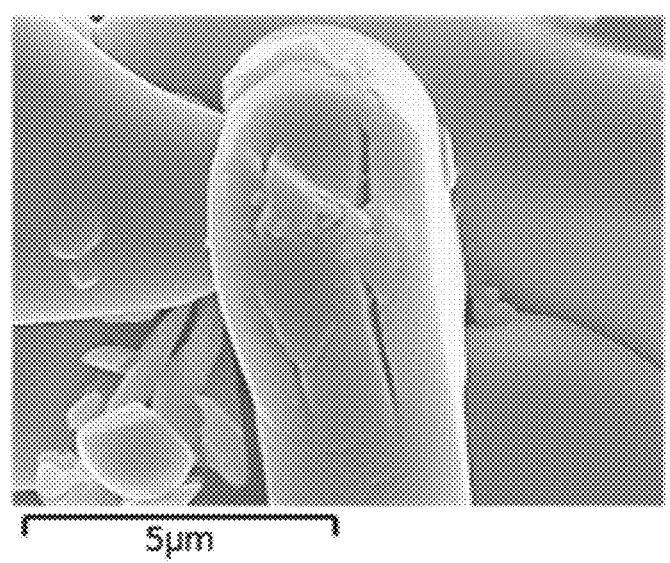
FIG. 34B
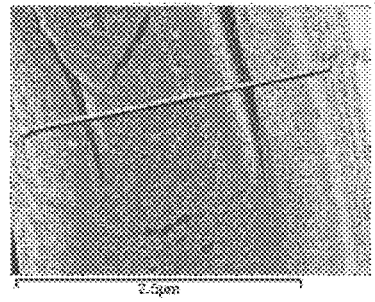
FIG. 34C
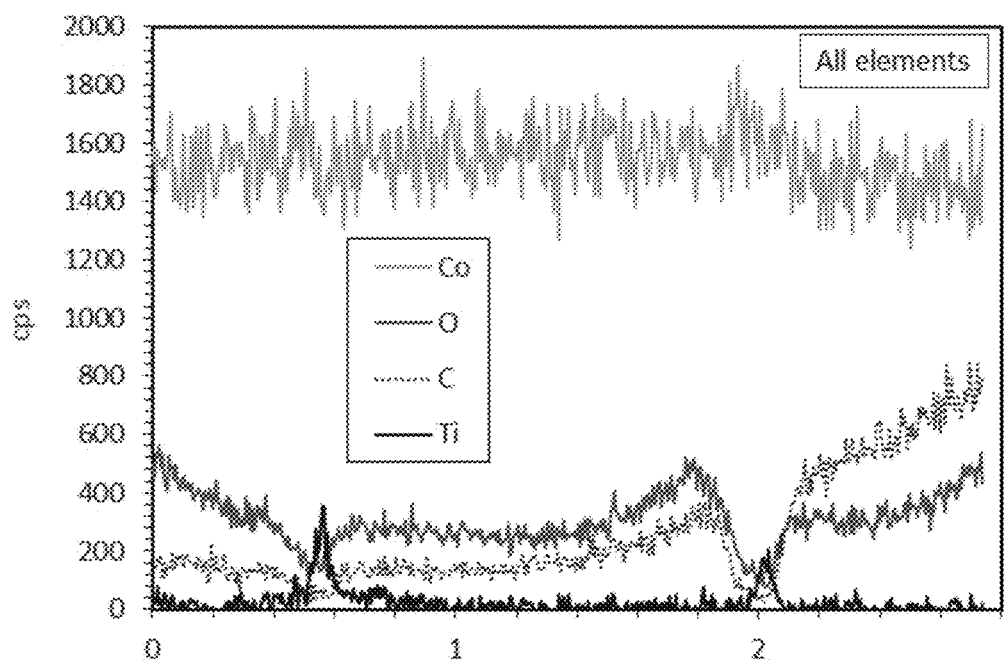
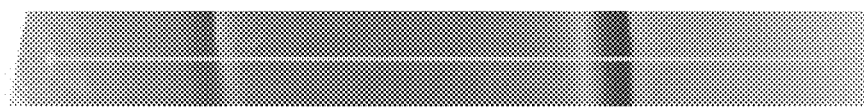

FIG. 47A
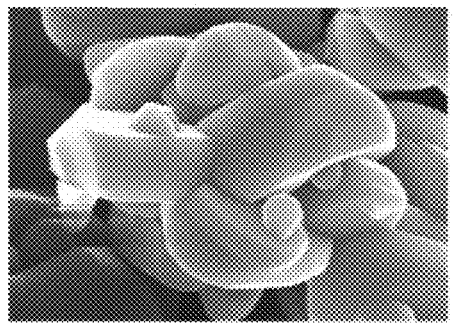
FIG. 47B Ni K series
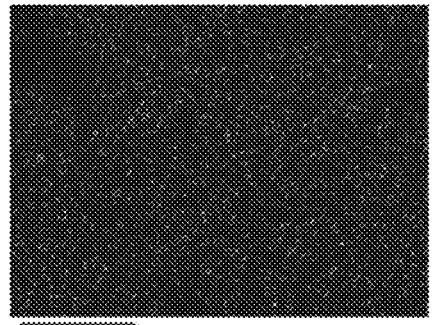
FIG. 47C Co K series
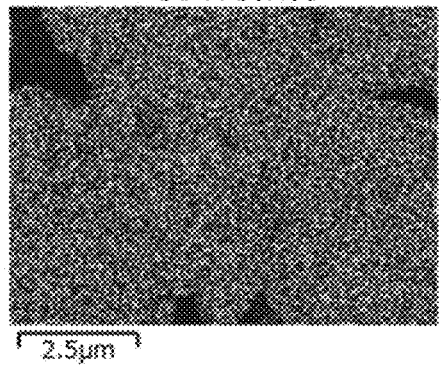
FIG. 47D Ti K series
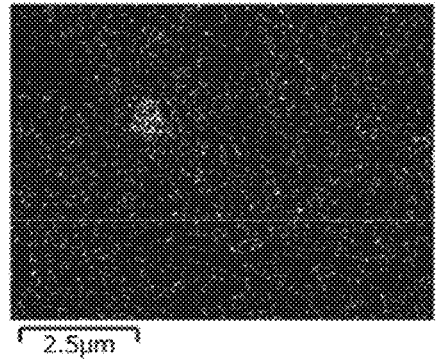
FIG. 47E O K series
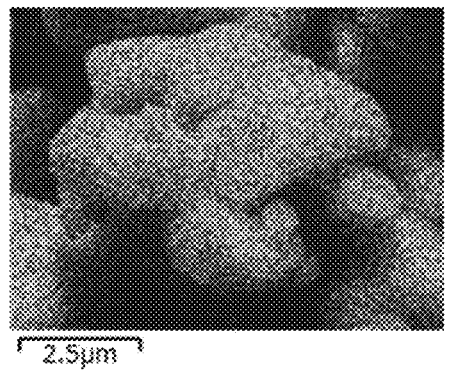
FIG. 47F Mg K series
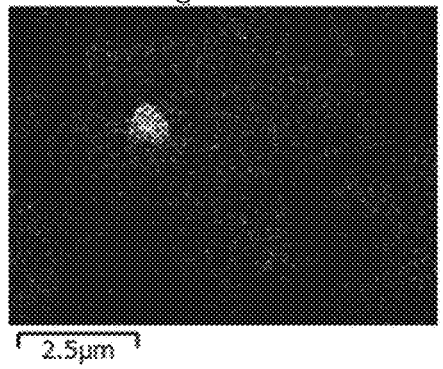
FIG. 47G C K series
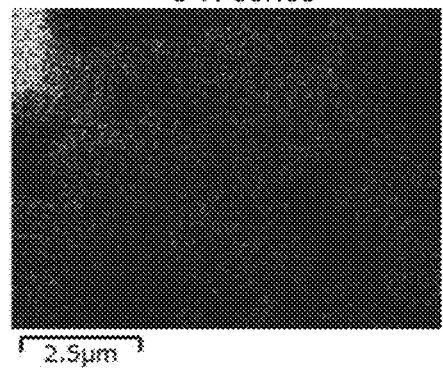
FIG. 47H Al K series
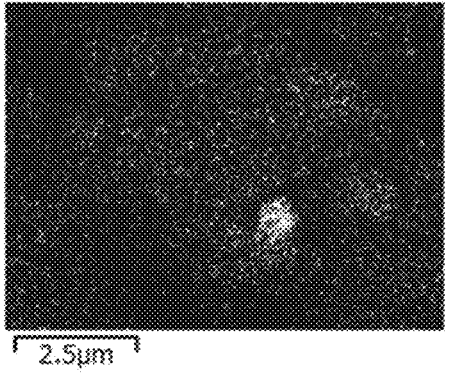

POSITIVE ELECTRODE ACTIVE MATERIAL, SECONDARY BATTERY, AND ELECTRONIC DEVICE

CROSS-REFERENCE TO RELATED APPLICATIONS

This application is a continuation of U.S. application Ser. No. 16/952,189, filed Nov. 19, 2020, now allowed, which claims the benefit of foreign priority applications filed in Japan as Serial No. 2019-222975 on Dec. 10, 2019, and as Serial No. 2019-215105 on Nov. 28, 2019, all of which are incorporated by reference.

BACKGROUND OF THE INVENTION

1. Field of the Invention

One embodiment of the present invention relates to an object, a method, or a manufacturing method. The present invention relates to a process, a machine, manufacture, or a composition of matter. One embodiment of the present invention relates to a semiconductor device, a display device, a light-emitting device, a power storage device, a lighting device, an electronic device, or a manufacturing method thereof.

Note that electronic devices in this specification mean all devices including power storage devices, and electro-optical devices including power storage devices, information terminal devices including power storage devices, and the like are all electronic devices.

2. Description of the Related Art

In recent years, a variety of power storage devices such as lithium-ion secondary batteries, lithium-ion capacitors, air batteries, and all-solid-state batteries have been actively developed. In particular, demand for lithium-ion secondary batteries with high output and high capacity has rapidly grown with the development of the semiconductor industry. The lithium-ion secondary batteries are essential as rechargeable energy supply sources for today's information society.

In particular, secondary batteries for mobile electronic devices, for example, are highly demanded to have high discharge capacity per weight and excellent cycling performance. In order to meet such demands, positive electrode active materials in positive electrodes of secondary batteries have been actively improved (e.g., Patent Documents 1 and 2). Crystal structures of positive electrode active materials have also been studied (Non-Patent Documents 1 to 4).

X-ray diffraction (XRD) is one of methods used for analysis of a crystal structure of a positive electrode active material. With the use of the Inorganic Crystal Structure Database (ICSD) described in Non-Patent Document 5, XRD data can be analyzed.

REFERENCES

Patent Documents

[Patent Document 1] Japanese Published Patent Application No. 2018-190700
[Patent Document 2] Japanese Translation of PCT International Application No. 2018-508116

Non-Patent Documents

[Non-Patent Document 1] Toyoki Okumura et al., "Correlation of lithium ion distribution and X-ray absorption near-edge structure in O3- and O2-lithium cobalt oxides from first-principle calculation", *Journal of Materials Chemistry*, 22, 2012, pp. 17340-17348.
[Non-Patent Document 2] T. Motohashi, et al., "Electronic phase diagram of the layered cobalt oxide system $Li_xCoO_2$ (0.0≤x≤1.0)", *Physical Review B*, 80 (16); 165114.
[Non-Patent Document 3] Zhaohui Chen et al., "Staging Phase Transitions in $Li_xCoO_2$", *Journal of The Electrochemical Society*, 149 (12), 2002, A1604-A1609.
[Non-Patent Document 4] W. E. Counts, et al., "Fluoride Model Systems: II, The Binary Systems $CaF_2$—$BeF_2$2, $MgF_2$—$BeF_2$, and LiF—$MgF_2$", *Journal of the American Ceramic Society*, (1953), 36 [1], 12-17. FIG. 01471.
[Non-Patent Document 5] Belsky, A. et al., "New developments in the Inorganic Crystal Structure Database (ICSD): accessibility in support of materials research and design", *Acta Cryst.*, (2002), B58, 364-369.

SUMMARY OF THE INVENTION

However, development of lithium-ion secondary batteries and positive electrode active materials used therein has room for improvement in terms of charge and discharge capacity, cycling performance, reliability, safety, cost, and the like.

An object of one embodiment of the present invention is to provide a positive electrode active material in which a capacity decrease due to charge and discharge cycles is suppressed when used in a lithium-ion secondary battery. Another object is to provide a positive electrode active material having a crystal structure that is unlikely to be broken by repeated charging and discharging. Another object is to provide a positive electrode active material with high charge and discharge capacity. Another object is to provide a highly safe or highly reliable secondary battery.

Another object of one embodiment of the present invention is to provide a positive electrode active material, a power storage device, or a manufacturing method thereof.

Note that the description of these objects does not preclude the existence of other objects. In one embodiment of the present invention, there is no need to achieve all these objects. Other objects can be derived from the description of the specification, the drawings, and the claims.

One embodiment of the present invention is a positive electrode active material that contains titanium and includes a depression at a surface of the positive electrode active material, and titanium exists on (in) part of an inner wall of the depression.

In the above, the depression has a depth of 100 nm or more and a width of 20 nm or more.

Another embodiment of the present invention is a positive electrode active material that contains titanium and magnesium, and includes a region where magnesium is unevenly distributed and a region where titanium is unevenly distributed.

In the above, the region where magnesium is unevenly distributed and the region where titanium is unevenly distributed preferably exist on a surface of the positive electrode active material.

In the above, it is preferable that the positive electrode active material further contain cobalt and oxygen, and cobalt and oxygen exist uniformly.

In the above, the positive electrode active material preferably further contains lithium.

In the above, the positive electrode active material preferably includes a region where magnesium is uniformly distributed and a region where titanium is uniformly distributed.

In the above, the region where magnesium is uniformly distributed and the region where titanium is uniformly distributed are preferably projections on a surface of the positive electrode active material.

In the above, the projection preferably has a portion with a height of 50 nm or more.

In the above, it is preferable that the positive electrode active material further contain nickel and include a region where nickel is unevenly distributed.

In the above, it is preferable that the positive electrode active material further contain aluminum and include a surface portion and an inner portion. The surface portion preferably has a higher aluminum concentration than the inner portion.

In the above, it is preferable that the positive electrode active material further contain fluorine and include a region where fluorine is unevenly distributed.

Another embodiment of the present invention is a secondary battery containing the above-described positive electrode active material.

Another embodiment of the present invention is an electronic device including the above-described secondary battery According to one embodiment of the present invention, a positive electrode active material in which a capacity decrease due to charge and discharge cycles is suppressed when used in a lithium-ion secondary battery can be provided. A positive electrode active material having a crystal structure that is unlikely to be broken by repeated charging and discharging can be provided. A positive electrode active material with high charge and discharge capacity can be provided. A highly safe or highly reliable secondary battery can be provided.

One embodiment of the present invention can provide a positive electrode active material, a power storage device, or a manufacturing method thereof.

Note that the description of these effects does not preclude the existence of other effects. One embodiment of the present invention does not need to have all the effects.

Other effects will be apparent from and can be derived from the description of the specification, the drawings, the claims, and the like.

BRIEF DESCRIPTION OF THE DRAWINGS

In the accompanying drawings:

FIGS. 34A and 34B are surface SEM images of a positive electrode active material, and FIG. 34C is a graph showing results of linear EDX analysis of the positive electrode active material;

Figure 42:
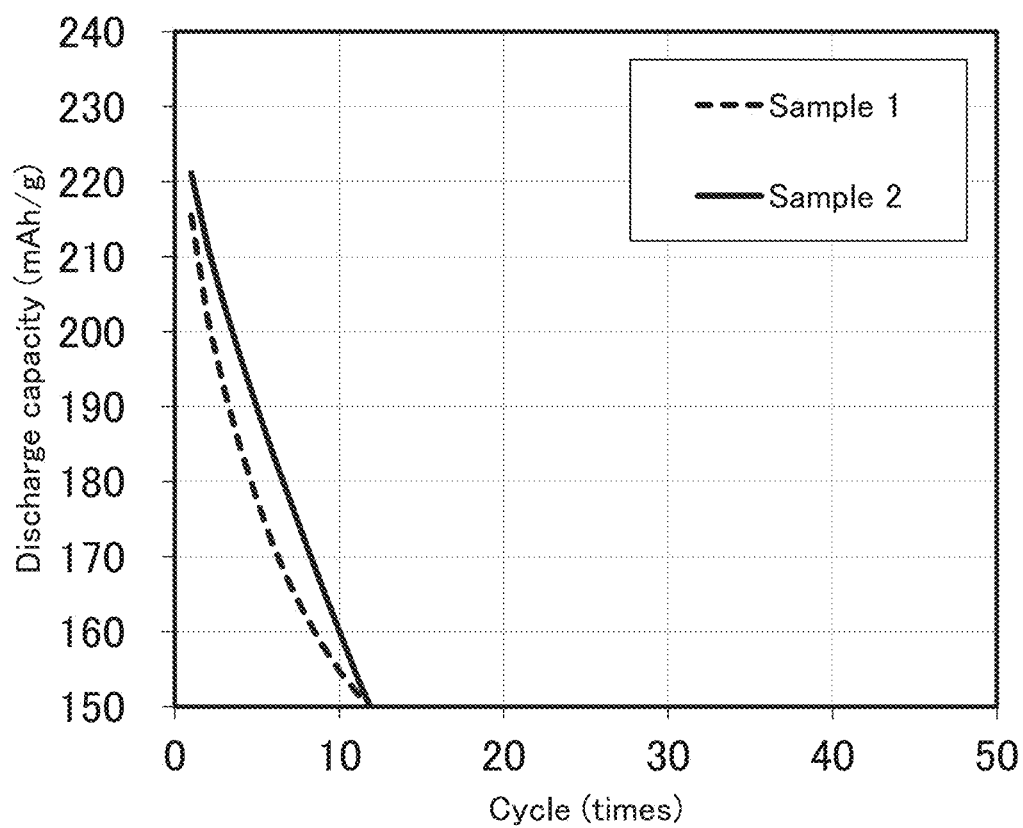
Figure 43:
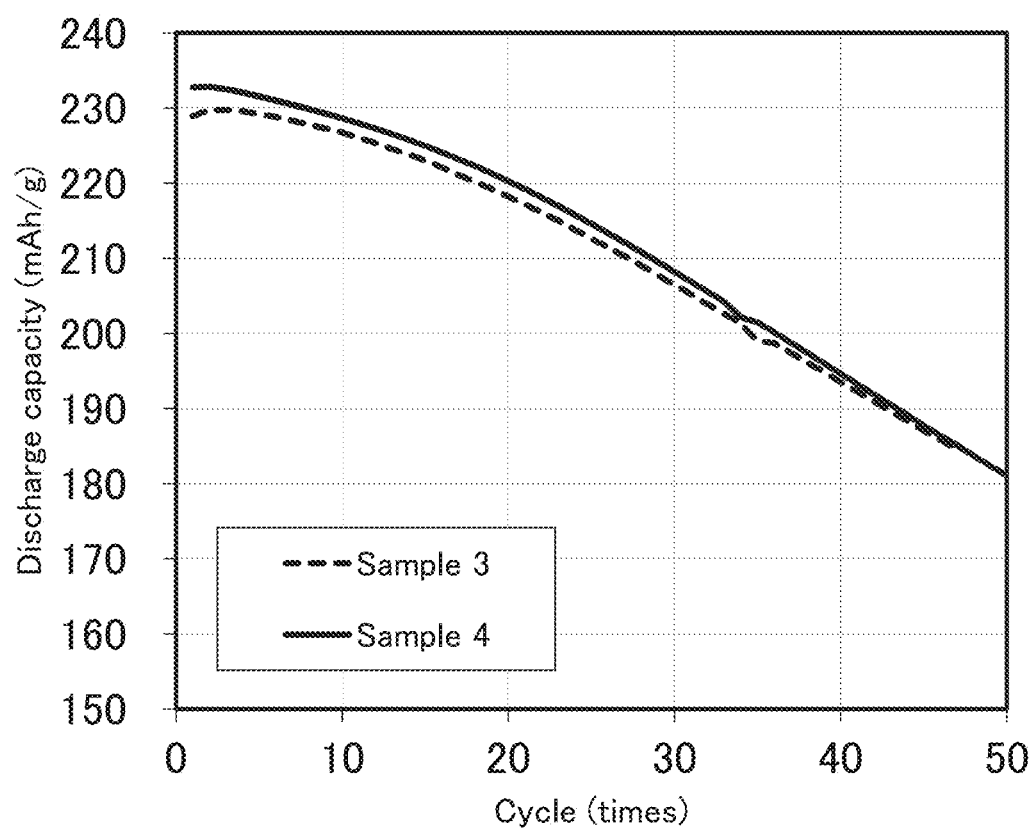
Figure 44:
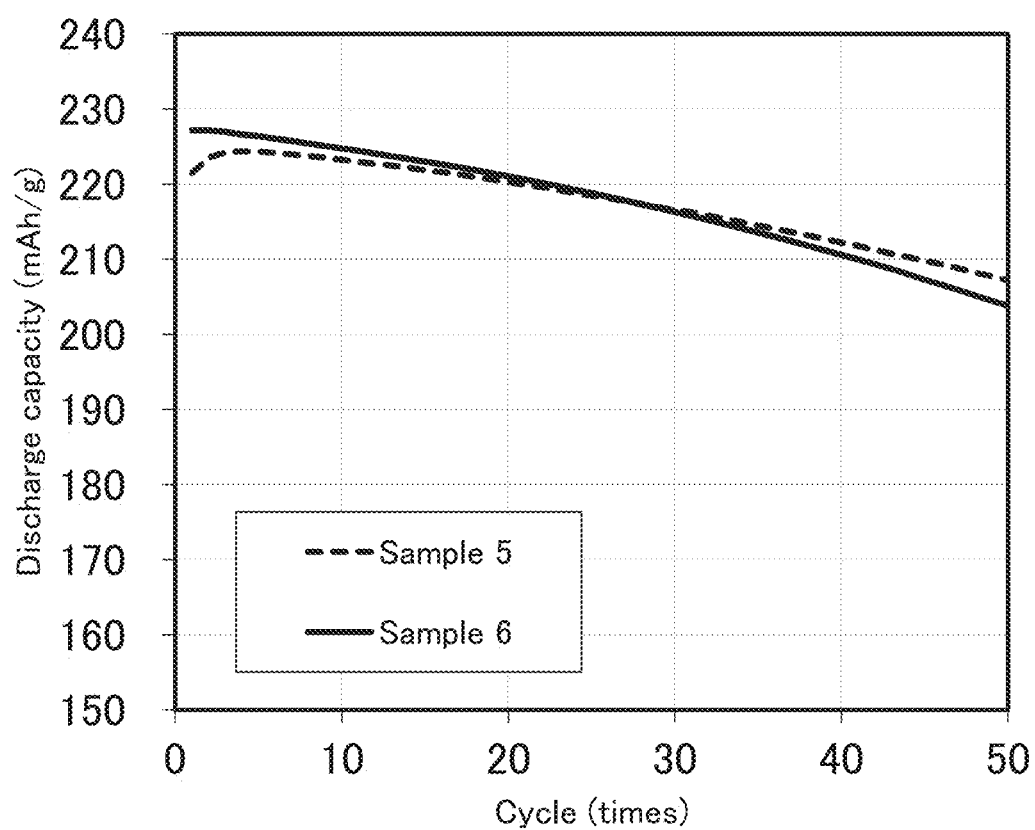
Figure 45:
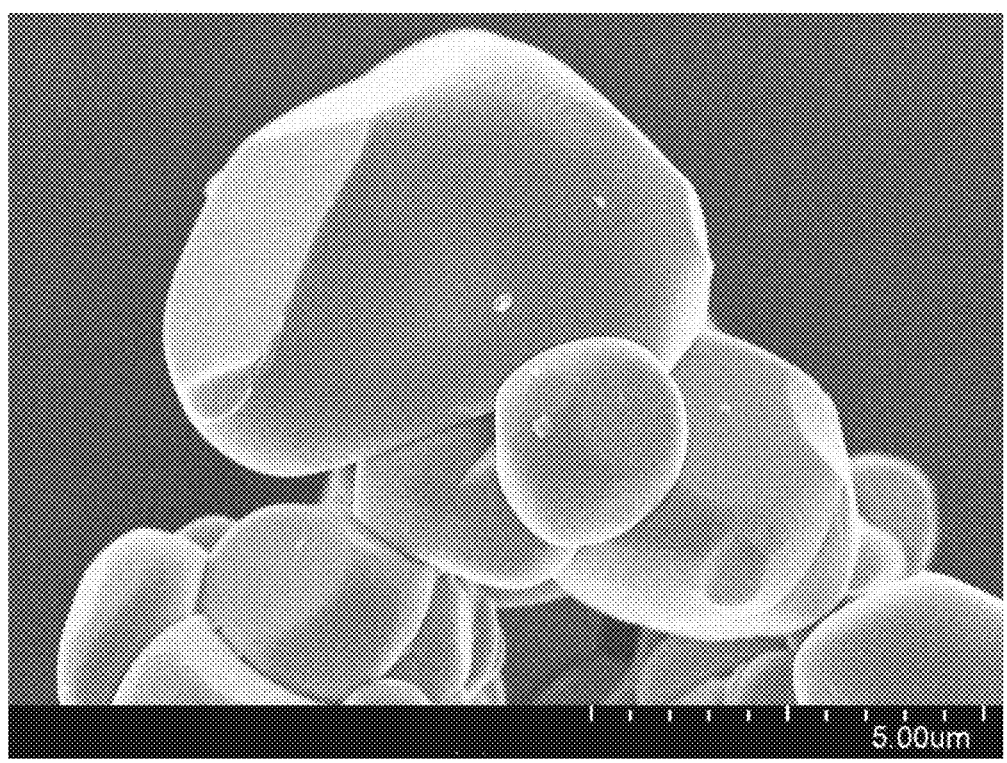
Figure 46A:
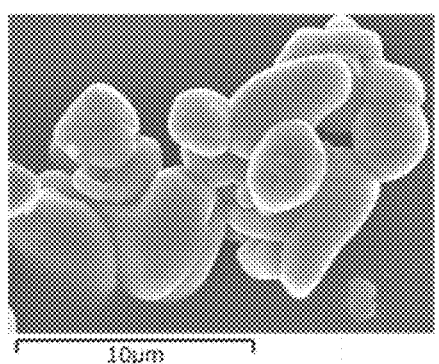
Figure 46B:
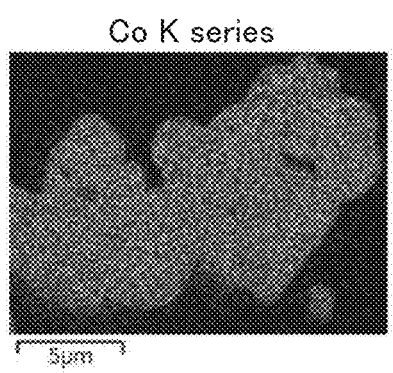
Figure 46C:
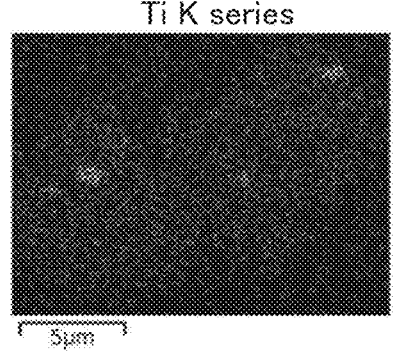
Figure 46D:
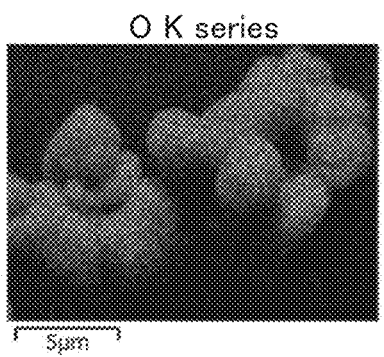
Figure 46E:
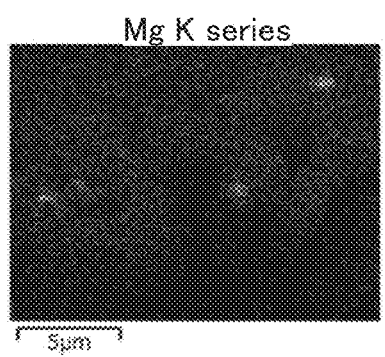
Figure 46F:
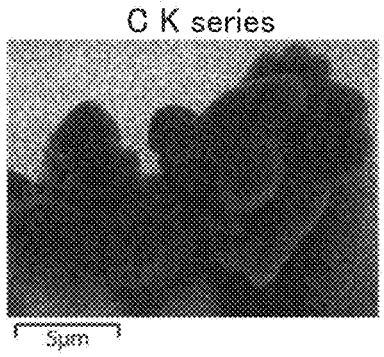
Figure 46G:
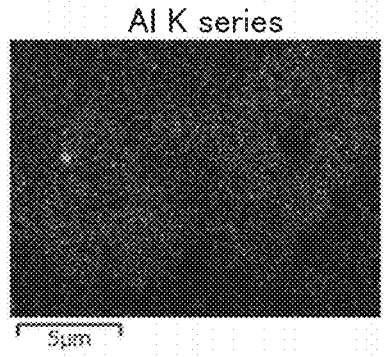
Figure 48:
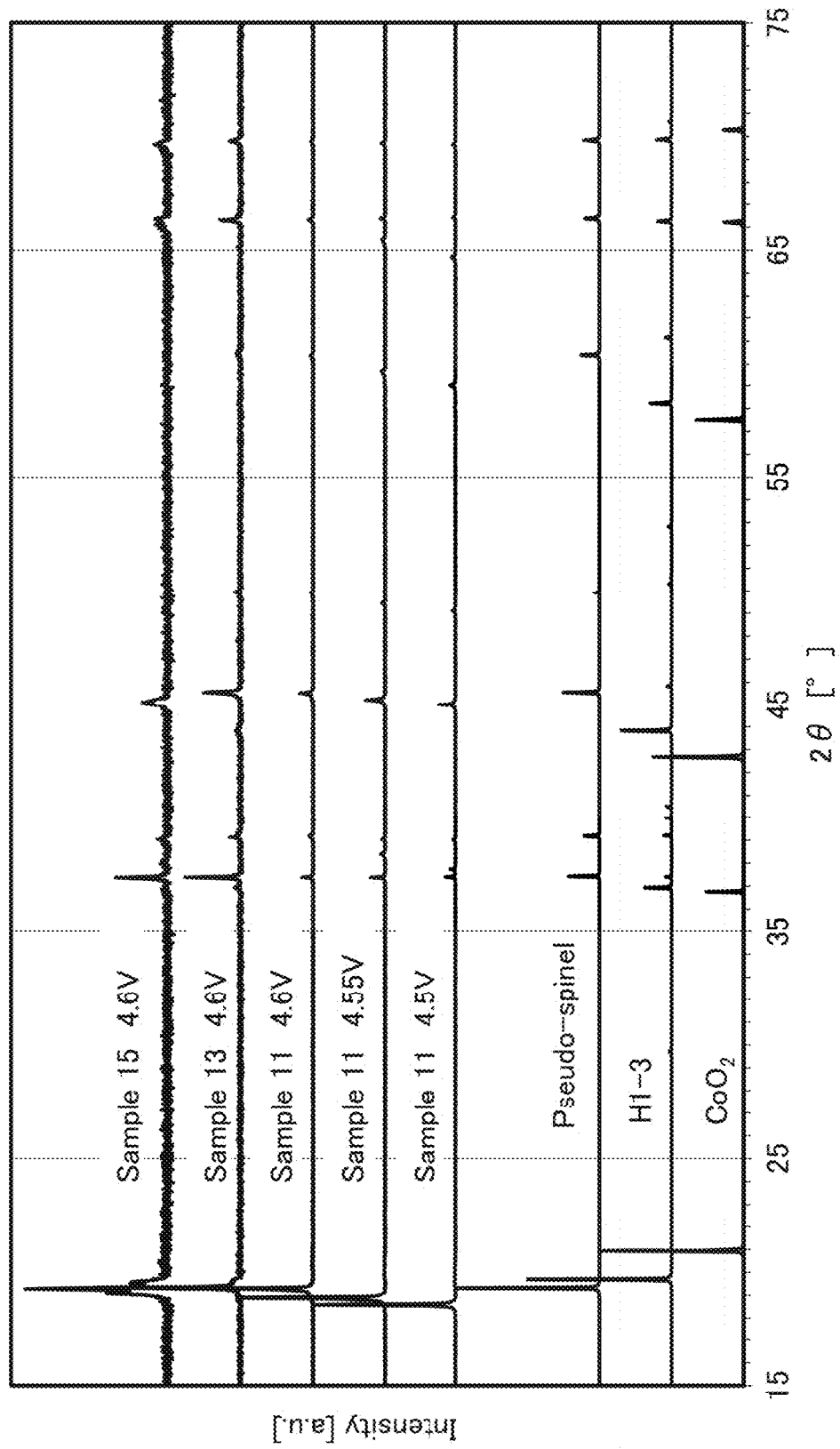
Figure 49A:
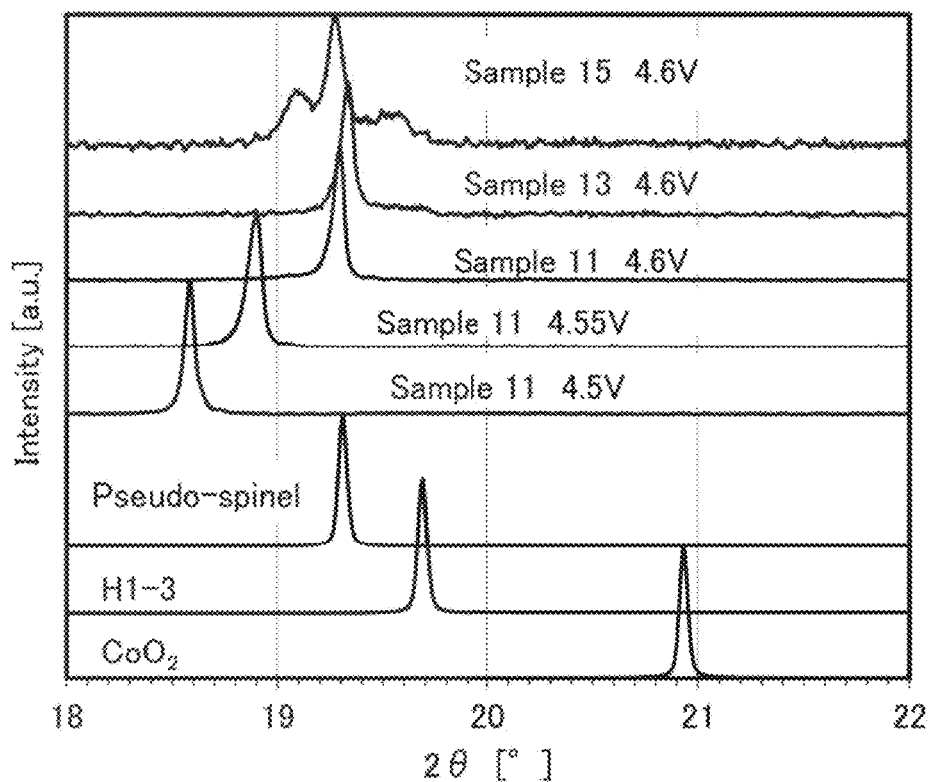
Figure 49B:
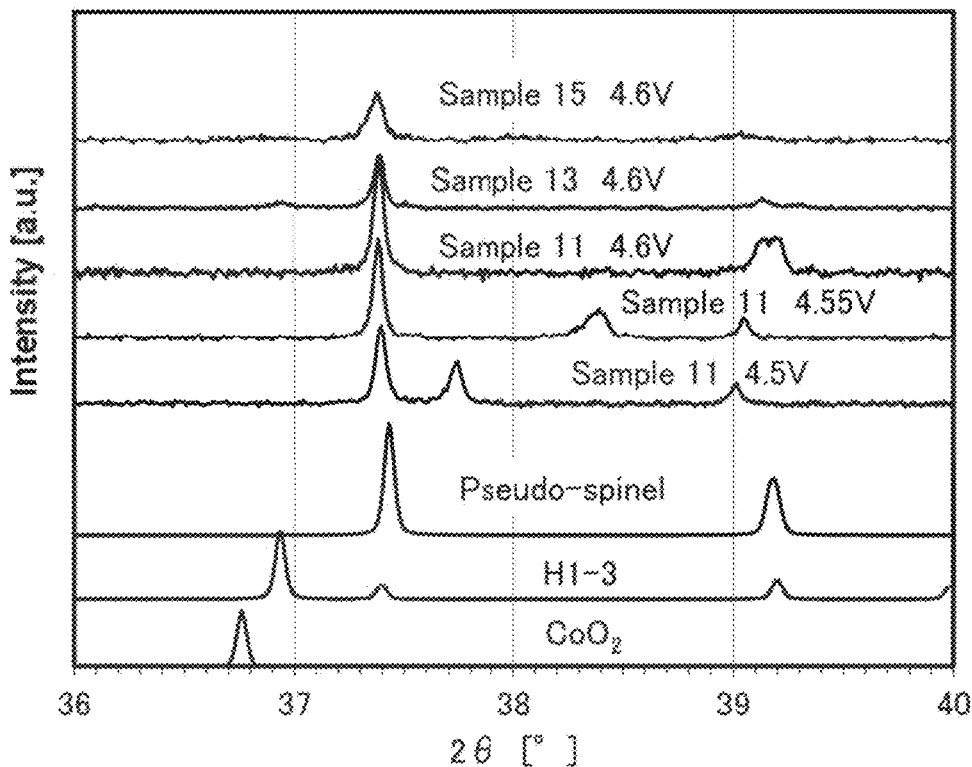
Figure 50A:
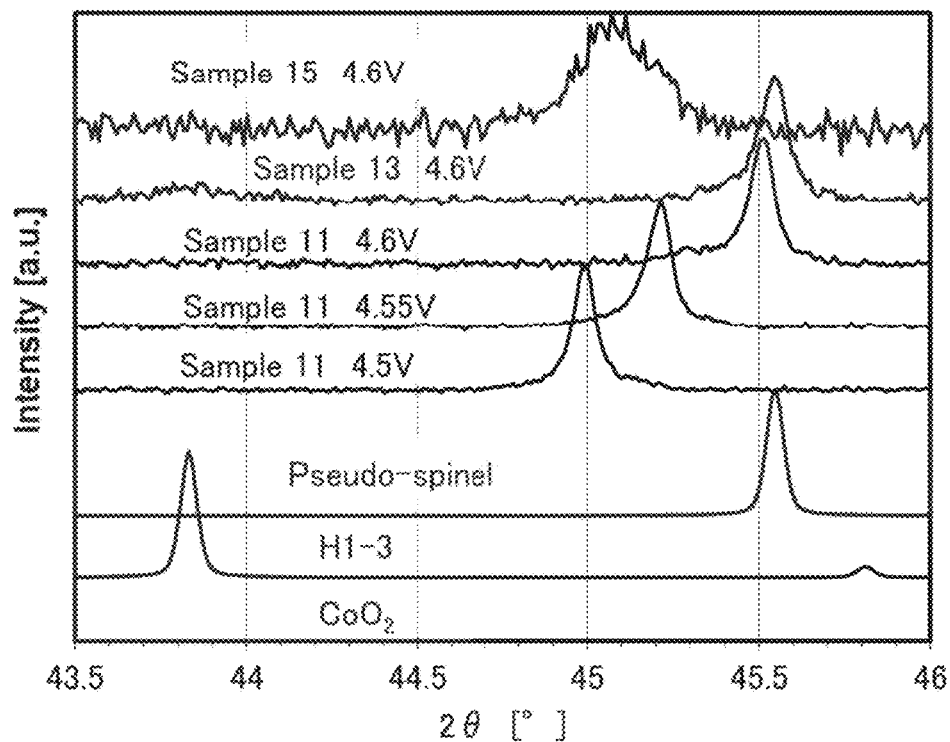
Figure 50B:
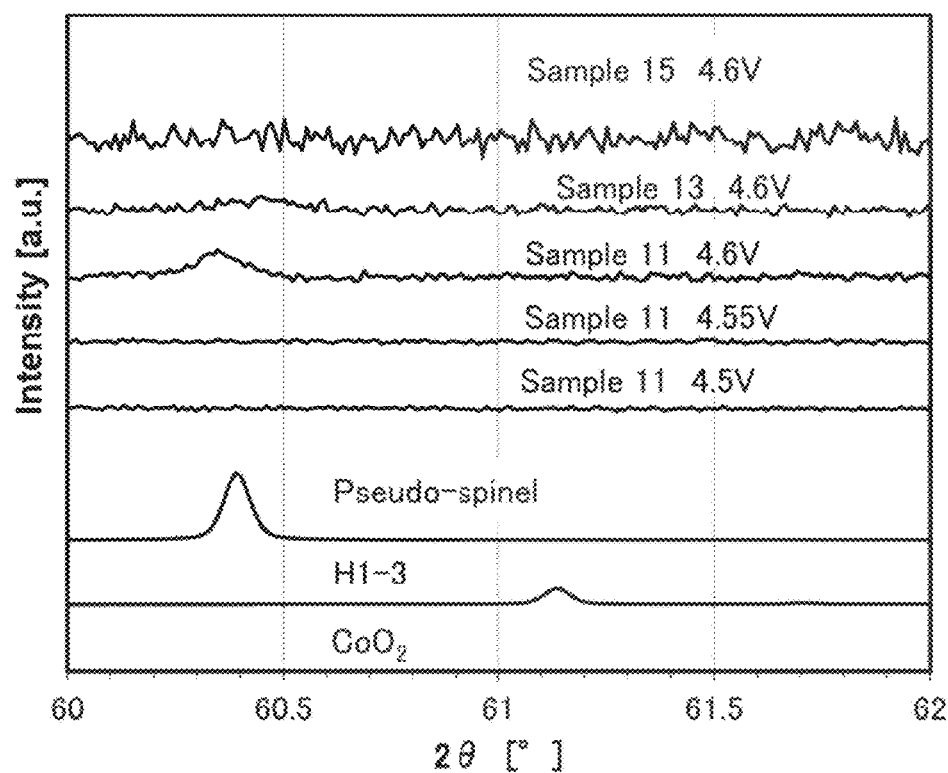
Figure 51A:
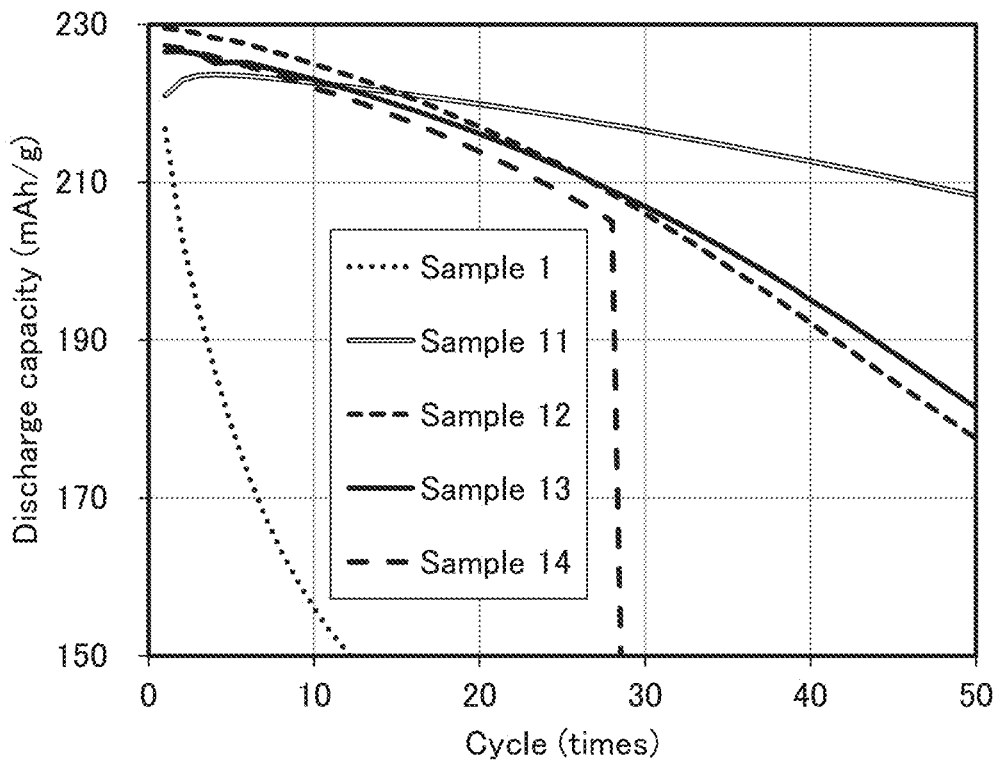
Figure 51B:
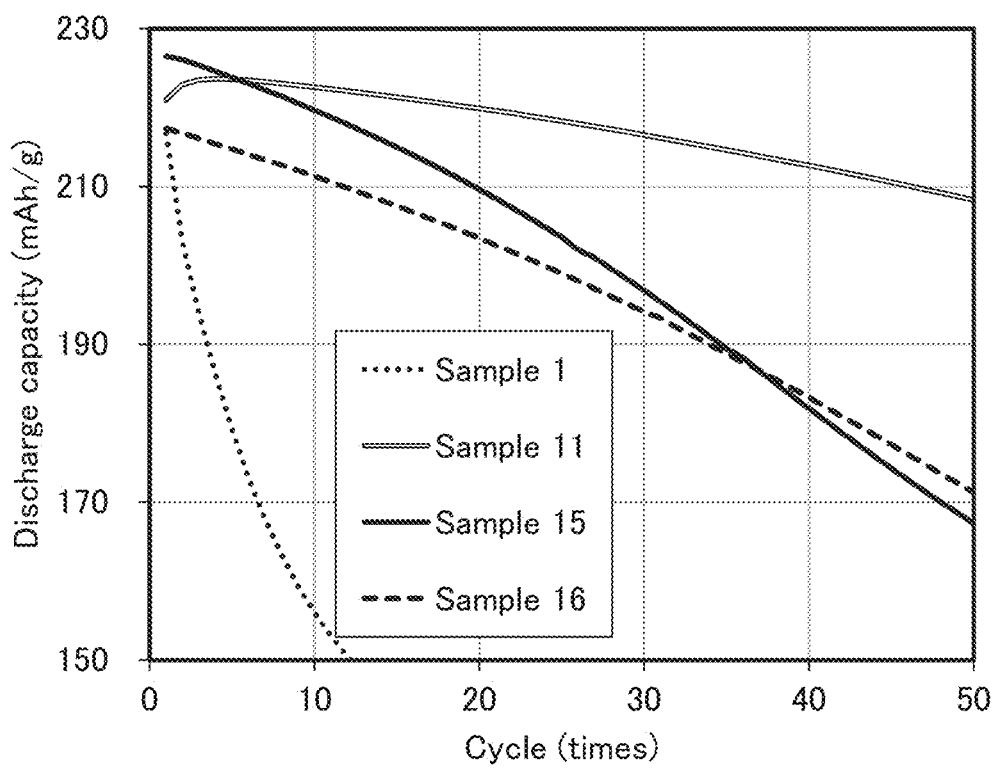
Figure 52:
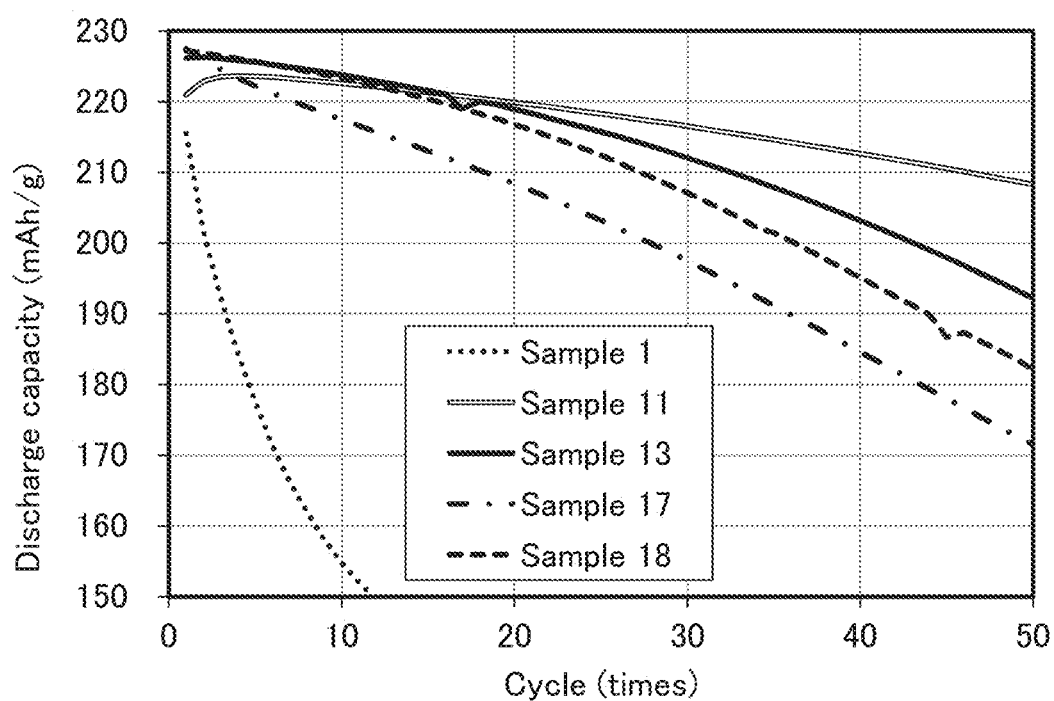

41B is a nanobeam electron diffraction pattern of an inner portion of the positive electrode active material;

FIG. 42 is a graph showing cycling performance of secondary batteries;

FIG. 43 is a graph showing cycling performance of secondary batteries;

FIG. 44 is a graph showing cycling performance of secondary batteries;

FIG. 45 is a surface SEM image of a positive electrode active material;

FIG. 46A is a surface SEM image of a positive electrode active material, and FIGS. 46B to 46G are EDX mapping images of the positive electrode active material;

FIG. 47A is a surface SEM image of a positive electrode active material, and FIGS. 47B to 47H are EDX mapping images of the positive electrode active material;

FIG. 48 shows XRD patterns of positive electrode active materials;

FIGS. 49A and 49B show XRD patterns of positive electrode active materials;

FIGS. 50A and 50B show XRD patterns of positive electrode active materials;

FIGS. 51A and 51B are graphs showing cycling performance of secondary batteries;

FIG. 52 is a graph showing cycling performance of secondary batteries; and

Figure 53A:
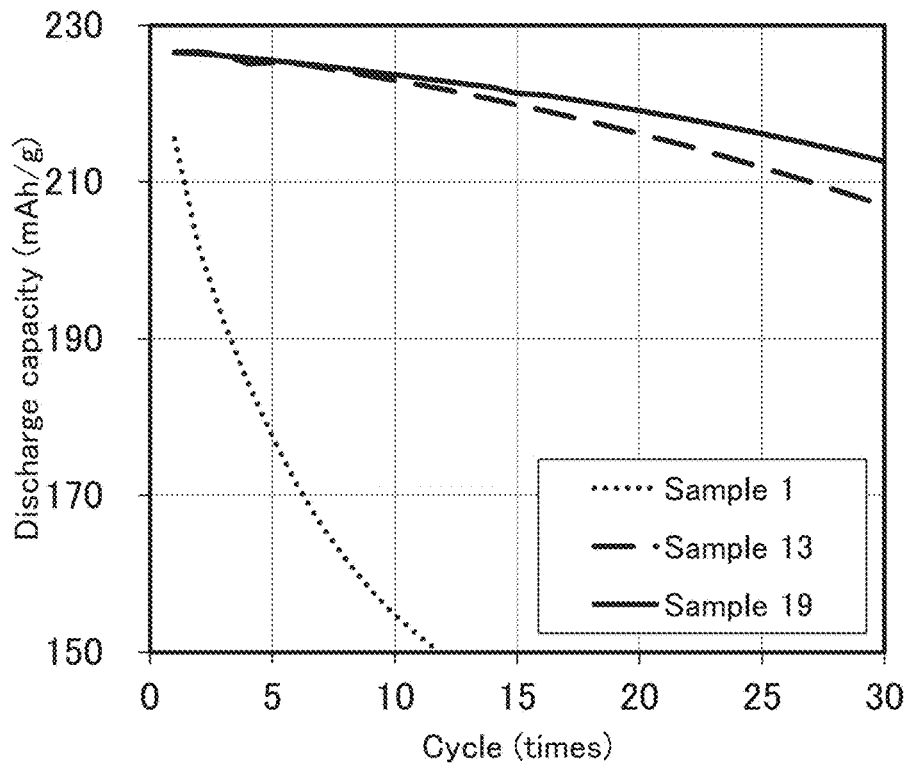
Figure 53B:
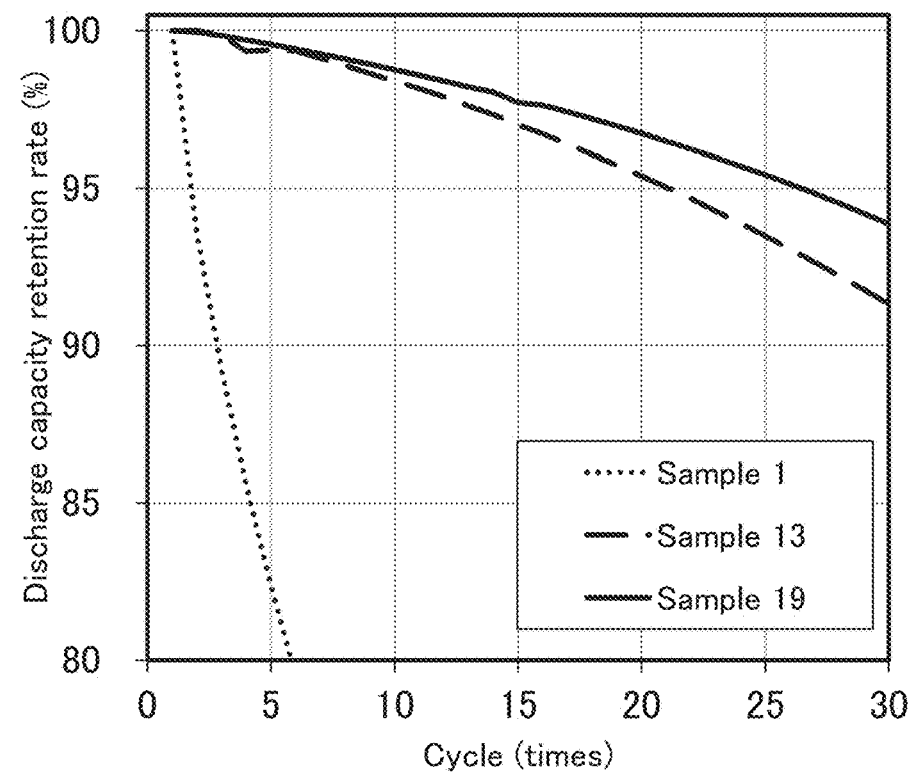

FIGS. 53A and 53B are graphs showing cycling performance of secondary batteries.

DETAILED DESCRIPTION OF THE INVENTION

Hereinafter, embodiments of the present invention will be described in detail with reference to the drawings. Note that the present invention is not limited to the description below, and it is easily understood by those skilled in the art that modes and details of the present invention can be modified in various ways. In addition, the present invention should not be construed as being limited to the description in the following embodiments.

In this specification and the like, the Miller index is used for the expression of crystal planes and orientations. An individual plane that shows a crystal plane is denoted by "( )". In the crystallography, a bar is placed over a number in the expression of crystal planes, orientations, and space groups; in this specification and the like, because of application format limitations, crystal planes, orientations, and space groups are sometimes expressed by placing a minus sign (−) in front of a number instead of placing a bar over the number.

In this specification and the like, segregation refers to a phenomenon in which, in a solid made of a plurality of elements (e.g., A, B, and C), a certain element (e.g., B) is spatially non-uniformly distributed.

In this specification and the like, uniformity or homogeneity refers to a phenomenon in which, in a solid made of a plurality of elements (e.g., A, B, and C), a certain element (e.g., A) is distributed with similar nature in specific regions. Note that it is acceptable for the specific regions to have substantially the same concentrations of the element. For example, a difference in the concentrations of the element between the specific regions can be 10% or less. Examples of the specific regions include a surface, a projection, a depression, and an inner portion.

In this specification and the like, a layered rock-salt crystal structure of a composite oxide containing lithium and a transition metal refers to a crystal structure in which a rock-salt ion arrangement where cations and anions are alternately arranged is included and lithium and the transition metal are regularly arranged to form a two-dimensional plane, so that lithium can diffuse two-dimensionally. Note that a defect such as a cation or anion vacancy may exist. In the layered rock-salt crystal structure, strictly, a lattice of a rock-salt crystal is distorted in some cases.

In this specification and the like, a rock-salt crystal structure refers to a structure in which cations and anions are alternately arranged. Note that a cation or anion vacancy may exist.

In this specification and the like, a pseudo-spinel crystal structure of a composite oxide containing lithium and a transition metal refers to a crystal structure with a space group R-3m, which is not a spinel crystal structure but a crystal structure in which an ion of cobalt, magnesium, or the like is coordinated to six oxygen atoms and the cation arrangement has symmetry similar to that of the spinel crystal structure. Note that in the pseudo-spinel crystal structure, a light element such as lithium is sometimes coordinated to four oxygen atoms. In that case, the ion arrangement also has symmetry similar to that of the spinel crystal structure.

The pseudo-spinel crystal structure can be regarded as a crystal structure that contains Li between layers randomly and is similar to the $CdCl_2$ crystal structure. The crystal structure similar to the $CdCl_2$ crystal structure is close to a crystal structure of lithium nickel oxide ($Li_{0.06}NiO_2$) that is charged until the charge depth reaches 0.94; however, pure lithium cobalt oxide or a layered rock-salt positive electrode active material containing a large amount of cobalt is known not to have such a crystal structure generally.

Anions of a layered rock-salt crystal and anions of a rock-salt crystal form a cubic close-packed structure (face-centered cubic lattice structure). Anions of a pseudo-spinel crystal are presumed to form a cubic close-packed structure. When a pseudo-spinel crystal is in contact with a layered rock-salt crystal and a rock-salt crystal, there is a crystal plane at which orientations of cubic close-packed structures formed of anions are aligned with each other. A space group of each of the layered rock-salt crystal and the pseudo-spinel crystal is R-3m, which is different from a space group Fm-3m of a general rock-salt crystal and a space group Fd-3m of a rock-salt crystal having the simplest symmetry; thus, the Miller index of the crystal plane satisfying the above conditions in the layered rock-salt crystal and the pseudo-spinel crystal is different from that in the rock-salt crystal. In this specification, a state where the orientations of the cubic close-packed structures formed of anions in the layered rock-salt crystal, the pseudo-spinel crystal, and the rock-salt crystal are aligned with each other is sometimes referred to as a state where crystal orientations are substantially aligned with each other.

Whether the crystal orientations in two regions are substantially aligned with each other or not can be judged from a transmission electron microscope (TEM) image, a scanning transmission electron microscope (STEM) image, a high-angle annular dark field scanning transmission electron microscope (HAADF-STEM) image, an annular bright-field scanning transmission electron microscope (ABF-STEM) image, and the like. X-ray diffraction (XRD), electron diffraction, neutron diffraction, and the like can also be used for judging. In the TEM image and the like, alignment of cations and anions can be observed as repetition of bright lines and dark lines. When the orientations of cubic close-packed structures of the layered rock-salt crystal and the rock-salt crystal are aligned with each other, a state where an angle between the repeated bright lines and dark lines in the crystals is less than or equal to 5°, preferably less than or equal to 2.5° is observed. Note that in the TEM image and the like, a light element such as oxygen or fluorine is not clearly observed in some cases; however, in such a case, alignment of orientations can be judged by arrangement of metal elements.

In this specification and the like, a theoretical capacity of a positive electrode active material refers to the amount of electricity obtained when all lithium that can be inserted into and extracted from the positive electrode active material is extracted. For example, the theoretical capacity of $LiCoO_2$ is 274 mAh/g, the theoretical capacity of $LiNiO_2$ is 274 mAh/g, and the theoretical capacity of $LiMn_2O_4$ is 148 mAh/g.

In this specification and the like, the charge depth obtained when all lithium that can be inserted into and extracted from a positive electrode active material is inserted is 0, and the charge depth obtained when all lithium that can be inserted into and extracted from a positive electrode active material is extracted is 1.

In this specification and the like, charging refers to transfer of electrons from a positive electrode to a negative electrode in an external circuit. Charging of a positive electrode active material refers to extraction of lithium ions. A positive electrode active material with a charge depth of greater than or equal to 0.74 and less than or equal to 0.9, specifically greater than or equal to 0.8 and less than or equal to 0.83 is referred to as a high-voltage charged positive electrode active material. Thus, for example, $LiCoO_2$ charged to 219.2 mAh/g is a high-voltage charged positive electrode active material. In addition, $LiCoO_2$ that is subjected to a constant current charging at 25° C. and a charging voltage of higher than or equal to 4.525 V and lower than or equal to 4.65 V (in the case of a lithium counter electrode), and then subjected to a constant voltage charging until the current value becomes 0.01 C or ⅕ to ¹⁄₁₀₀ of the current value at the time of the constant current charging is also referred to as a high-voltage charged positive electrode active material.

Similarly, discharging refers to transfer of electrons from a negative electrode to a positive electrode in an external circuit. Discharging of a positive electrode active material refers to insertion of lithium ions. A positive electrode active material with a charge depth of less than or equal to 0.06 or a positive electrode active material discharged at least 90% of the charge capacity from a state of being charged with a high voltage is referred to as a sufficiently discharged positive electrode active material. For example, $LiCoO_2$ with a charge capacity of 219.2 mAh/g is a high-voltage charged positive electrode active material, and a positive electrode active material from which more than or equal to 197.3 mAh/g, which is 90% of the charge capacity, is discharged is a sufficiently discharged positive electrode active material. In addition, $LiCoO_2$ that is subjected to a constant current discharging at 25° C. until the battery voltage becomes lower than or equal to 3 V (in the case of a lithium counter electrode) is also referred to as a sufficiently discharged positive electrode active material.

In this specification and the like, an example in which a lithium metal is used for a counter electrode in a secondary battery using a positive electrode and a positive electrode active material of one embodiment of the present invention is described in some cases; however, the secondary battery of one embodiment of the present invention is not limited to this example. Another material such as graphite or lithium titanate may be used for a negative electrode, for example. The properties of the positive electrode and the positive electrode active material of one embodiment of the present invention, such as a crystal structure unlikely to be broken by repeated charging and discharging and excellent cycling performance, are not affected by the material of the negative electrode. For example, the secondary battery of one embodiment of the present invention using a lithium counter electrode is charged and discharged at a relatively high charging voltage of 4.6 V in some cases; however, charging and discharging may be performed at a lower voltage. Charging and discharging at a lower voltage may lead to the cycling performance better than that described in this specification and the like.

Embodiment 1

In this embodiment, a positive electrode active material of one embodiment of the present invention will be described with reference to FIGS. 1A and 1B, FIGS. 2A and 2B, FIGS. 3A to 3C, FIG. 4, FIG. 5, and FIG. 6.

Figure 1A:
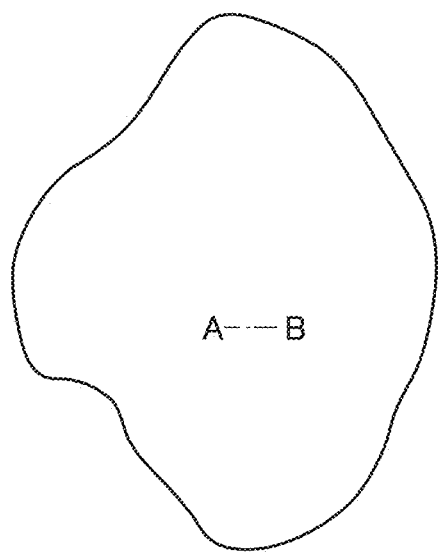
FIG. 1A is a top view of a positive electrode active material.
Figure 1B:
FIG. 1B is a cross-sectional view of the positive electrode active material.

FIG. 1A is an example of a top view of a positive electrode active material 101 of one embodiment of the present invention. FIG. 1B is a schematic cross-sectional view taken along the line A-B in FIG. 1A.

<Contained Element and Distribution>

The positive electrode active material 101 contains lithium, a transition metal M, oxygen, and an impurity. The positive electrode active material 101 can be regarded as a composite oxide represented by $LiMO_2$ to which an impurity is added.

As the transition metal M contained in the positive electrode active material 101, a metal that can form, together with lithium, a layered rock-salt composite oxide belonging to the space group R-3m is preferably used. For example, at least one of manganese, cobalt, and nickel can be used. That is, as the transition metal contained in the positive electrode active material 101, only cobalt or nickel may be used, cobalt and manganese or nickel may be used, or cobalt, manganese, and nickel may be used. In other words, the positive electrode active material 101 can contain a composite oxide containing lithium and the transition metal M, such as lithium cobalt oxide, lithium nickel oxide, lithium cobalt oxide in which manganese is substituted for part of cobalt, lithium cobalt oxide in which nickel is substituted for part of cobalt, or lithium nickel-manganese-cobalt oxide. Nickel is preferably contained as the transition metal M in addition to cobalt, in which case a crystal structure may be more stable in a high-voltage charged state.

As the impurity contained in the positive electrode active material 101, at least one of magnesium, fluorine, aluminum, titanium, zirconium, vanadium, iron, chromium, niobium, cobalt, arsenic, zinc, silicon, sulfur, phosphorus, and boron is preferably used. Such elements further stabilize the crystal structure of the positive electrode active material 101 in some cases as described later. The positive electrode active material 101 can contain lithium cobalt oxide to which magnesium and fluorine are added, lithium cobalt oxide to which magnesium, fluorine, and titanium are added, lithium nickel-cobalt oxide to which magnesium and fluorine are added, lithium cobalt-aluminum oxide to which magnesium and fluorine are added, lithium nickel-cobalt-aluminum oxide, lithium nickel-cobalt-aluminum oxide to which magnesium and fluorine are added, lithium nickel-manganese-cobalt oxide to which magnesium and fluorine are added, or the like. Note that in this specification and the like, an impurity does not adversely affect the properties of the positive electrode active material 101. Thus, an impurity may be rephrased as an additive, a mixture, a constituent material, or the like.

As illustrated in FIG. 1B, the positive electrode active material 101 includes a surface portion 101a and an inner portion 101b. The surface portion 101a preferably has a higher impurity concentration than the inner portion 101b. The impurity concentration preferably has a gradient as shown in FIG. 1B by gradation, in which the impurity concentration increases from the inner portion toward the surface. In this specification and the like, the surface portion 101a refers to a region from the surface of the positive electrode active material 101 to a depth of approximately 10 nm. A plane generated by a crack can be considered as a surface. A region whose position is deeper than that of the surface portion 101a of the positive electrode active material 101 is referred to as the inner portion 101b.

In order to prevent the breakage of a layered structure formed of octahedrons of oxygen and the transition metal M such as cobalt even when lithium is extracted from the positive electrode active material 101 of one embodiment of the present invention by charging, the surface portion 101a having a high impurity concentration, i.e., the outer portion of the positive electrode active material 101, is reinforced.

The impurity concentration gradient is preferably similar throughout the surface portion 101a of the positive electrode active material 101. In other words, it is preferable that reinforcement derived from a high impurity concentration uniformly exist in the surface portion 101a. A situation where only part of the surface portion 101a has reinforcement is not preferable because stress might be concentrated on parts that do not have reinforcement. The concentration of stress on part of a particle might cause defects such as cracks from that part, leading to cracking of the positive electrode active material and a decrease in charge and discharge capacity.

Magnesium is divalent and is more stable in lithium sites than in transition metal sites in a layered rock-salt crystal structure; thus, magnesium is likely to enter the lithium sites. An appropriate concentration of magnesium in the lithium sites of the surface portion 101a facilitates maintenance of the layered rock-salt crystal structure of the positive electrode active material 101. An appropriate magnesium concentration is preferable because an adverse effect on insertion and extraction of lithium in charging and discharging can be prevented. However, excess magnesium might adversely affect insertion and extraction of lithium. As will be described later, the concentration of the transition metal is preferably higher than that of magnesium in the surface portion 101a, for example.

Aluminum is trivalent and has a high bonding strength with oxygen. Thus, when aluminum is contained as an impurity and exists in the lithium sites, a change in the crystal structure can be inhibited. Hence, the addition of aluminum enables the positive electrode active material 101 to have the crystal structure that is unlikely to be broken by repeated charging and discharging.

The voltage of a positive electrode generally increases with increasing charging voltage of a secondary battery. The positive electrode active material of one embodiment of the present invention has a stable crystal structure even at a high voltage. The stable crystal structure of the positive electrode active material in a charged state can suppress a capacity decrease due to repeated charging and discharging.

A short circuit of a secondary battery might cause not only malfunction in charging operation and discharging operation of the secondary battery but also heat generation and firing. In order to obtain a safe secondary battery, a short-circuit current is preferably inhibited even at a high charging voltage. In the positive electrode active material 101 of one embodiment of the present invention, a short-circuit current is inhibited even at a high charging voltage; thus, a secondary battery can have high capacity and a high level of safety.

The impurity concentration gradient can be evaluated using energy dispersive X-ray spectroscopy (EDX). In the EDX measurement, the measurement in which a region is measured while scanning the region and evaluated two-dimensionally is referred to as EDX surface analysis. The measurement of a region by line scan, which is performed to evaluate the atomic concentration distribution in a positive electrode active material particle, is referred to as linear analysis. Furthermore, extracting data of a linear region from EDX surface analysis is referred to as linear analysis in some cases. The measurement of a region without scanning is referred to as point analysis.

The impurity concentrations in the surface portion 101a, the inner portion 101b and the vicinity of a crystal grain boundary, an embedded portion 102 and a projection 103 that will be described later, and the like of the positive electrode active material 101 can be quantitatively analyzed by EDX surface analysis (e.g., element mapping). In addition, the impurity concentration distribution and the highest impurity concentration can be analyzed by EDX linear analysis.

When the positive electrode active material 101 containing magnesium as an impurity is subjected to the EDX linear analysis, a peak of the magnesium concentration in the surface portion 101a is preferably observed in a region from the surface of the positive electrode active material 101 to a depth of 3 nm toward the center, further preferably to a depth of 1 nm, and still further preferably to a depth of 0.5 nm.

When the positive electrode active material 101 contains fluorine in addition to magnesium as impurities, the distribution of fluorine preferably overlaps with the distribution of magnesium. Thus, in the EDX linear analysis, a peak of the fluorine concentration in the surface portion 101a is preferably observed in a region from the surface of the positive electrode active material 101 to a depth of 3 nm toward the center, further preferably to a depth of 1 nm, and still further preferably to a depth of 0.5 nm.

Note that the concentration distribution may differ between impurities. For example, in the case where the positive electrode active material 101 contains aluminum, magnesium, and fluorine as the impurities, the distribution of aluminum is preferably slightly different from that of magnesium and that of fluorine. For example, in the EDX linear analysis, the peak of the magnesium concentration is preferably closer to the surface than the peak of the aluminum concentration is in the surface portion 101a. For example, the peak of the aluminum concentration is preferably present in a region from the surface of the positive electrode active material 101 to a depth of 0.5 nm or more and 20 nm or less toward the center, further preferably to a depth of 1 nm or more and 5 nm or less.

When the positive electrode active material 101 is subjected to linear analysis or surface analysis, the atomic ratio of an impurity I to the transition metal M (I/M) in the surface portion 101a is preferably greater than or equal to 0.05 and less than or equal to 1.00. When the impurity is titanium, the atomic ratio of titanium to the transition metal M(Ti/M) is preferably greater than or equal to 0.05 and less than or equal to 0.4, further preferably greater than or equal to 0.1 and less than or equal to 0.3. When the impurity is magnesium, the atomic ratio of magnesium to the transition metal M (Mg/M)

is preferably greater than or equal to 0.4 and less than or equal to 1.5, further preferably greater than or equal to 0.45 and less than or equal to 1.00. When the impurity is fluorine, the atomic ratio of fluorine to the transition metal M (F/M) is preferably greater than or equal to 0.05 and less than or equal to 1.5, further preferably greater than or equal to 0.3 and less than or equal to 1.00.

When the positive electrode active material 101 is subjected to linear analysis or surface analysis, the atomic ratio of the impurity I to the transition metal M (IM) in the vicinity of the crystal grain boundary is preferably greater than or equal to 0.020 and less than or equal to 0.50, further preferably greater than or equal to 0.025 and less than or equal to 0.30, still further preferably greater than or equal to 0.030 and less than or equal to 0.20. For example, when the impurity is magnesium and the transition metal is cobalt, the atomic ratio of magnesium to cobalt (Mg/Co) is preferably greater than or equal to 0.020 and less than or equal to 0.50, further preferably greater than or equal to 0.025 and less than or equal to 0.30, still further preferably greater than or equal to 0.030 and less than or equal to 0.20.

As described above, excess impurities in the positive electrode active material 101 might adversely affect insertion and extraction of lithium. The use of such a positive electrode active material 101 for a secondary battery might cause a resistance increase, a capacity decrease, and the like. Meanwhile, when the amount of impurities is insufficient, the impurities are not distributed over the surface portion 101a, which might reduce the effect of maintaining a crystal structure. The impurities are required to be contained in the positive electrode active material 101 at appropriate concentrations; however, the adjustment of the concentrations is not easy.

For this reason, the positive electrode active material 101 may include a region where impurities are unevenly distributed, for example. With such a region, excess impurities are removed from the inner portion 101b, and the impurity concentration in the inner portion 101b can be appropriate. An appropriate impurity concentration in the inner portion 101b can inhibit a resistance increase, a capacity decrease, and the like when the positive electrode active material 101 is used for a secondary battery. A feature of suppressing an increase in resistance of a secondary battery is extremely preferable especially in charging and discharging at a high rate.

In the positive electrode active material 101 including the region where impurities are unevenly distributed, addition of excess impurities to some extent in the formation process is acceptable. This is preferable because the margin of production can be increased.

In this specification and the like, uneven distribution refers to a state where a concentration of a certain element in a certain region is different from that in other regions, and may be rephrased as segregation, precipitation, unevenness, deviation, higher or lower concentration, or the like.

FIGS. 2A and 2B and FIGS. 3A to 3C illustrate examples of the positive electrode active material 101 of one embodiment of the present invention including a region where impurities are unevenly distributed. Note that the impurities in the region where impurities are unevenly distributed exist as compounds, for example. Thus, uneven distribution of titanium as the impurities means uneven distribution of titanium compounds such as titanium oxides, and does not always mean uneven distribution of titanium metals. Similarly, uneven distribution of impurity metals means uneven distribution of impurity metal compounds such as impurity metal oxides and impurity metal fluorides.

Figure 2A:
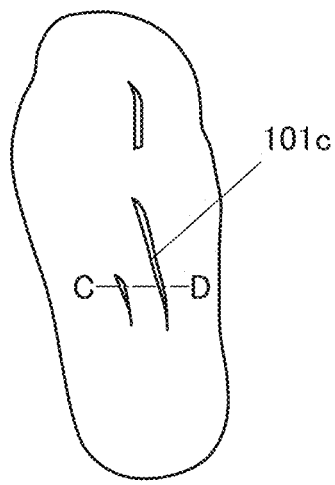
FIG. 2A is a top view of the positive electrode active material.
Figure 2B:
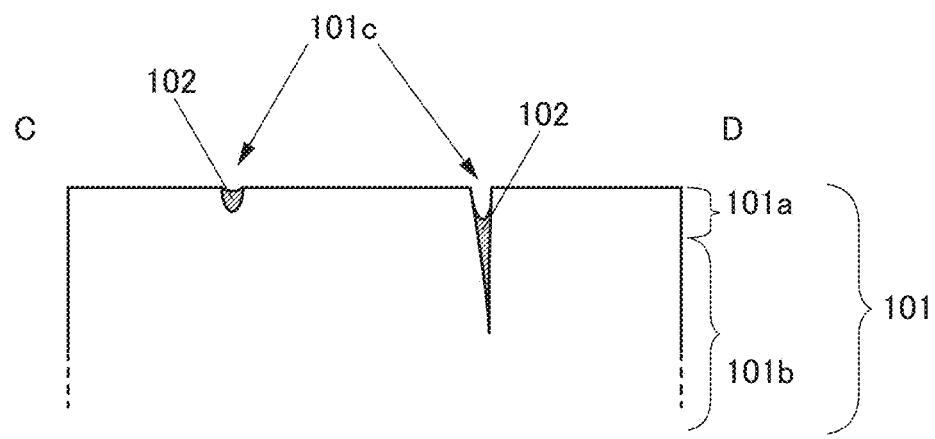
FIG. 2B is a cross-sectional view of the positive electrode active material.

FIG. 2A is a top view of the positive electrode active material 101 of one embodiment of the present invention including the embedded portions 102 as the regions where impurities are unevenly distributed. FIG. 2B is a cross-sectional view taken along the line C-D in FIG. 2A.

As illustrated in FIGS. 2A and 2B, the positive electrode active material 101 sometimes includes depressions 101c. The depressions 101c are regions not level with other regions, and may be referred to as cracks, hollows, or V-shaped cross sections, for example. The depressions each have a depth of 10 nm or more or 100 nm or more, and 5 μm or less or 1 μm or less, for example. Here, the positive electrode active material 101 preferably includes the embedded portions 102 that fill part of the depressions 101c. The embedded portions 102 are attached to at least part of the inner walls of the depressions 101c. In other words, the embedded portions 102 are provided on at least part of the inner walls of the depressions 101c. The embedded portions 102 may be referred to as spaces in the depressions. It is preferable that the concentration of impurities, e.g., at least one of titanium, magnesium, and fluorine, in the embedded portions 102 be higher than that in the inner portion 101b.

Titanium preferably exists in the embedded portions 102 as a titanium compound such as titanium oxide, for example.

The depressions 101c are given as an example of defects in the positive electrode active material 101. When charging and discharging are repeated, breakage of a crystal structure, cracking of the surface portion and the inner portion, or dissolution of a transition metal from the depressions 101c might occur, for example. However, the embedded portions 102 can inhibit dissolution of a transition metal, for example. Thus, the positive electrode active material 101 can have high reliability and excellent cycling performance.

Figure 3A:
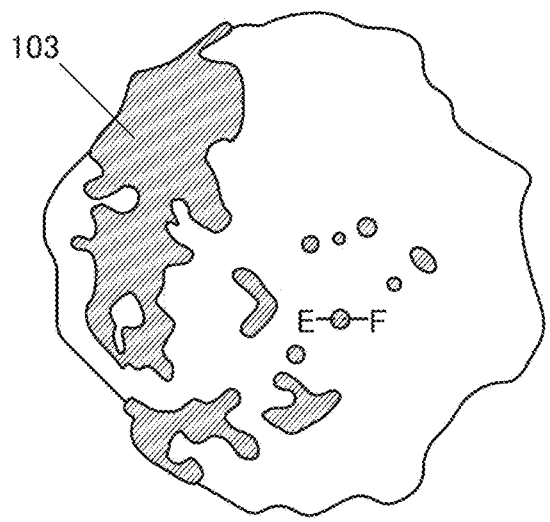
FIG. 3A is a top view of the positive electrode active material.
Figure 3B:
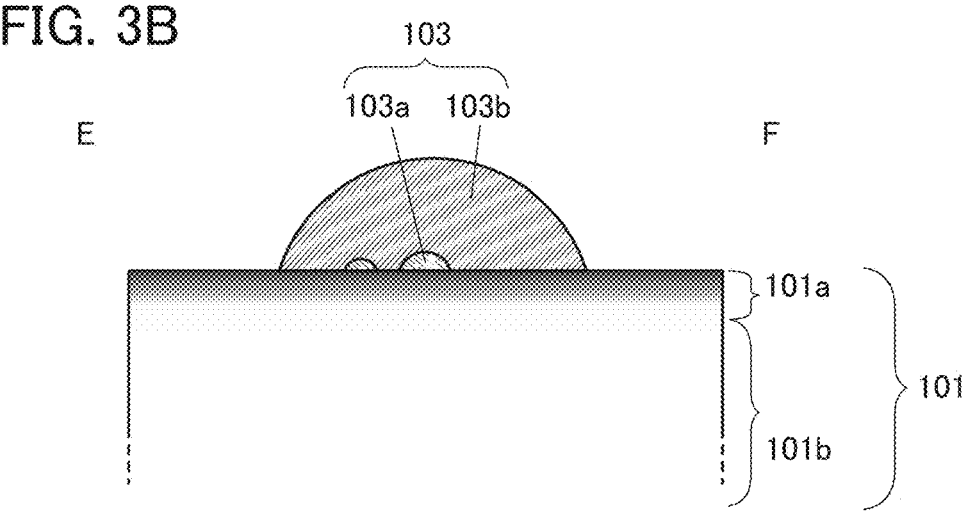
FIGS. 3B and 3C are cross-sectional views of the positive electrode active material.
Figure 3C:
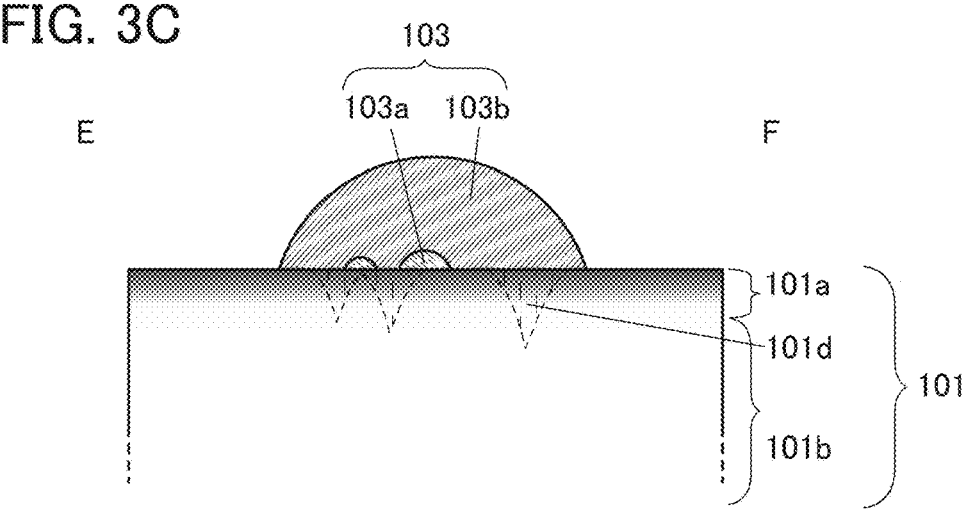

FIG. 3A is a top view of the positive electrode active material 101 of one embodiment of the present invention including the projection 103 as the region where impurities are unevenly distributed. FIGS. 3B and 3C are each a cross-sectional view taken along the line E-F in FIG. 3A. Note that the projection is a region not level with other regions, and can also be referred to as a drop-shaped portion, a colony portion, a hill portion, a bump, or the like. When the positive electrode active material 101 includes a plurality of projections, the shapes of the projections are not necessarily the same. The projection 103 preferably has a portion with a height of 50 nm or more, further preferably 100 nm or more, for example. Note that the height of the projection 103 refers to a height from the interface between the surface portion 101a and the projection 103. The height of the projection 103 can be obtained from a microscope image such as a SEM image or a TEM image.

The projection 103 preferably exists on the surface of the positive electrode active material 101. When the positive electrode active material 101 contains both of fluorine and a compound of metals such as magnesium and titanium as impurities, the projection 103 preferably includes a high fluorine concentration region 103a and a high metal impurity concentration region 103b, as illustrated in FIG. 3B. The high fluorine concentration region 103a has a higher fluorine concentration than the inner portion 101b and the high metal impurity concentration region 103b. The high metal impurity concentration region 103b has a higher metal impurity concentration than the inner portion 101b and the high fluorine concentration region 103a. On the positive electrode active material 101, the high metal impurity concentration region 103b preferably exists so as to cover the high fluorine concentration region 103a.

The impurities such as titanium, magnesium, and fluorine preferably exist at appropriate concentrations in the surface portion 101a of the positive electrode active material 101. The impurity concentration preferably has a gradient that increases from the inner portion toward the surface of the positive electrode active material 101.

When the positive electrode active material 101 contains nickel as the transition metal M, part of nickel may exist in the high metal impurity concentration region 103b. In that case, the high metal impurity concentration region 103b may have a higher nickel concentration than the inner portion 101b and the high fluorine concentration region 103a.

Furthermore, as illustrated in FIG. 3C, high nickel concentration regions 101d may exist partly in the surface portion 101a and the inner portion 101b that overlap with the projection 103. The high nickel concentration regions 101d can be regarded as a trace of nickel, which forms a solid solution in the inner portion of the positive electrode active material 101, drawn to the projection 103. The high nickel concentration regions 101d have a higher nickel concentration than the surface portion 101a and the inner portion 101b other than the high nickel concentration regions 101d, and have a lower nickel concentration than the high metal impurity concentration region 103b.

The impurities do not all necessarily have the above-described distribution. For example, in the case where the positive electrode active material 101 contains aluminum, magnesium, and titanium as the impurities, the distribution of aluminum is preferably different from that of magnesium or titanium. For example, it is preferable that aluminum hardly exist in the projection 103 and exist in the surface portion 101a of the positive electrode active material 101. That is, the aluminum concentration in the surface portion 101a is preferably higher than that in the projection 103.

In this specification and the like, the region where impurities are unevenly distributed in the positive electrode active material 101, e.g., the embedded portions 102 and the projection 103, refers to a region having a different composition from the positive electrode active material 101. A crystal structure may differ between the positive electrode active material 101 and the region where impurities are unevenly distributed. For example, the positive electrode active material 101 may have a layered rock-salt crystal structure, and the region where impurities are unevenly distributed may have a rock-salt crystal structure, a spinel crystal structure, a rutile crystal structure, an anatase crystal structure, or a perovskite crystal structure. The region where impurities are unevenly distributed may be amorphous. The region can be determined to have a different composition or different crystal structure from the positive electrode active material 101 by a variety of analysis such as EDX, cross-sectional TEM, surface SEM, and electron diffraction.

In addition, the embedded portions 102 and the projection 103 preferably have higher dielectric constants than the surface portion 101a and the inner portion 101b. For example, a high dielectric constant of the projection 103 results in polarization of the projection 103 at the time of charging and discharging. This facilitates the movement of lithium ions, which are positive ions, to the interface between the surface portion 101a and the surface of the projection 103 on the negative electrode side that is negatively charged, increasing the speed of the insertion/extraction reaction of lithium ions. Thus, the use of the positive electrode active material 101 for a secondary battery is preferable, in which case the rate performance is improved.

For example, the embedded portions 102 and the projection 103 preferably contain a magnesium-titanium oxide because the dielectric constant thereof is higher than that of lithium cobalt oxide, in some cases.

Lithium, a transition metal, and oxygen, which are not impurities, are preferably distributed uniformly in the positive electrode active material 101. In this specification and the like, the term "uniformly" can mean "substantially uniformly"; thus, a difference in element concentration can be 10% or less, for example.

Although FIGS. 2A and 2B and FIGS. 3A to 3C illustrate the embedded portions 102 and the projection 103 as the regions where impurities are unevenly distributed, the region where impurities are unevenly distributed in the positive electrode active material 101 of one embodiment of the present invention is not limited thereto. The region has a different composition from the positive electrode active material 101, and its shape is not limited to an embedded portion or a bump.

Refer to the description of FIGS. 1A and 1B for the impurity concentration gradient and the like of the surface portion 101a of the positive electrode active material 101 in FIGS. 2A and 2B and FIGS. 3A to 3C.

<Crystal Structure>

A material with a layered rock-salt crystal structure, such as lithium cobalt oxide ($LiCoO_2$), is known to have a high discharge capacity and excel as a positive electrode active material of a secondary battery. An example of a material with a layered rock-salt crystal structure includes a composite oxide represented by $LiMO_2$.

It is known that the Jahn-Teller effect in a transition metal compound varies in degree according to the number of electrons in the d orbital of the transition metal.

In a compound containing nickel, distortion is likely to be caused because of the Jahn-Teller effect in some cases. Accordingly, when high-voltage charging and discharging are performed on $LiNiO_2$, the crystal structure might be disordered because of the distortion. The influence of the Jahn-Teller effect is suggested to be small in $LiCoO_2$; hence, $LiCoO_2$ is preferable because the resistance to high-voltage charging and discharging is higher in some cases.

Figure 4:
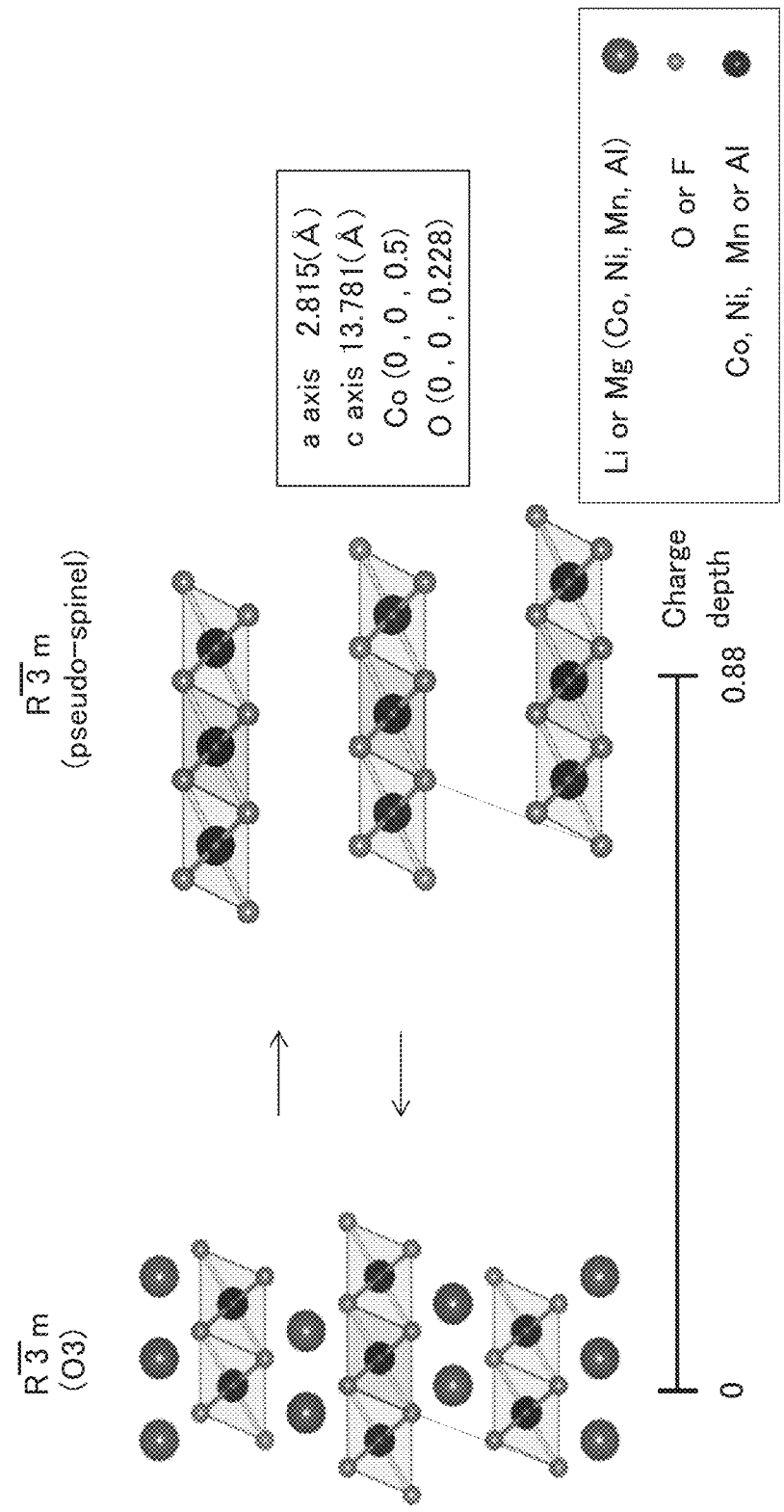
FIG. 4 shows a charge depth and crystal structures of a positive electrode active material.
Figure 5:
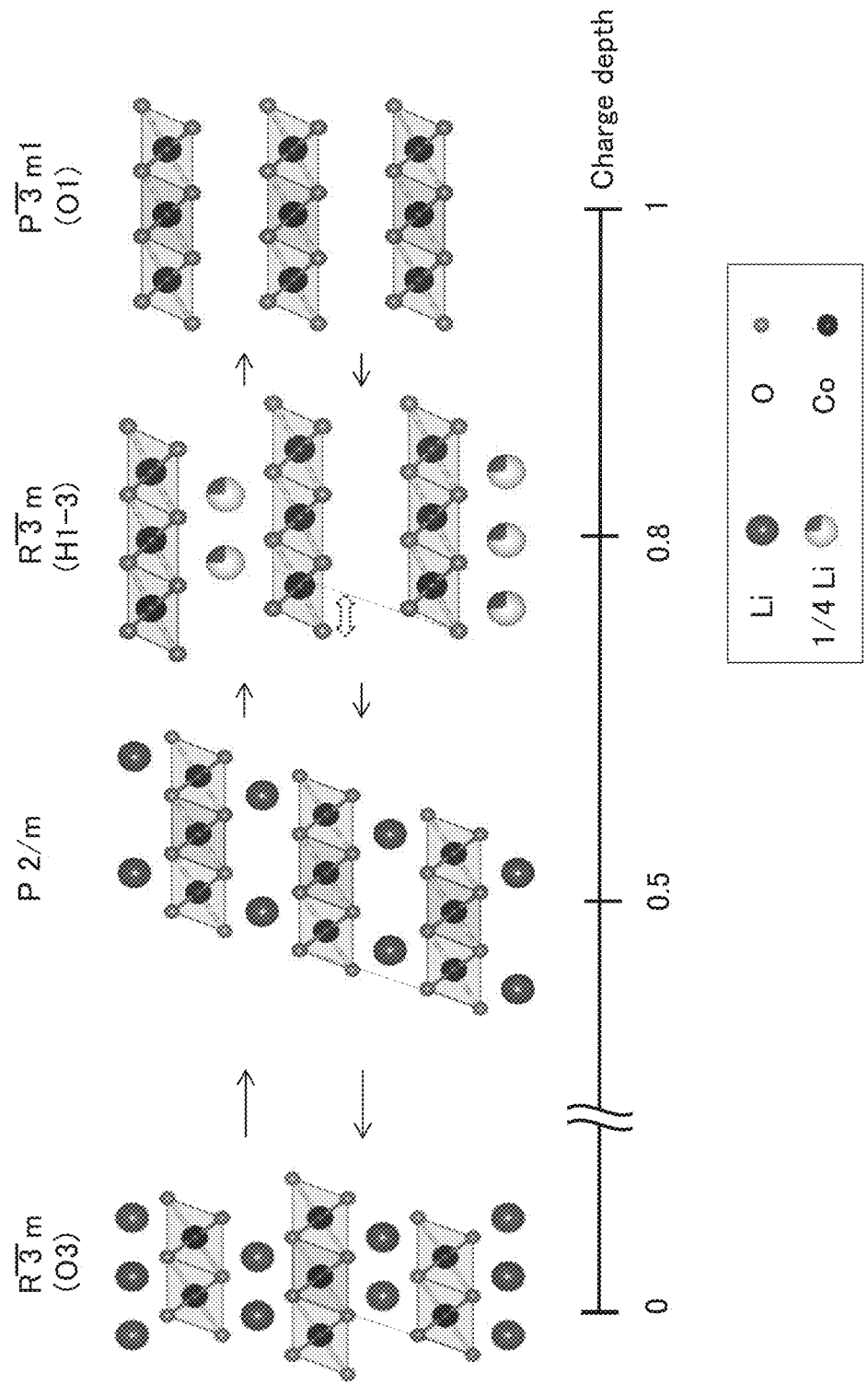
FIG. 5 shows a charge depth and crystal structures of a comparative positive electrode active material.

Positive electrode active materials are described with reference to FIG. 4 and FIG. 5. In FIG. 4 and FIG. 5, the case where cobalt is used as the transition metal M contained in the positive electrode active material is described.

<Conventional Positive Electrode Active Material>

A positive electrode active material shown in FIG. 5 is lithium cobalt oxide ($LiCoO_2$) to which halogen and magnesium are not added in a formation method described later. As described in Non-Patent Documents 1 and 2 and the like, the crystal structure of the lithium cobalt oxide shown in FIG. 5 changes with the charge depth.

As shown in FIG. 5, the lithium cobalt oxide with a charge depth of 0 (in a discharged state) includes a region having the crystal structure with the space group R-3m, and includes three $CoO_2$ layers in a unit cell. Thus, this crystal structure is referred to as an O3 type structure in some cases. Note that here, the $CoO_2$ layer has a structure in which an octahedral structure with cobalt coordinated to six oxygen atoms continues on a plane in an edge-shared state.

Lithium cobalt oxide with a charge depth of 1 has the crystal structure with the space group P-3m1 and includes one $CoO_2$ layer in a unit cell. Hence, this crystal structure is referred to as an O1 type structure in some cases.

Lithium cobalt oxide with a charge depth of approximately 0.88 has the crystal structure with the space group R-3m. This structure can also be regarded as a structure in which $CoO_2$ structures such as P-3m1 (O1) and $LiCoO_2$ structures such as R-3m (O3) are alternately stacked. Thus, this crystal structure is referred to as an H1-3 type structure in some cases. Note that the number of cobalt atoms per unit cell in the actual H1-3 type structure is twice that in other structures. However, in this specification including FIG. 5, the c-axis of the H1-3 type structure is half that of the unit cell for easy comparison with the other structures.

For the H1-3 type structure, as disclosed in Non-Patent Document 3, the coordinates of cobalt and oxygen in the unit cell can be expressed as follows, for example: Co (0, 0, 0.42150±0.00016), $O_1$ (0, 0, 0.27671±0.00045), and $O_2$ (0, 0, 0.11535±0.00045). Note that $O_1$ and $O_2$ are each an oxygen atom. In this manner, the H1-3 type structure is represented by a unit cell including one cobalt and two oxygen. Meanwhile, the pseudo-spinel crystal structure of one embodiment of the present invention is preferably represented by a unit cell including one cobalt and one oxygen, as described later. This means that the symmetry of cobalt and oxygen differs between the pseudo-spinel structure and the H1-3 type structure, and the amount of change from the 03 structure is smaller in the pseudo-spinel structure than in the H1-3 type structure. A preferred unit cell for representing a crystal structure in a positive electrode active material is selected such that the value of goodness of fit (GOF) is smaller in Rietveld analysis of XRD patterns, for example.

When charging with a high voltage of 4.6 V or higher based on the redox potential of a lithium metal or charging with a large charge depth of 0.8 or more and discharging are repeated, the crystal structure of lithium cobalt oxide changes (i.e., an unbalanced phase change occurs) repeatedly between the H1-3 type structure and the R-3m (O3) structure in a discharged state.

However, there is a large difference in the positions of the $CoO_2$ layers between these two crystal structures. As indicated by the dotted lines and the arrows in FIG. 5, the $CoO_2$ layer in the H1-3 type structure largely shifts from that in the R-3m (O3) structure. Such a dynamic structural change can adversely affect the stability of the crystal structure.

A difference in volume is also large. The H1-3 type structure and the O3 type structure in a discharged state that contain the same number of cobalt atoms have a difference in volume of 3.0% or more.

In addition, a structure in which $CoO_2$ layers are arranged continuously, such as P-3 ml (O1), included in the H1-3 type structure is highly likely to be unstable.

Accordingly, the repeated high-voltage charging and discharging gradually break the crystal structure of lithium cobalt oxide. The broken crystal structure triggers deterioration of the cycling performance. This is probably because the broken crystal structure has a smaller number of sites where lithium can exist stably and makes it difficult to insert and extract lithium.

<Positive Electrode Active Material of One Embodiment of the Present Invention>
<<Inner Portion>>

In the positive electrode active material 101 of one embodiment of the present invention, the difference in the positions of $CoO_2$ layers can be small in repeated charging and discharging at a high voltage. Furthermore, the change in the volume can be small. Accordingly, the positive electrode active material of one embodiment of the present invention can achieve excellent cycling performance. In addition, the positive electrode active material of one embodiment of the present invention can have a stable crystal structure in a high-voltage charged state. Thus, in the positive electrode active material of one embodiment of the present invention, a short circuit is less likely to occur while the high-voltage charged state is maintained. This is preferable because the safety is further improved.

The positive electrode active material of one embodiment of the present invention has a small crystal-structure change and a small volume difference per the same number of transition metal atoms between a sufficiently discharged state and a high-voltage charged state.

FIG. 4 shows crystal structures of the positive electrode active material 101 before and after charging and discharging. The positive electrode active material 101 is a composite oxide containing lithium, cobalt as the transition metal M, and oxygen. In addition to the above elements, the positive electrode active material 101 preferably contains magnesium as an impurity. The positive electrode active material 101 preferably contains halogen such as fluorine or chlorine as the impurity.

The crystal structure with a charge depth of 0 (in a discharged state) in FIG. 4 is R-3m (O3) in FIG. 5. Meanwhile, the positive electrode active material 101 with a charge depth in a sufficiently charged state includes a crystal whose structure is different from the H1-3 type structure. This structure belongs to the space group R-3m, and is not a spinel crystal structure but a structure in which an ion of cobalt, magnesium, or the like is coordinated to six oxygen atoms and the cation arrangement has symmetry similar to that of the spinel crystal structure. This structure is thus referred to as a pseudo-spinel crystal structure in this specification and the like. Although lithium is not shown in the pseudo-spinel crystal structure in FIG. 4 to show the symmetry of cobalt atoms and the symmetry of oxygen atoms, lithium of 20 atomic % or less, for example, with respect to cobalt practically exists between the $CoO_2$ layers. In both the O3 type structure and the pseudo-spinel crystal structure, a slight amount of magnesium preferably exists between the $CoO_2$ layers, i.e., in lithium sites. In addition, a slight amount of halogen such as fluorine preferably exists at random in oxygen sites.

Note that in the pseudo-spinel crystal structure, a light element such as lithium is sometimes coordinated to four oxygen atoms. In that case, the ion arrangement also has symmetry similar to that of the spinel crystal structure.

The pseudo-spinel crystal structure can be regarded as a crystal structure that contains Li between layers randomly and is similar to the $CdCl_2$ crystal structure. The crystal structure similar to the $CdCl_2$ crystal structure is close to a crystal structure of lithium nickel oxide ($Li_{0.06}NiO_2$) that is charged until the charge depth reaches 0.94; however, pure lithium cobalt oxide or a layered rock-salt positive electrode active material containing a large amount of cobalt is known not to have such a crystal structure generally.

In the positive electrode active material 101 of one embodiment of the present invention, a change in the crystal structure caused by extraction of a large amount of lithium during high-voltage charging is smaller than that in the conventional positive electrode active material. As indicated by the dotted lines in FIG. 4, for example, there is little difference in the positions of the $CoO_2$ layers in the crystal structures.

Specifically, the structure of the positive electrode active material 101 of one embodiment of the present invention is highly stable even when a charge voltage is high. For example, at a voltage of approximately 4.6 V with reference to the potential of lithium metal, the conventional positive electrode active material has the H1-3 type structure. Meanwhile, at a charge voltage of approximately 4.6 V, the R-3m (O3) crystal structure can be maintained in the positive electrode active material 101 of one embodiment of the present invention. Moreover, in a higher charge voltage region, for example, at voltages of approximately 4.65 V to 4.7 V with reference to the potential of lithium metal, the pseudo-spinel crystal structure can be obtained. At a much higher charge voltage, the H1-3 type structure is eventually observed in some cases. In the case where graphite, for instance, is used as a negative electrode active material in a secondary battery, when the voltage of the secondary battery ranges from 4.3 V to 4.5 V, for example, the R-3m (O3) crystal structure can be maintained. In a higher charge voltage region, for example, at voltages of 4.35 V to 4.55 V with reference to the potential of lithium metal, the pseudo-spinel crystal structure can be obtained.

Thus, in the positive electrode active material 101 of one embodiment of the present invention, the crystal structure is less likely to be disordered even when charging and discharging are repeated at a high voltage.

Note that in the unit cell of the pseudo-spinel crystal structure, the coordinates of cobalt and oxygen can be represented by (0, 0, 0.5) and (0, 0, x), respectively, within the range of $0.20 \leq x \leq 0.25$.

A slight amount of impurities such as magnesium randomly existing between the $CoO_2$ layers, i.e., in lithium sites can reduce a difference in the positions of the $CoO_2$ layers in high-voltage charging. Thus, magnesium between the $CoO_2$ layers makes it easier to obtain the pseudo-spinel crystal structure. Therefore, magnesium is preferably distributed over the particle of the positive electrode active material 101 of one embodiment of the present invention. To distribute magnesium over the particle, heat treatment is preferably performed in the formation process of the positive electrode active material 101 of one embodiment of the present invention.

However, heat treatment at excessively high temperature may cause cation mixing, which increases the possibility of entry of impurities such as magnesium into the cobalt sites. Magnesium in the cobalt sites eliminates the effect of maintaining the R-3m structure in high-voltage charging. Furthermore, heat treatment at excessively high temperature might have an adverse effect; for example, cobalt might be reduced to have a valence of two or lithium might be evaporated.

In view of the above, a halogen compound such as a fluorine compound is preferably added to lithium cobalt oxide before the heat treatment for distributing magnesium over the particle. The addition of the halogen compound decreases the melting point of lithium cobalt oxide. The decreased melting point makes it easier to distribute magnesium over the particle at a temperature at which the cation mixing is unlikely to occur. Furthermore, the fluorine compound probably increases corrosion resistance to hydrofluoric acid generated by decomposition of an electrolyte solution.

When the magnesium concentration is higher than a predetermined value, the effect of stabilizing a crystal structure becomes small in some cases. This is probably because magnesium enters the cobalt sites in addition to the lithium sites. The number of magnesium atoms in the positive electrode active material of one embodiment of the present invention is preferably 0.001 to 0.1 times, further preferably larger than 0.01 times and less than 0.04 times, still further preferably approximately 0.02 times the number of atoms of the transition metal M. The magnesium concentration described here may be a value obtained by element analysis on the entire particle of the positive electrode active material using inductively coupled plasma mass spectrometry (ICP-MS) or the like, or may be a value based on the ratio of the raw materials mixed in the process of forming the positive electrode active material, for example.

To lithium cobalt oxide, as a metal other than cobalt (hereinafter, the metal Z), one or more metals selected from nickel, aluminum, manganese, titanium, vanadium, and chromium may be added, for example, and in particular, at least one of nickel and aluminum is preferably added. In some cases, manganese, titanium, vanadium, and chromium are likely to have a valence of four stably and thus contribute highly to a stable structure. The addition of the metal Z may enable the positive electrode active material of one embodiment of the present invention to have a more stable crystal structure in high-voltage charging, for example. Here, in the positive electrode active material of one embodiment of the present invention, the metal Z is preferably added at a concentration at which the crystallinity of the lithium cobalt oxide is not greatly changed. For example, the metal Z is preferably added at an amount with which the aforementioned Jahn-Teller effect is not exhibited.

As shown in the legend in FIG. 4, aluminum and transition metals typified by nickel and manganese preferably exist in cobalt sites, but some of them may exist in lithium sites. Magnesium preferably exists in lithium sites. Fluorine may be substituted for part of oxygen.

As the magnesium concentration in the positive electrode active material of one embodiment of the present invention increases, the capacity of the positive electrode active material decreases in some cases. As an example, one possible reason is that the amount of lithium that contributes to charging and discharging decreases when magnesium enters the lithium sites. Another possible reason is that excess magnesium generates a magnesium compound that does not contribute to charging and discharging. When the positive electrode active material of one embodiment of the present invention contains nickel as the metal Z in addition to magnesium, the capacity per weight and per volume can be increased in some cases. When the positive electrode active material of one embodiment of the present invention contains aluminum as the metal Z in addition to magnesium, the capacity per weight and per volume can be increased in some cases. When the positive electrode active material of one embodiment of the present invention contains nickel and aluminum in addition to magnesium, the capacity per weight and per volume can be increased in some cases.

The concentrations of the elements, such as magnesium and the metal Z, contained in the positive electrode active material of one embodiment of the present invention are described below using the number of atoms.

The number of nickel atoms in the positive electrode active material of one embodiment of the present invention is preferably 7.5% or less, further preferably 0.05% to 4%, still further preferably 0.1% to 2% of the number of cobalt atoms. The nickel concentration described here may be a value obtained by element analysis on the entire particle of the positive electrode active material using ICP-MS or the like, or may be a value based on the ratio of the raw materials mixed in the process of forming the positive electrode active material, for example.

The number of aluminum atoms in the positive electrode active material of one embodiment of the present invention is preferably 0.05% to 4%, further preferably 0.1% to 2% of the number of cobalt atoms. The aluminum concentration described here may be a value obtained by element analysis on the entire particle of the positive electrode active material using ICP-MS or the like, or may be a value based on the ratio of the raw materials mixed in the process of forming the positive electrode active material, for example.

It is preferable that the positive electrode active material of one embodiment of the present invention contain an element X, and phosphorus be used as the element X. The positive electrode active material of one embodiment of the present invention further preferably includes a compound containing phosphorus and oxygen.

When the positive electrode active material of one embodiment of the present invention includes a compound containing the element X, a short circuit is less likely to occur while the high-voltage charged state is maintained in some cases.

When the positive electrode active material of one embodiment of the present invention contains phosphorus as the element X, phosphorus may react with hydrogen fluoride generated by the decomposition of the electrolyte solution, which might decrease the hydrogen fluoride concentration in the electrolyte solution.

In the case where the electrolyte solution contains $LiPF_6$, hydrogen fluoride may be generated by hydrolysis. In some cases, hydrogen fluoride is generated by the reaction of PVDF used as a component of the positive electrode and alkali. The decrease in hydrogen fluoride concentration in the electrolyte solution may inhibit corrosion and coating film separation of a current collector or may inhibit a reduction in adhesion properties due to gelling or insolubilization of PVDF.

When containing magnesium in addition to the element X, the positive electrode active material of one embodiment of the present invention is extremely stable in the high-voltage charged state. When the element X is phosphorus, the number of phosphorus atoms is preferably 1% or more and 20% or less, further preferably 2% or more and 10% or less, still further preferably 3% or more and 8% or less of the number of cobalt atoms. In addition, the number of magnesium atoms is preferably 0.1% or more and 10% or less, further preferably 0.5% or more and 5% or less, still further preferably 0.7% or more and 4% or less of the number of cobalt atoms. The phosphorus concentration and the magnesium concentration described here may each be a value obtained by element analysis on the entire particle of the positive electrode active material using inductively coupled plasma mass spectrometry (ICP-MS) or the like, or may be a value based on the ratio of the raw materials mixed in the process of forming the positive electrode active material, for example.

In the case where the positive electrode active material has a crack, phosphorus, more specifically, a compound containing phosphorus and oxygen, in the inner portion of the crack may inhibit crack development, for example.

<<Surface Portion 101a>>

It is preferable that magnesium be distributed over the particle of the positive electrode active material 101 of one embodiment of the present invention, and it is further preferable that the magnesium concentration in the surface portion 101a be higher than the average magnesium concentration in the whole particle. For example, the magnesium concentration in the surface portion 101a measured by X-ray photoelectron spectroscopy (XPS) or the like is preferably higher than the average magnesium concentration in the whole particle measured by ICP-MS or the like.

In the case where the positive electrode active material 101 of one embodiment of the present invention contains an element other than cobalt, for example, one or more metals selected from nickel, aluminum, manganese, iron, and chromium, the concentration of the metal in the surface portion 101a is preferably higher than the average concentration of the metal in the whole particle. For example, the concentration of the element other than cobalt in the surface portion 101a measured by XPS or the like is preferably higher than the average concentration of the element in the whole particle measured by ICP-MS or the like.

The entire surface of the particle is a kind of crystal defects and lithium is extracted from the surface during charging; thus, the lithium concentration in the surface of the particle tends to be lower than that in the inner portion. Therefore, the surface of the particle tends to be unstable and its crystal structure is likely to be broken. The higher the magnesium concentration in the surface portion 101a is, the more effectively the change in the crystal structure can be reduced. In addition, a high magnesium concentration in the surface portion 101a probably increases the corrosion resistance to hydrofluoric acid generated by the decomposition of the electrolyte solution.

The concentration of halogen such as fluorine in the surface portion 101a of the positive electrode active material 101 of one embodiment of the present invention is preferably higher than the average concentration in the whole particle. When halogen exists in the surface portion 101a, which is in contact with the electrolyte solution, the corrosion resistance to hydrofluoric acid can be effectively increased.

As described above, the surface portion 101a of the positive electrode active material 101 of one embodiment of the present invention preferably has a composition different from that in the inner portion, i.e., the concentrations of impurities such as magnesium and fluorine are higher than that in the inner portion 101b. The composition preferably has a crystal structure stable at normal temperature. Accordingly, the surface portion 101a may have a crystal structure different from that of the inner portion 101b. For example, at least part of the surface portion 101a of the positive electrode active material 101 of one embodiment of the present invention may have a rock-salt crystal structure. When the surface portion 101a and the inner portion 101b have different crystal structures, the orientations of crystals in the surface portion 101a and the inner portion 101b are preferably substantially aligned with each other.

When the orientations of crystals in the surface portion 101a and the inner portion 101b are substantially aligned with each other, the surface portion 101a and the inner portion 101b are stably bonded to each other. Thus, the use of the positive electrode active material 101 for a secondary battery can effectively suppress a change in the crystal structure of the inner portion 101b caused by charging and discharging. Even when lithium is extracted from the inner portion 101b by charging, the surface portion 101a stably bonded to the inner portion 101b can inhibit extraction of cobalt and/or oxygen from the inner portion 101b. Furthermore, a chemically stable material can be used for a region in contact with the electrolyte solution. Thus, a secondary battery having excellent cycling performance can be provided.

However, in the surface portion 101a where only MgO is contained or MgO and CoO(II) form a solid solution, it is difficult to insert and extract lithium. Thus, the surface portion 101a should contain at least cobalt, and also contain lithium in a discharged state to have the path through which lithium is inserted and extracted. The cobalt concentration is preferably higher than the magnesium concentration.

The element X is preferably positioned on the surface portion 101a of the particle in the positive electrode active material 101 of one embodiment of the present invention. For example, the positive electrode active material 101 of one embodiment of the present invention may be covered with a coating film containing the element X.

<<Grain Boundary>>

A slight amount of impurities contained in the positive electrode active material 101 of one embodiment of the present invention may randomly exist in the inner portion, but part of the impurities is preferably segregated at the grain boundary.

In other words, the impurity concentration in the crystal grain boundary and its vicinity of the positive electrode active material 101 of one embodiment of the present invention is preferably higher than that in the other regions in the inner portion.

Like the surface of the particle, the crystal grain boundary is also plane defects, and thus tends to be unstable and start varying in the crystal structure. Thus, the higher the magnesium concentration in the crystal grain boundary and its vicinity is, the more effectively the change in the crystal structure can be reduced.

Even when a crack is generated along the crystal grain boundary of the particle of the positive electrode active material 101 of one embodiment of the present invention, high impurity concentrations in the crystal grain boundary and its vicinity increase the impurity concentrations in the vicinity of the surface generated by the crack. Thus, the positive electrode active material including a crack can also have an increased corrosion resistance to hydrofluoric acid.

Note that in this specification and the like, the vicinity of the crystal grain boundary refers to a region of approximately 10 nm from the grain boundary.

<<Particle Diameter>>

When the particle diameter of the positive electrode active material 101 of one embodiment of the present invention is too large, there are problems such as difficulty in lithium diffusion and large surface roughness of an active material layer at the time when the material is applied to a current collector. By contrast, too small a particle diameter causes problems such as difficulty in supporting the active material layer at the time when the material is applied to the current collector and overreaction with the electrolyte solution. Therefore, the average particle diameter (D50, also referred to as median diameter) ranges preferably from 1 μm to 100 μm, further preferably from 2 μm to 40 μm, still further preferably from 5 μm to 30 μm.

<Analysis Method>

Whether or not a given positive electrode active material is the positive electrode active material 101 of one embodiment of the present invention, which has the pseudo-spinel crystal structure when charged with a high voltage, can be judged by analyzing a high-voltage charged positive electrode by XRD, electron diffraction, neutron diffraction, electron spin resonance (ESR), nuclear magnetic resonance (NMR), or the like. The XRD is particularly preferable because the symmetry of a transition metal such as cobalt in the positive electrode active material can be analyzed with high resolution, comparison of the degree of crystallinity and comparison of the crystal orientation can be performed, distortion of lattice arrangement and the crystallite size can be analyzed, and a positive electrode obtained only by disassembling a secondary battery can be measured with sufficient accuracy, for example.

As described above, the positive electrode active material 101 of one embodiment of the present invention features in a small change in the crystal structure between a high-voltage charged state and a discharged state. A material in which 50 wt % or more of the crystal structure largely changes between a high-voltage charged state and a discharged state is not preferable because the material cannot withstand high-voltage charging and discharging. It should be noted that the intended crystal structure is not obtained in some cases only by addition of an impurity element. For example, in a high-voltage charged state, lithium cobalt oxide containing magnesium and fluorine has the pseudo-spinel crystal structure at 60 wt % or more in some cases, and has the H1-3 type structure at 50 wt % or more in other cases. In some cases, lithium cobalt oxide containing magnesium and fluorine may have the pseudo-spinel crystal structure at almost 100 wt % in charging at a predetermined voltage, and charging at a voltage higher than the predetermined voltage may cause the H1-3 type structure. Thus, to determine whether or not a positive electrode active material is the positive electrode active material 101 of one embodiment of the present invention, the crystal structure should be analyzed by XRD and other methods.

However, the crystal structure of a positive electrode active material in a high-voltage charged state or a discharged state may be changed with exposure to air. For example, the pseudo-spinel crystal structure changes into the H1-3 type structure in some cases. For that reason, all samples are preferably handled in an inert atmosphere such as an argon atmosphere.

<<Charging Method>>

High-voltage charging for determining whether or not a composite oxide is the positive electrode active material 101 of one embodiment of the present invention can be performed on a CR2032 coin cell (with a diameter of 20 mm and a height of 3.2 mm) with a lithium counter electrode, for example.

More specifically, a positive electrode can be formed by application of a slurry in which the positive electrode active material, a conductive additive, and a binder are mixed to a positive electrode current collector made of aluminum foil.

A lithium metal can be used for a counter electrode. Note that when the counter electrode is formed using a material other than the lithium metal, the potential of a secondary battery differs from the potential of the positive electrode. Unless otherwise specified, the voltage and the potential in this specification and the like refer to the potential of a positive electrode.

As an electrolyte contained in an electrolyte solution, 1 mol/L lithium hexafluorophosphate ($LiPF_6$) can be used. As the electrolyte solution, a solution in which ethylene carbonate (EC) and diethyl carbonate (DEC) at a volume ratio of 3:7 and vinylene carbonate (VC) at 2 wt % are mixed can be used.

As a separator, 25-μm-thick polypropylene can be used.

Stainless steel (SUS) can be used for a positive electrode can and a negative electrode can.

The coin cell formed under the above conditions is subjected to constant current charging at 4.6 V and 0.5 C and then subjected to constant voltage charging until the current value reaches 0.01 C. Here, 1 C is set to 137 mA/g, and the temperature is set to 25° C. After the charging is performed in this manner, the coin cell is disassembled in a glove box with an argon atmosphere to take out the positive electrode, whereby the high-voltage charged positive electrode active material can be obtained. In order to inhibit reaction with components in the external environment, the taken positive electrode active material is preferably enclosed in an argon atmosphere in performing various analyses later. For example, XRD can be performed on the positive electrode active material enclosed in an airtight container with an argon atmosphere.

<<XRD>>

Figure 6:
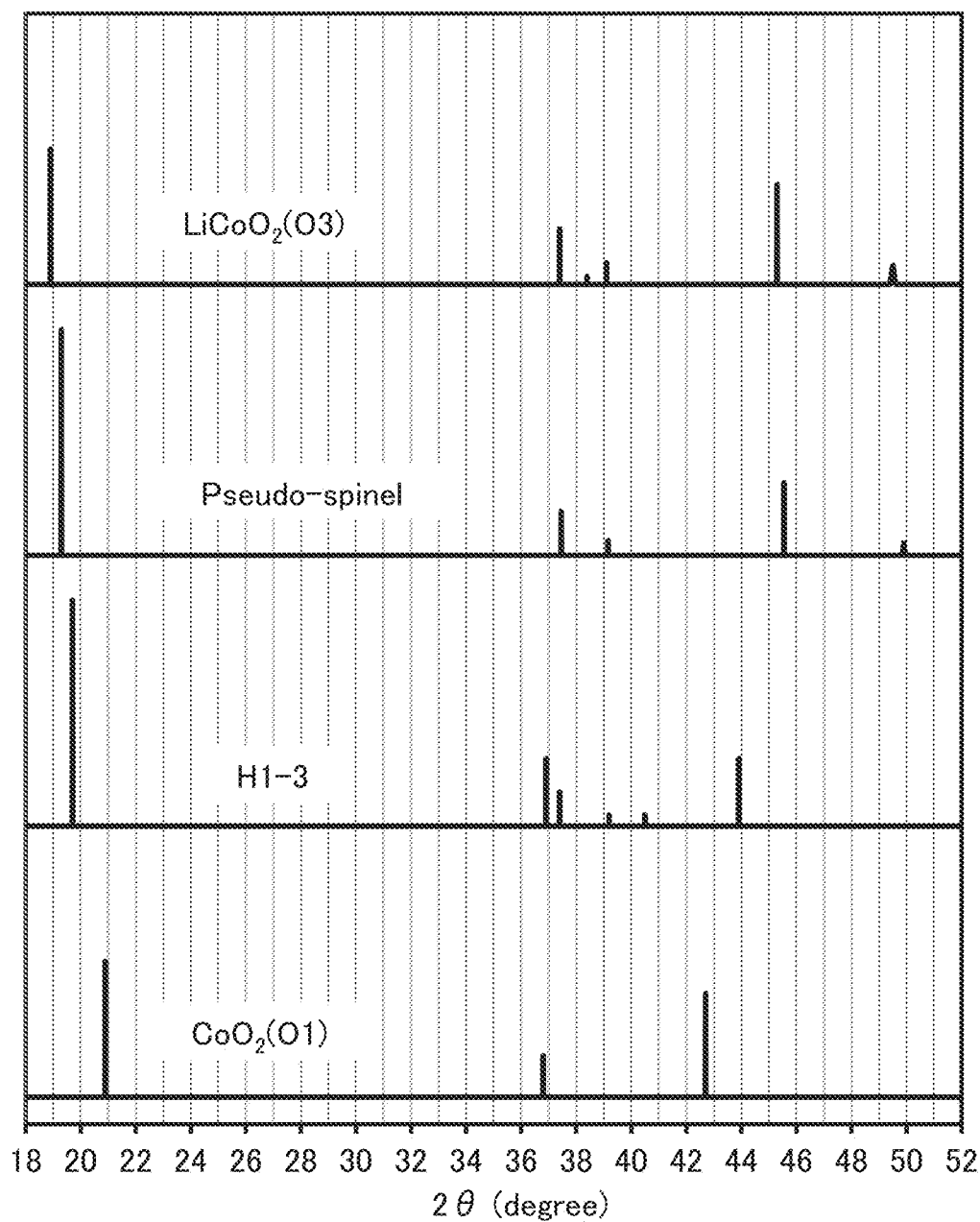
FIG. 6 shows XRD patterns calculated from crystal structures.

FIG. 6 shows ideal powder XRD patterns with a CuKα1 ray that are calculated from models of the pseudo-spinel crystal structure and the H1-3 type structure. For comparison, FIG. 6 also shows ideal XRD patterns calculated from the crystal structure of $LiCoO_2$ (O3) with a charge depth of 0 and the crystal structure of $CoO_2$ (O1) with a charge depth of 1. Note that the patterns of $LiCoO_2$ (O3) and $CoO_2$ (O1) are made from crystal structure data obtained from ICSD (see Non-Patent Document 5) with Reflex Powder Diffraction, which is a module of Materials Studio (BIOVIA). The range of 2θ is from 15° to 75°, the step size is 0.01, the wavelength λ1 is $1.540562 \times 10^{-10}$ m, the wavelength λ2 is not set, and a single monochromator is used. The pattern of the H1-3 type structure is similarly made from the crystal structure data disclosed in Non-Patent Document 3. The pseudo-spinel crystal structure is estimated from the XRD pattern of the positive electrode active material of one embodiment of the present invention, the crystal structure is fitted with TOPAS Version 3 (crystal structure analysis software manufactured by Bruker Corporation), and the XRD pattern of the pseudo-spinel crystal structure is made in a similar manner to other structures.

As shown in FIG. 6, the pseudo-spinel crystal structure has diffraction peaks at 2θ of 19.30±0.20° (greater than or equal to 19.10° and less than or equal to 19.50°) and 2θ of 45.55±0.10° (greater than or equal to 45.45° and less than or equal to 45.65°). More specifically, the pseudo-spinel crystal structure has sharp diffraction peaks at 2θ of 19.30±0.10° (greater than or equal to 19.20° and less than or equal to 19.40°) and 2θ of 45.55±0.05° (greater than or equal to 45.50° and less than or equal to 45.60°). However, the H1-3 type structure and $CoO_2$ (P-3 ml, O1) do not have peaks at these positions. Thus, the peaks at 2θ of 19.30±0.20° and 2θ of 45.55±0.10° in the high-voltage charged state can be the features of the positive electrode active material 101 of one embodiment of the present invention.

It can be said that the positions of the XRD diffraction peaks in the crystal structure with a charge depth of 0 are close to those of the XRD diffraction peaks in the crystal structure in the high-voltage charged state. More specifically, a difference in the positions of two or more, preferably three or more of the main diffraction peaks between the crystal structures is 2θ=0.7 or less, preferably 2θ=0.5 or less.

Although the high-voltage charged positive electrode active material 101 of one embodiment of the present invention has the pseudo-spinel crystal structure, not all the particles necessarily have the pseudo-spinel crystal structure. Some of the particles may have another crystal structure or be amorphous. Note that when the XRD patterns are subjected to the Rietveld analysis, the pseudo-spinel crystal structure preferably accounts for more than or equal to 50 wt %, further preferably more than or equal to 60 wt %, and still further preferably more than or equal to 66 wt % of the positive electrode active material. The positive electrode active material in which the pseudo-spinel crystal structure accounts for more than or equal to 50 wt %, preferably more than or equal to 60 wt %, and further preferably more than or equal to 66 wt % can have sufficiently good cycling performance.

Furthermore, even after 100 or more cycles of charging and discharging, the pseudo-spinel crystal structure preferably accounts for more than or equal to 35 wt %, further preferably more than or equal to 40 wt %, and still further preferably more than or equal to 43 wt %, in the Rietveld analysis.

The crystallite size of the pseudo-spinel crystal structure of the positive electrode active material particle is decreased to approximately one-tenth that of $LiCoO_2$ (O3) in a discharged state. Thus, the peak of the pseudo-spinel crystal structure can be clearly observed after the high-voltage charging even under the same XRD measurement conditions as those of a positive electrode before charging and discharging. By contrast, simple $LiCoO_2$ has a small crystallite size and a broad and small peak although it can partly have a structure similar to the pseudo-spinel crystal structure. The crystallite size can be calculated from the half width of the XRD peak.

As described above, the influence of the Jahn-Teller effect is preferably small in the positive electrode active material of one embodiment of the present invention. It is preferable that the positive electrode active material of one embodiment of the present invention have a layered rock-salt crystal structure and mainly contain cobalt as a transition metal. The positive electrode active material of one embodiment of the present invention may contain the above-described metal Z in addition to cobalt as long as the influence of the Jahn-Teller effect is small.

The range of the lattice constant where the influence of the Jahn-Teller effect is presumed to be small in the positive electrode active material is examined by XRD analysis.

Figure 7A:
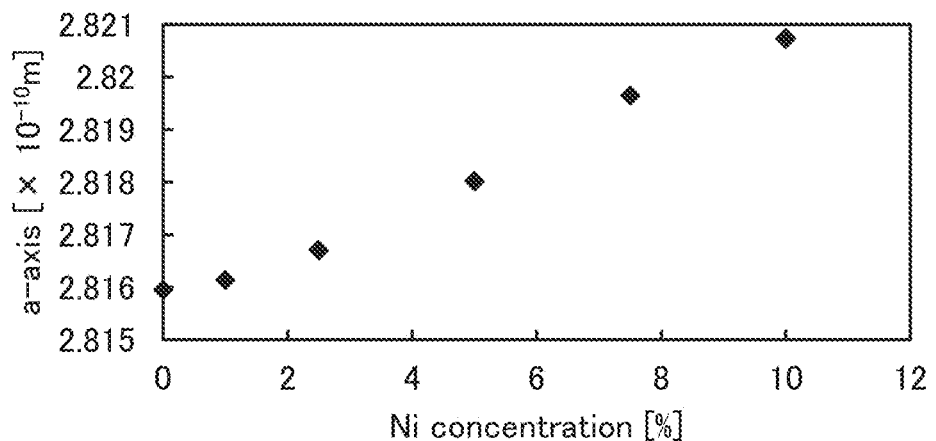
FIGS. 7A to 7C show lattice constants calculated from XRD.
Figure 7B:
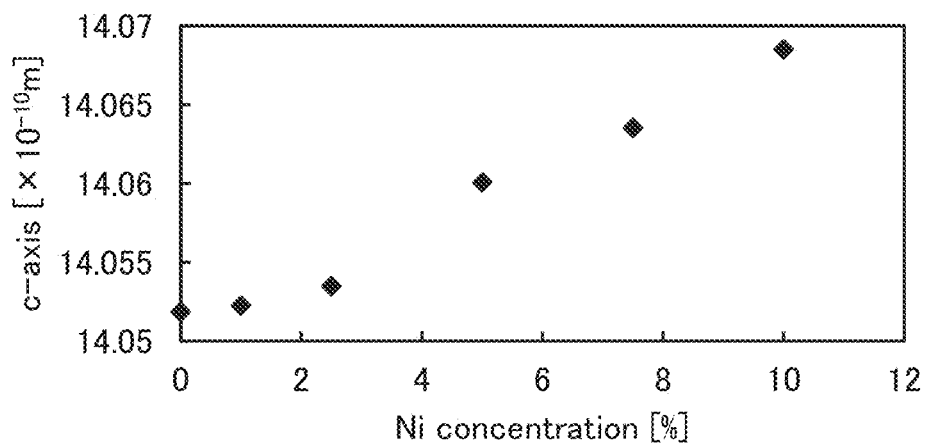
Figure 7C:
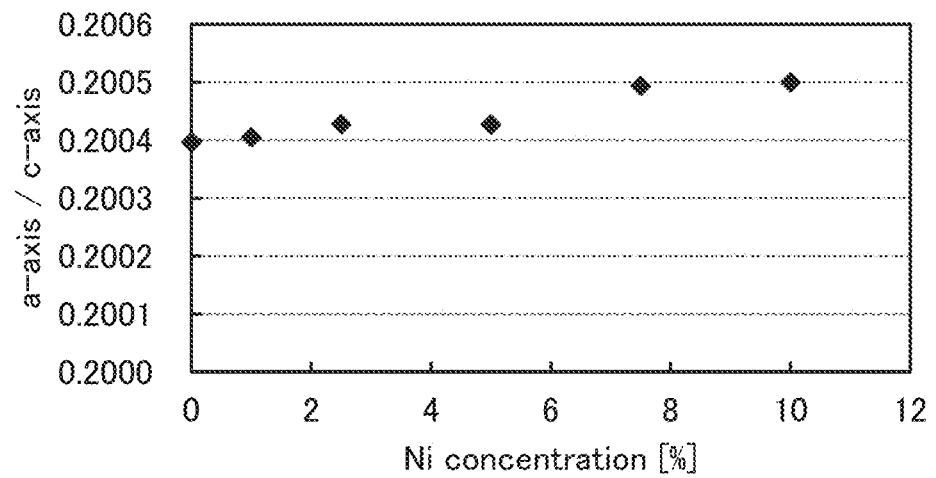

FIGS. 7A to 7C show the estimation results of the lattice constants of the a-axis and the c-axis by XRD in the case where the positive electrode active material of one embodiment of the present invention has a layered rock-salt crystal structure and contains cobalt and nickel. FIG. 7A shows the results of the a-axis, and FIG. 7B shows the results of the c-axis. Note that the XRD patterns of a powder after the synthesis of the positive electrode active material before incorporation into a positive electrode are used for the calculation. The nickel concentration on the horizontal axis represents a nickel concentration with the sum of cobalt atoms and nickel atoms regarded as 100%. A lithium source, a cobalt source, and a nickel source are mixed and then heated to form the positive electrode active material.

Figure 8A:
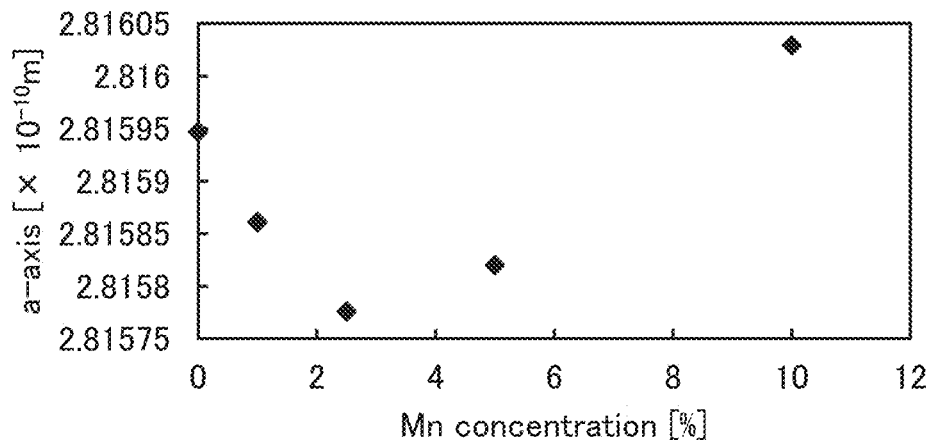
FIGS. 8A to 8C show lattice constants calculated from XRD.
Figure 8B:
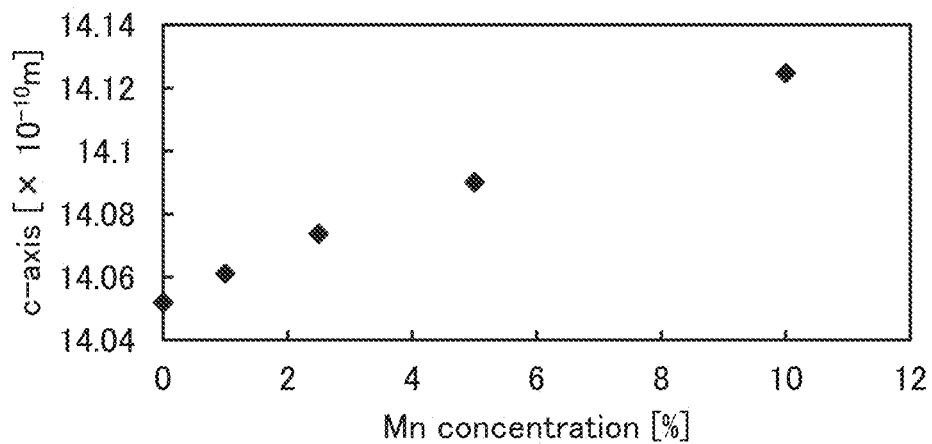
Figure 8C:
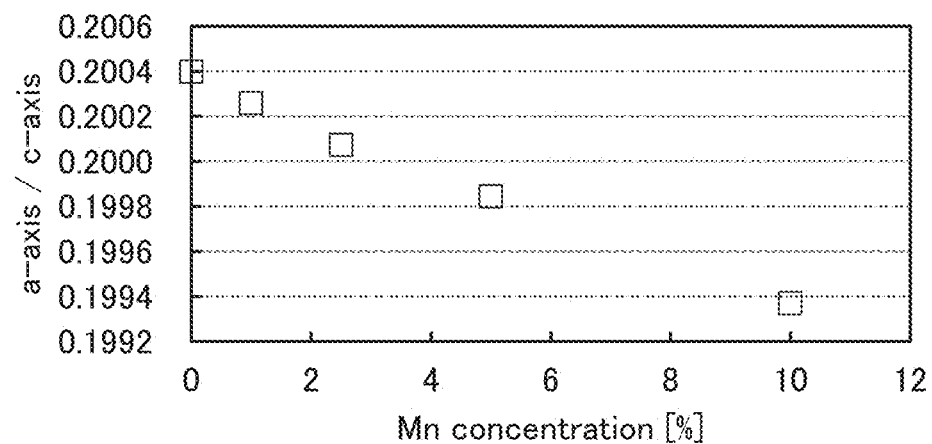

FIGS. 8A to 8C show the estimation results of the lattice constants of the a-axis and the c-axis by XRD in the case where the positive electrode active material of one embodiment of the present invention has a layered rock-salt crystal structure and contains cobalt and manganese. FIG. 8A shows the results of the a-axis, and FIG. 8B shows the results of the c-axis. Note that the XRD patterns of a powder after the synthesis of the positive electrode active material before incorporation into a positive electrode are used for the calculation. The manganese concentration on the horizontal axis represents a manganese concentration with the sum of cobalt atoms and manganese atoms regarded as 100%. A lithium source, a cobalt source, and a manganese source are mixed and then heated to form the positive electrode active material.

FIG. 7C shows values obtained by dividing the lattice constants of the a-axis by the lattice constants of the c-axis (a-axis/c-axis) in the positive electrode active material, whose results of the lattice constants are shown in FIGS. 7A and 7B. FIG. 8C shows values obtained by dividing the lattice constants of the a-axis by the lattice constants of the c-axis (a-axis/c-axis) in the positive electrode active material, whose results of the lattice constants are shown in FIGS. 8A and 8B.

As shown in FIG. 7C, the value of a-axis/c-axis tends to significantly change between nickel concentrations of 5% and 7.5%, indicating that the distortion of the a-axis becomes large. This distortion may be the Jahn-Teller distortion. It is suggested that an excellent positive electrode active material with small Jahn-Teller distortion can be obtained at a nickel concentration lower than 7.5%.

FIG. 8A indicates that the lattice constant changes differently at manganese concentrations of 5% or higher and does not follow the Vegard's law. This suggests that the crystal structure changes at manganese concentrations of 5% or higher. Thus, the manganese concentration is preferably 4% or lower, for example.

Note that the nickel concentration and the manganese concentration in the surface portion 101a of the particle are not limited to the above ranges. In other words, the nickel concentration and the manganese concentration in the surface portion 101a of the particle may be higher than the above concentrations.

Preferable ranges of the lattice constants of the positive electrode active material of one embodiment of the present invention are examined above. In the layered rock-salt crystal structure of the particle of the positive electrode active material in the discharged state or the state where charging and discharging are not performed, which can be estimated from the XRD patterns, the lattice constant of the a-axis is preferably greater than $2.814 \times 10^{-10}$ m and less than $2.817 \times 10^{-10}$ m, and the lattice constant of the c-axis is preferably greater than $14.05 \times 10^{-10}$ m and less than $14.07 \times 10^{-10}$ m. The state where charging and discharging are not performed may be the state of a powder before the formation of a positive electrode of a secondary battery.

Alternatively, in the layered rock-salt crystal structure of the particle of the positive electrode active material in the discharged state or the state where charging and discharging are not performed, the value obtained by dividing the lattice constant of the a-axis by the lattice constant of the c-axis (a-axis/c-axis) is preferably greater than 0.20000 and less than 0.20049.

Alternatively, when the layered rock-salt crystal structure of the particle of the positive electrode active material in the discharged state or the state where charging and discharging are not performed is subjected to XRD analysis, a first peak is observed at 2θ of 18.50° or greater and 19.30° or less, and a second peak is observed at 2θ of 38.00° or greater and 38.800 or less, in some cases.

Note that the peaks appearing in the powder XRD patterns reflect the crystal structure of the inner portion 101b of the positive electrode active material 101, which accounts for the majority of the volume of the positive electrode active material 101. The crystal structure of the surface portion 101a, the embedded portion 102, the projection 103, or the like can be analyzed by electron diffraction of the cross section of the positive electrode active material 101, for example.

<<XPS>>

A region from the surface to a depth of approximately 2 nm to 8 nm (normally, approximately 5 nm) can be analyzed by X-ray photoelectron spectroscopy (XPS); thus, the concentrations of elements in approximately half of the surface portion 101a in the depth direction can be quantitatively analyzed. The bonding states of the elements can be analyzed by narrow scanning. Note that the quantitative accuracy of XPS is approximately ±1 atomic % in many cases. The lower detection limit is approximately 1 atomic % but depends on the element.

When the positive electrode active material 101 of one embodiment of the present invention is subjected to XPS analysis, the number of impurity atoms is preferably greater than or equal to 1.6 times and less than or equal to 6.0 times, further preferably greater than or equal to 1.8 times and less than 4.0 times the number of atoms of the transition metal M. When the impurity is magnesium and the transition metal M is cobalt, the number of magnesium atoms is preferably greater than or equal to 1.6 times and less than or equal to 6.0 times, further preferably greater than or equal to 1.8 times and less than 4.0 times the number of cobalt atoms. The number of atoms of halogen such as fluorine is preferably greater than or equal to 0.2 times and less than or equal to 6.0 times, further preferably greater than or equal to 1.2 times and less than or equal to 4.0 times the number of atoms of the transition metal M.

In the XPS analysis, monochromatic aluminum can be used as an X-ray source, for example. An extraction angle is, for example, 45°.

In addition, when the positive electrode active material 101 of one embodiment of the present invention is analyzed by XPS, a peak indicating the bonding energy of fluorine with another element is preferably higher than or equal to 682 eV and lower than 685 eV, further preferably approximately 684.3 eV. This bonding energy is different from that of lithium fluoride (685 eV) and that of magnesium fluoride (686 eV). That is, the positive electrode active material 101 of one embodiment of the present invention containing fluorine is preferably in the bonding state other than lithium fluoride and magnesium fluoride.

Furthermore, when the positive electrode active material 101 of one embodiment of the present invention is analyzed by XPS, a peak indicating the bonding energy of magnesium with another element is preferably higher than or equal to 1302 eV and lower than 1304 eV, further preferably approximately 1303 eV This bonding energy is different from that of magnesium fluoride (1305 eV) and is close to that of magnesium oxide. That is, the positive electrode active material 101 of one embodiment of the present invention containing magnesium is preferably in the bonding state other than magnesium fluoride.

The concentrations of impurities that preferably exist in the surface portion 101a in large amount, such as magnesium and aluminum, measured by XPS or the like are preferably higher than the concentrations measured by inductively coupled plasma mass spectrometry (ICP-MS), glow discharge mass spectrometry (GD-MS), or the like.

When the positive electrode active material 101 is processed such that its cross section is exposed to be analyzed by TEM-EDX, the concentrations of magnesium and aluminum in the surface portion 101a are preferably higher than those in the inner portion 101b. A focused ion beam (FIB) can be used for the processing, for example.

In the X-ray photoelectron spectroscopy (XPS), the number of magnesium atoms is preferably greater than or equal to 0.4 times and less than or equal to 1.5 times the number of cobalt atoms. In the ICP-MS analysis, the atomic ratio of magnesium to cobalt (Mg/Co) is preferably greater than or equal to 0.001 and less than or equal to 0.06.

By contrast, it is preferable that nickel, which is one of the transition metals M, not be unevenly distributed in the surface portion 101a but be distributed over the positive electrode active material 101. Note that one embodiment of the present invention is not limited thereto in the case where the high metal impurity concentration region 103b described above exists.

<<Surface Roughness and Specific Surface Area>>

The level of the surface smoothness of the positive electrode active material 101 can be quantified from its cross-sectional SEM image, as will be described below, for example.

First, the positive electrode active material 101 is processed with an FIB or the like such that its cross section is exposed. At this time, the positive electrode active material 101 is preferably covered with a protective film, a protective agent, or the like. Next, a SEM image of the interface between the positive electrode active material 101 and the protective film or the like is taken. The SEM image is subjected to noise processing using image processing software. For example, the Gaussian Blur ($\sigma=2$) is performed, followed by binarization. In addition, interface extraction is performed using image processing software. Moreover, an interface line between the positive electrode active material 101 and the protective film or the like is selected with an automatic selection tool or the like, and data is extracted to spreadsheet software or the like. With the use of the function of the spreadsheet software or the like, correction is performed using regression curves (quadratic regression), parameters for calculating roughness are obtained from data subjected to slope correction, and root-mean-square (RMS) surface roughness is obtained by calculating standard deviation. This surface roughness refers to the surface roughness of part of the particle periphery (at least 400 nm) of the positive electrode active material.

On the surface of the particle of the positive electrode active material 101 of this embodiment, root-mean-square (RMS) surface roughness, which is an index of roughness, is preferably less than 3 nm, further preferably less than 1 nm, still further preferably less than 0.5 nm.

Note that the image processing software used for the noise processing, the interface extraction, or the like is not particularly limited, and "ImageJ" can be used, for example. In addition, the spreadsheet software or the like is not particularly limited, and Microsoft Office Excel can be used, for example.

For example, the level of surface smoothness of the positive electrode active material 101 can also be quantified from the ratio of the actual specific surface area AR measured by a constant-volume gas adsorption method to the ideal specific surface area Ai.

The ideal specific surface area $A_i$ is calculated on the assumption that all the particles have the same diameter as D50, have the same weight, and have ideal spherical shapes.

The median diameter D50 can be measured with a particle size analyzer or the like using a laser diffraction and scattering method. The specific surface area can be measured with a specific surface area analyzer or the like by a constant-volume gas adsorption method, for example.

In the positive electrode active material 101 of one embodiment of the present invention, the ratio of the actual specific surface area $A_R$ to the ideal specific surface area $A_i$ obtained from the median diameter D50 ($A_R/A_i$) is preferably less than or equal to 2.

This embodiment can be implemented in combination with any of the other embodiments.

Embodiment 2

An example of a method for forming the positive electrode active material of one embodiment of the present invention will be described with reference to FIG. 9 and FIG. 10. In this embodiment, an example of a method for forming the positive electrode active material 101 in FIGS. 1A and 1B that contains cobalt and nickel as the transition metals M and magnesium, aluminum, and fluorine as the impurities will be described.

<Step S11>

First, a halogen source such as a fluorine source or a chlorine source and a magnesium source are prepared as materials of a mixture 902.

As the fluorine source, for example, lithium fluoride (LiF), magnesium fluoride ($MgF_2$), aluminum fluoride ($AlF_3$), titanium fluoride ($TiF_4$), cobalt fluoride ($CoF_2$ and $CoF_3$), nickel fluoride ($NiF_2$), zirconium fluoride ($ZrF_4$), vanadium fluoride ($VF_5$), manganese fluoride, iron fluoride, chromium fluoride, niobium fluoride, zinc fluoride ($ZnF_2$), calcium fluoride ($CaF_2$), sodium fluoride (NaF), potassium fluoride (KF), barium fluoride ($BaF_2$), cerium fluoride ($CeF_2$), lanthanum fluoride ($LaF_3$), sodium aluminum hexafluoride ($Na_3AlF_6$), or the like can be used. The fluorine source is not limited to a solid, and for example, fluorine ($F_2$), carbon fluoride, sulfur fluoride, oxygen fluoride (e.g., $OF_2$, $O_2F_2$, $O_3F_2$, $O_4F_2$, and $O_2F$), or the like may be used and mixed in the atmosphere in a heating step described later. A plurality of fluorine sources may be mixed to be used. In particular, lithium fluoride is preferable because it is easily melted in an annealing process described later owing to its relatively low melting point of 848° C.

As the chlorine source, lithium chloride or magnesium chloride can be used, for example.

As the magnesium source, magnesium fluoride, magnesium oxide, magnesium hydroxide, or magnesium carbonate can be used, for example.

As the lithium source, lithium fluoride or lithium carbonate can be used, for example. That is, lithium fluoride can be used as both the lithium source and the fluorine source. In addition, magnesium fluoride can be used as both the fluorine source and the magnesium source.

Figure 9:
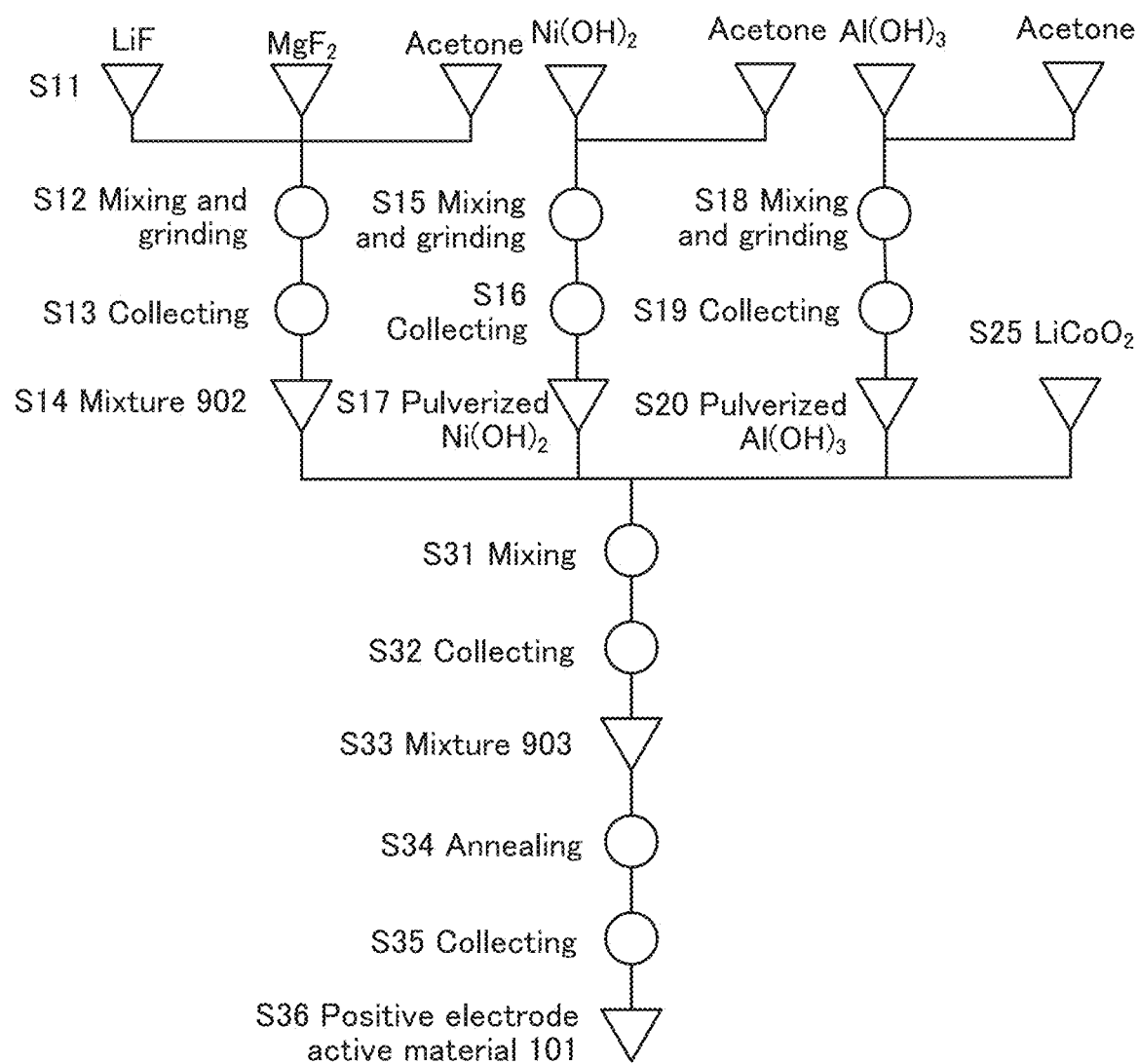
FIG. 9 shows a method for forming a positive electrode active material.

In this embodiment, lithium fluoride (LiF) is prepared as the fluorine source and the lithium source, and magnesium fluoride ($MgF_2$) is prepared as the fluorine source and the magnesium source (Step S11 in FIG. 9).

When lithium fluoride (LiF) and magnesium fluoride ($MgF_2$) are mixed at a molar ratio of approximately 65:35, the effect of lowering the melting point is maximized (Non-Patent Document 4). Meanwhile, when the proportion of lithium fluoride increases, the cycling performance might deteriorate because of an excessive amount of lithium. Therefore, the molar ratio of lithium fluoride to magnesium fluoride (LiF:$MgF_2$) is preferably x:1 ($0 \leq x \leq 1.9$), further preferably x:1 ($0.1 \leq x \leq 0.5$), still further preferably x:1 (x=0.33 or a value close thereto).

In the case where the following mixing and grinding step is performed by a wet method, a solvent is prepared. As the solvent, ketone such as acetone, alcohol such as ethanol or isopropanol, ether, dioxane, acetonitrile, N-methyl-2-pyrrolidone (NMP), or the like can be used. An aprotic solvent, which hardly reacts with lithium, is preferably used. In this embodiment, acetone is used (see Step S11 in FIG. 9).

<Step S12>

Next, the materials of the mixture 902 are mixed and ground (Step S12 in FIG. 9). Although the mixing can be performed by either a dry method or a wet method, a wet method is preferable because the materials can be ground to a smaller size. For example, a ball mill or a bead mill can be used for the mixing. When the ball mill is used, zirconia balls are preferably used as media, for example. The mixing and grinding step is preferably performed enough to pulverize the mixture 902.

The mixing is preferably performed with a blender, a mixer, or a ball mill.

<Step S13 and Step S14>

The materials mixed and ground in the above manner are collected (Step S13 in FIG. 9), whereby the mixture 902 is obtained (Step S14 in FIG. 9).

For example, the mixture 902 preferably has a D50 of greater than or equal to 600 nm and less than or equal to 20 µm, further preferably greater than or equal to 1 µm and less than or equal to 10 µm. When mixed with a composite oxide containing lithium, a transition metal, and oxygen in a later step, the mixture 902 pulverized to such a small size is easily attached uniformly to the surfaces of the composite oxide particles. The mixture 902 is preferably attached uniformly to the surfaces of the composite oxide particles, in which case halogen and magnesium are easily distributed to the surface portion of the composite oxide particles after heating. If the surface portion has a region that contains neither halogen nor magnesium, the positive electrode active material in a charged state might be less likely to have the aforementioned pseudo-spinel crystal structure.

<Step S15, Step S16, and Step S17>

Pulverized nickel hydroxide ($Ni(OH)_2$) to be added in Step S31 is prepared. The pulverized nickel hydroxide is formed in advance by Step S15 for mixing nickel hydroxide and acetone and Step S16 for collecting the mixture. Through Step S16, the pulverized nickel hydroxide is obtained (Step S17).

<Step S18, Step S19, and Step S20>

Pulverized aluminum hydroxide ($Al(OH)_3$) to be added in Step S31 is prepared. The pulverized aluminum hydroxide is formed in advance by Step S18 for mixing aluminum hydroxide and acetone and Step S19 for collecting the mixture. Through Step S19, the pulverized aluminum hydroxide is obtained (Step S20).

Note that in this embodiment, a formation method in which nickel and aluminum are pulverized and mixed is described in Step S15 to Step S20; however, one embodiment of the present invention is not limited thereto. Another impurity element such as titanium may be mixed. Also in the case where titanium is mixed, titanium is preferably pulverized and mixed in a manner similar to that in Step S15 to Step S17. As a titanium source, titanium hydroxide, titanium oxide, or the like can be used.

<Step S25>

A lithium source to be added in Step S31 is prepared. A pre-synthesized composite oxide containing lithium, a transition metal, and oxygen is prepared in Step S25.

In the case of using the pre-synthesized composite oxide containing lithium, a transition metal, and oxygen, a composite oxide with few impurities is preferably used. In this specification and the like, the main components of the composite oxide containing lithium, a transition metal, and oxygen and the positive electrode active material are lithium, cobalt, nickel, manganese, aluminum, and oxygen, and elements other than these main components are regarded as impurities. For example, when glow discharge mass spectrometry is performed, the total impurity concentration is preferably less than or equal to 10,000 ppm wt, further preferably less than or equal to 5,000 ppm wt. In particular, the total impurity concentration of a transition metal such as titanium and arsenic is preferably less than or equal to 3,000 ppm wt, further preferably less than or equal to 1,500 ppm wt.

For example, as pre-synthesized lithium cobalt oxide ($LiCoO_2$), a lithium cobalt oxide particle (product name: CELLSEED C-10N, manufactured by Nippon Chemical Industrial Co., Ltd.) can be used. This is lithium cobalt oxide in which the average particle diameter (D50) is approximately 12 µm, and in the impurity analysis by glow discharge mass spectrometry (GD-MS), the concentrations of magnesium and fluorine are less than or equal to 50 ppm wt, the concentrations of calcium, aluminum, and silicon are less than or equal to 100 ppm wt, the concentration of nickel is less than or equal to 150 ppm wt, the concentration of sulfur is less than or equal to 500 ppm wt, the concentration of arsenic is less than or equal to 1,100 ppm wt, and the concentrations of elements other than lithium, cobalt, and oxygen are less than or equal to 150 ppm wt.

The composite oxide containing lithium, the transition metal, and oxygen in Step S25 preferably has a layered rock-salt crystal structure with few defects and distortions. Therefore, the composite oxide preferably includes few impurities. When a composite oxide containing lithium, a transition metal, and oxygen includes a large amount of impurities, the crystal structure is highly likely to have a lot of defects and distortions.

<Step S31>

Next, the mixture 902; the composite oxide containing lithium, the transition metal, and oxygen; the pulverized aluminum hydroxide; and the pulverized nickel hydroxide are mixed (Step S31 in FIG. 9). The atomic ratio of the transition metal Min the composite oxide containing lithium, the transition metal, and oxygen to magnesium Mg in the mixture 902 (M:Mg) is preferably 100:y ($0.1 \le y \le 6$), further preferably 100:y ($0.3 \le y \le 3$).

The mixing in Step S31 is preferably performed under milder conditions than those for the mixing in Step S12, in order not to damage the composite oxide particles. For example, a condition with a smaller number of rotations or a shorter time than that for the mixing in Step S12 is preferable. Moreover, a dry method is regarded as a milder condition than a wet method. A ball mill or a bead mill can be used for the mixing, for example. When the ball mill is used, zirconia balls are preferably used as media, for example.

The materials mixed in the above manner are collected (Step S32 in FIG. 9), whereby a mixture 903 is obtained (Step S33 in FIG. 9).

Next, the mixture 903 is heated (Step S34 in FIG. 9). This step can be referred to as annealing or baking.

The annealing is preferably performed at an appropriate temperature for an appropriate time. The appropriate temperature and time depend on the conditions such as the particle size and composition of the composite oxide containing lithium, the transition metal, and oxygen in Step S25. The annealing for small particles may be preferably performed at a lower temperature or for a shorter time than the case of the annealing for large particles.

When the average particle diameter (D50) of the particles in Step S25 is approximately 12 µm, the annealing temperature is preferably higher than or equal to 700° C. and lower than or equal to 950° C., for example. The annealing time is preferably longer than or equal to 3 hours, further preferably longer than or equal to 10 hours, still further preferably longer than or equal to 60 hours, for example.

The time for lowering the temperature of the mixture 903 after the annealing is preferably longer than or equal to 10 hours and shorter than or equal to 50 hours, for example.

When the mixture 903 is annealed, it is likely that a material having a low melting point in the mixture 903 (e.g., lithium fluoride with a melting point of 848° C.) is melted first and distributed to the surface portion of the composite oxide particle. Next, the melted material causes a reduction in the melting point of another material, presumably resulting in melting of that material. For example, magnesium fluoride (melting point: 1263° C.) is presumably melted and distributed to the surface portion of the composite oxide particle.

The elements included in the mixture 903 diffuse faster in the surface portion of the composite oxide particle and the vicinity of the grain boundary than in the inner portion. Therefore, the concentrations of magnesium and halogen are higher in the surface portion and the vicinity of the grain boundary than in the inner portion. As will be described later, a higher magnesium concentration in the surface portion and the vicinity of the grain boundary can inhibit the change in the crystal structure more effectively.

The material annealed in the above manner is collected (Step S35 in FIG. 9). Then, the particles are preferably sifted. Through the above process, the positive electrode active material 101 of one embodiment of the present invention can be formed (Step S36 in FIG. 9).

Next, another example of a method for forming the positive electrode active material of one embodiment of the present invention will be described with reference to FIG. 10. FIG. 10 is the same as FIG. 9 except for some steps; hence, the description of identical steps is not repeated for simplicity.

<Step S11 to Step S20>

In Step S11 to Step S20, the element sources are prepared. FIG. 10 shows an example in which lithium fluoride, magnesium fluoride, nickel hydroxide, and aluminum hydroxide are prepared; however, one embodiment of the present invention is not limited thereto. One or more of them are prepared as the element sources. For example, only lithium fluoride may be prepared.

<Step S26>

Next, a composite oxide is prepared in Step S26. Step S26 is partly different from Step S25 in FIG. 9; a composite oxide containing some kinds of impurities may be used at this step. For example, a composite oxide containing magnesium and titanium is preferably used, in which case the kinds of impurities to be mixed in a later step can be reduced.

<Step S31 to Step S36>

Then, the element sources and the composite oxide are mixed and the mixture 903 is annealed in Step S31 to Step S36. Through the above steps, the positive electrode active material 101 can be formed.

Embodiment 3

Another example of a method for forming the positive electrode active material of one embodiment of the present invention will be described with reference to FIG. 11. This embodiment is the same as Embodiment 2 except for some steps; hence, the description of identical steps is not repeated for simplicity.

<Step S11 to Step S36>

As in Embodiment 2, the impurity elements and the composite oxide containing lithium, the transition metal, and oxygen are mixed and annealed to obtain a mixture 904 (Step S36).

<Step S42, Step S43, and Step S44>

Next, through Step S42 to Step S44, a metal Z is added as one of impurities so that the positive electrode active material of one embodiment of the present invention is obtained. The metal Z, which is an impurity, can be added by a liquid phase method such as a sol-gel method, a solid phase method, a sputtering method, an evaporation method, a chemical vapor deposition (CVD) method, or a pulsed laser deposition (PLD) method, for example.

Figure 11:
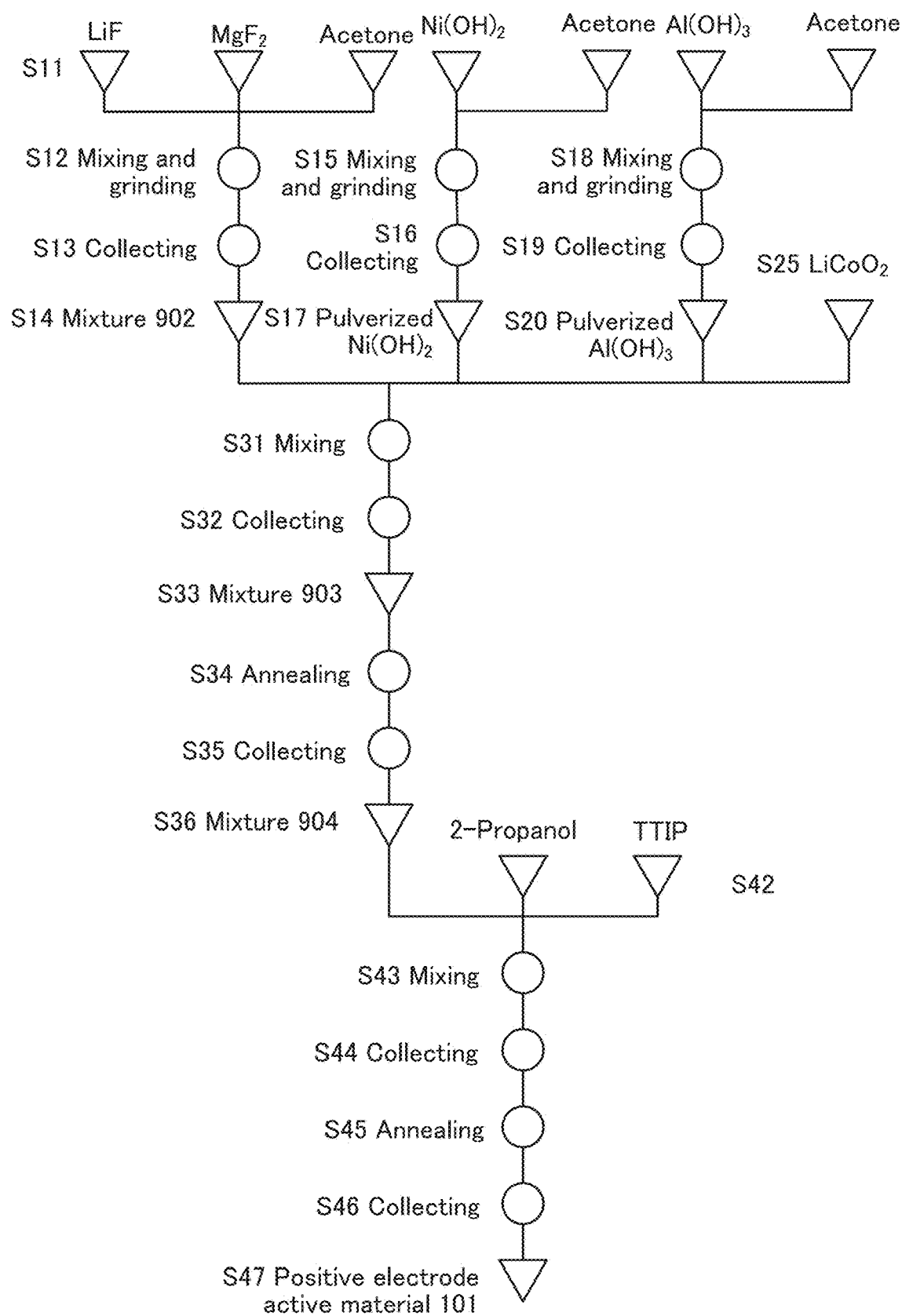
FIG. 11 shows a method for forming a positive electrode active material.

As shown in FIG. 11, a metal source is first prepared in Step S42. As the metal source, metal alkoxide, metal hydroxide, metal oxide, or the like can be used. In the case of employing a sol-gel method, a solvent used for the sol-gel method is also prepared. As the solvent, alcohol is preferably used, and alcohol that is the same as an alkoxyl group of alkoxide of an additive source is particularly preferably used. Water is contained in the solvent preferably at 3 vol % or less, further preferably at 0.3 vol % or less. The use of alcohol as the solvent can inhibit degradation of $LiCoO_2$ in the formation process as compared with the case of using water. When the metal Z is aluminum, for example, the number of aluminum atoms in the metal source ranges from 0.001 to 0.02 times the number of cobalt atoms in the lithium cobalt oxide. When the metal Z is titanium, for example, the number of titanium atoms in the metal source ranges from 0.001 to 0.02 times the number of cobalt atoms in the lithium cobalt oxide. When the metal Z is aluminum and titanium, for example, the number of aluminum atoms and the number of titanium atoms in the metal source each range from 0.001 to 0.02 times the number of cobalt atoms in the lithium cobalt oxide.

Here, an example of employing a sol-gel method using titanium(IV) tetraisopropoxide (TTIP) as the metal source and 2-propanol as the solvent is shown (Step S42 in FIG. 11).

Next, the above titanium alkoxide is dissolved in 2-propanol, and then the lithium cobalt oxide particles are mixed (Step S43 in FIG. 11).

The necessary amount of metal alkoxide depends on the particle diameter of lithium cobalt oxide. For example, when titanium isopropoxide is used and the particle diameter (D50) of the lithium cobalt oxide is approximately 20 μm, the titanium isopropoxide is preferably added such that the number of titanium atoms ranges from 0.001 to 0.02 times the number of cobalt atoms in the lithium cobalt oxide.

Next, the mixed solution of the alcohol solution of the metal alkoxide and the lithium cobalt oxide particles is stirred under an atmosphere containing water vapor. The stirring can be performed with a magnetic stirrer, for example. The stirring time is not limited as long as water in the atmosphere and the metal alkoxide cause hydrolysis and a polycondensation reaction. For example, the stirring can be performed at 25° C. and a relative humidity of 90% for four hours. Alternatively, the stirring may be performed under an atmosphere where the humidity and temperature are not adjusted, for example, an air atmosphere in a fume hood. In such a case, the stirring time is preferably set longer and can be 12 hours or longer at room temperature, for example.

Water vapor in the atmosphere is gradually taken and alcohol is gradually volatized to cause a reaction between water and metal alkoxide, which enables a sol-gel reaction to proceed gently. A reaction between metal alkoxide and water at room temperature enables a sol-gel reaction to proceed gently as compared with the case where heating is performed at a temperature higher than the boiling point of alcohol serving as a solvent, for example.

Water may be added positively. In the case where the reaction is made to proceed gently, the reaction time may be controlled by gradual addition of water diluted with alcohol, addition of stabilizer, or the like. A sol-gel reaction that proceeds gently enables formation of a high-quality coating layer with a uniform thickness.

After the above process, the precipitate is collected from the mixed solution (Step S44 in FIG. 11). As the collection method, filtration, centrifugation, evaporation to dryness, or the like can be used. The precipitate can be washed with alcohol, which is also used as the solvent for dissolving the metal alkoxide. Note that in the case of employing evaporation to dryness, the solvent and the precipitate are not necessarily separated in this step; for example, the precipitate is collected in the subsequent drying step in Step S44.

Next, the collected residue is dried, so that the mixture is obtained (Step S44 in FIG. 11). In the drying step, vacuum or ventilation drying can be performed at 80° C. for one hour to four hours, for example.

<Step S45>

Then, the obtained mixture is heated (Step S45 in FIG. 11).

As for the heating time, the time for keeping the heating temperature within a predetermined range is preferably longer than or equal to 1 hour and shorter than or equal to 80 hours, further preferably longer than or equal to 1 hour and shorter than or equal to 20 hours in consideration of productivity.

The heating temperature is lower than 1000° C., preferably higher than or equal to 700° C. and lower than or equal to 950° C., further preferably approximately 850° C.

The heating is preferably performed in an oxygen-containing atmosphere.

In this embodiment, the heating temperature is 850° C. and kept for two hours, the temperature rising rate is 200° C./h, and the flow rate of oxygen is 10 L/min.

The heating temperature in Step S45 is preferably lower than the heating temperature in Step S34.

<Step S46 and Step S47>

Next, cooled particles are collected (Step S46 in FIG. 11). Then, the particles are preferably sifted. Through the above process, the positive electrode active material 101 of one embodiment of the present invention can be formed (Step S47 in FIG. 11).

This embodiment can be implemented in combination with any of the other embodiments.

Embodiment 4

In this embodiment, another example of a method for forming the positive electrode active material of one embodiment of the present invention will be described. This embodiment is the same as Embodiments 2 and 3 except for some steps; hence, the description of identical steps is not repeated for simplicity.

Although the method in which the impurity elements are mixed in Step S31 or Step S43 is described in the above embodiments, one embodiment of the present invention is not limited thereto. A method for adding the impurity elements and a timing at which the impurity elements can be added are described with reference to FIG. 12.

<Step S01>

Figure 12:
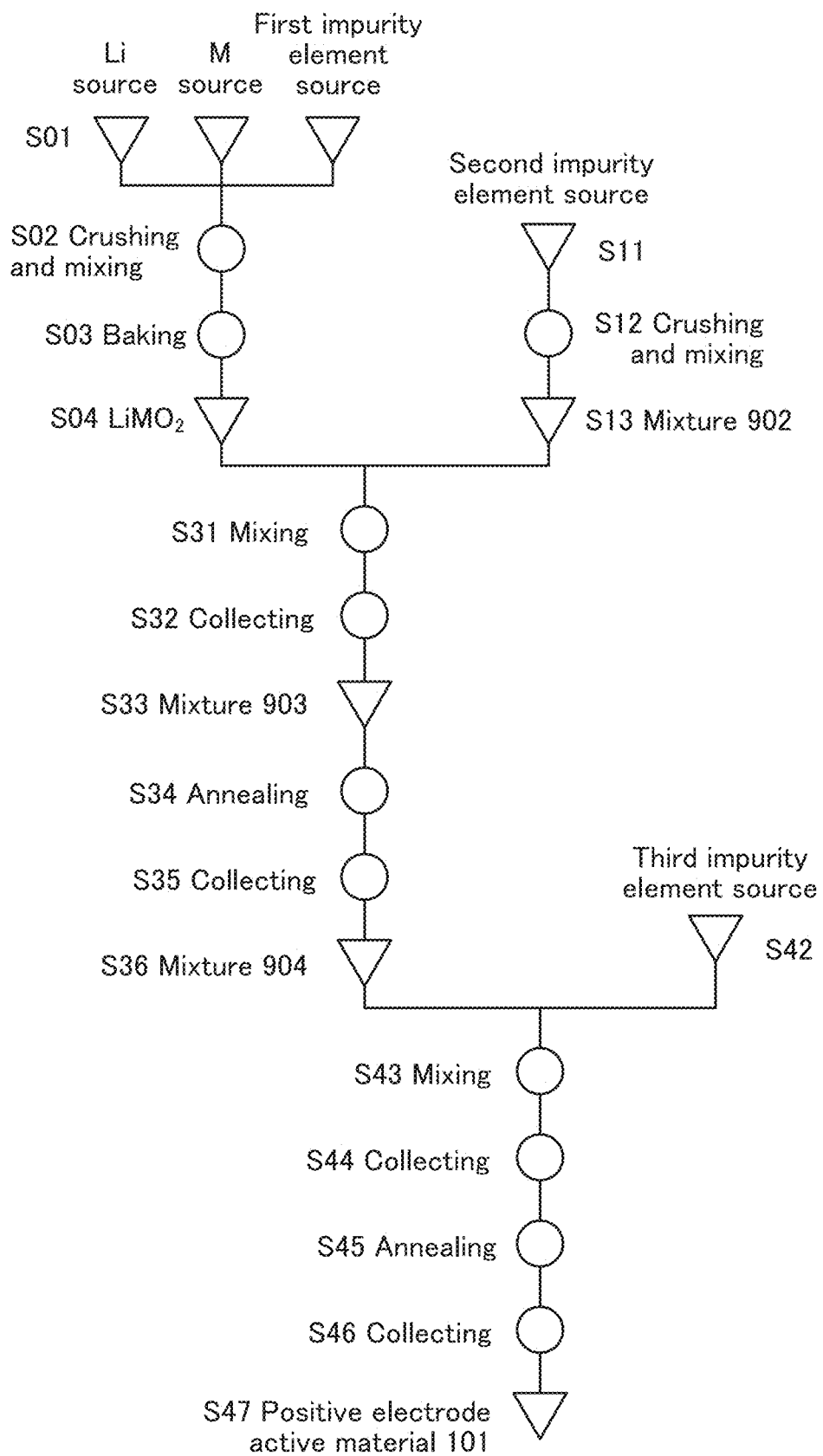
FIG. 12 shows a method for forming a positive electrode active material.

In Step S01 in FIG. 12, a lithium source and a transition metal M source are first prepared as the materials of a composite oxide containing lithium, the transition metal M, and oxygen ($LiMO_2$). At this time, a first impurity element source may be prepared as one of raw materials in baking the composite oxide.

As the first impurity element, at least one of magnesium, fluorine, aluminum, titanium, zirconium, vanadium, iron, chromium, niobium, cobalt, arsenic, zinc, silicon, sulfur, phosphorus, and boron can be used. As the first impurity element source, an oxide, hydroxide, fluoride, or the like of these elements can be used.

As the lithium source, lithium carbonate or lithium fluoride can be used, for example.

As the transition metal M, a metal that can form, together with lithium, a layered rock-salt composite oxide belonging to the space group R-3m is preferably used. For example, at least one of manganese, cobalt, and nickel can be used. That is, as the transition metal M source, only cobalt or nickel may be used, cobalt and manganese or nickel may be used, or cobalt, manganese, and nickel may be used.

When metals that can form a layered rock-salt composite oxide are used, cobalt, manganese, and nickel are preferably mixed at the ratio at which the composite oxide can have a layered rock-salt crystal structure. In addition, aluminum may be added to the transition metals as long as the composite oxide can have the layered rock-salt crystal structure.

As the transition metal M source, an oxide, hydroxide, or the like of the metal given as an example of the transition metal M can be used. As the cobalt source, cobalt oxide or cobalt hydroxide can be used, for example. As the manganese source, manganese oxide, manganese hydroxide, or the like can be used. As the nickel source, nickel oxide, nickel hydroxide, or the like can be used. As the aluminum source, aluminum oxide, aluminum hydroxide, or the like can be used.

<Step S02>

Next, in Step S02, the lithium source, the transition metal M source, and the first impurity element source are mixed. The mixing can be performed by a dry method or a wet method. For example, a ball mill or a bead mill can be used for the mixing. When the ball mill is used, zirconia balls are preferably used as media, for example.

<Step S03>

Next, in Step S03, the materials mixed in the above step are heated. This step is sometimes referred to as baking or first heating to distinguish this step from a heating step performed later. The heating is preferably performed at higher than or equal to 800° C. and lower than 1100° C., further preferably at higher than or equal to 900° C. and lower than or equal to 1000° C., still further preferably at approximately 950° C. Excessively low temperature might result in insufficient decomposition and melting of the lithium source, the transition metal M source, and the first impurity element source. By contrast, excessively high temperature might cause a defect due to evaporation of lithium, excessive reduction of the metal that is used as the transition metal M and causes an oxidation-reduction reaction, or the like. The use of cobalt as the transition metal M, for example, may lead to a defect in which cobalt has a valence of two.

The heating time can be longer than or equal to 1 hour and shorter than or equal to 100 hours, and is preferably longer than or equal to 2 hours and shorter than or equal to 20 hours. Baking is preferably performed in an atmosphere with few moisture such as a dry air (e.g., a dew point is lower than or equal to −50° C., further preferably lower than or equal to −100° C.). For example, it is preferable that the heating be performed at 1000° C. for 10 hours, the temperature rising rate be 200° C./h, and the flow rate of a dry atmosphere be 10 L/min. After that, the heated materials can be cooled to room temperature. The temperature decreasing time from the specified temperature to room temperature is preferably longer than or equal to 10 hours and shorter than or equal to 50 hours, for example.

Note that the cooling to room temperature in Step S03 is not necessarily performed. As long as the following steps can be performed without any problems, the cooling may be performed to a temperature higher than room temperature.

<Step S04>

Next, in Step S04, the materials baked in the above step are collected, whereby the composite oxide containing lithium, the transition metal M, the first impurity element, and oxygen ($LiMO_2$) is obtained.

<Step S11 to Step S13 and Step S31>

As in the method described in the above embodiment, the composite oxide containing lithium, the transition metal M, and oxygen may be synthesized and then a second impurity element source may be mixed, as shown in Step S11 to Step S13 and Step S31. As the second impurity element, at least one of magnesium, fluorine, aluminum, titanium, zirconium, vanadium, iron, chromium, niobium, cobalt, arsenic, zinc, silicon, sulfur, phosphorus, and boron can be used. As the second impurity element source, an oxide, hydroxide, fluoride, or the like of these elements can be used.

<Step S42 and Step S43>

As in the method described in the above embodiment, the second impurity element may be mixed, annealing may be performed, and then a third impurity element source may be mixed, as shown in Step S42 and Step S43. As the third impurity element, at least one of magnesium, fluorine, aluminum, titanium, zirconium, vanadium, iron, chromium, niobium, cobalt, arsenic, zinc, silicon, sulfur, phosphorus, and boron can be used. As the third impurity element source, an oxide, hydroxide, fluoride, or the like of these elements can be used.

Although not shown, a fourth impurity element source may be mixed after the third impurity element source is mixed and annealing is performed.

As described above, the impurity element sources can be mixed at different timings in the formation process of the positive electrode active material 101.

As a method for mixing the impurity element sources, a liquid phase method such as a sol-gel method, a solid phase method, a sputtering method, an evaporation method, a chemical vapor deposition (CVD) method, a pulsed laser deposition (PLD) method, or the like can be used.

The first impurity element source, the second impurity element source, and the third impurity element source may contain different elements, but some of them may contain the same element. For example, magnesium may be used for both of the first impurity element source and the second impurity element source.

Among the impurity element sources, magnesium and fluorine are preferably mixed at the same time. Adding magnesium and fluorine at the same time makes the fluorine source adequately function as a flux, resulting in favorable distribution of magnesium on the surface portion of the positive electrode active material 101.

The optimal mixing timing may differ between the impurity elements. For example, magnesium and fluorine are preferably mixed as the second or subsequent impurity element source rather than as the first impurity element source.

Note that in the formation method of one embodiment of the present invention, at least one of the first to third impurity element sources is mixed. That is, the impurity element source is mixed at one or more of the timings shown in FIG. 12, and the impurity element is not necessarily mixed at all the timings in FIG. 12.

This embodiment can be implemented in combination with any of the other embodiments.

Embodiment 5

In this embodiment, examples of a secondary battery of one embodiment of the present invention are described with reference to FIGS. 13A and 13B, FIGS. 14A and 14B, FIGS. 15A to 15C, and FIGS. 16A and 16B.

<Structure Example 1 of Secondary Battery>

Hereinafter, a secondary battery in which a positive electrode, a negative electrode, and an electrolyte solution are wrapped in an exterior body is described as an example.

[Positive Electrode]

The positive electrode includes a positive electrode active material layer and a positive electrode current collector. The positive electrode active material layer includes a positive electrode active material, and may include a conductive material and a binder. As the positive electrode active material, the positive electrode active material formed by the formation method described in the above embodiments is used.

The positive electrode active material described in the above embodiments and another positive electrode active material may be mixed to be used.

Other examples of the positive electrode active material include a composite oxide with an olivine crystal structure, a composite oxide with a layered rock-salt crystal structure, and a composite oxide with a spinel crystal structure. For example, a compound such as $LiFePO_4$, $LiFeO_2$, $LiNiO_2$, $LiMn_2O_4$, $V_2O_5$, $Cr_2O_5$, or $MnO_2$ can be used.

As another positive electrode active material, it is preferable to add lithium nickel oxide ($LiNiO_2$ or $LiNi_{1-x}M_xO_2$ ($0<x<1$) (M=Co, Al, or the like)) to a lithium-containing material with a spinel crystal structure which contains manganese, such as $LiMn_2O_4$, because the characteristics of the secondary battery using such a material can be improved.

Another example of the positive electrode active material is a lithium-manganese composite oxide that can be represented by a composition formula $Li_aMn_bM_cO_d$. Here, the element M is preferably silicon, phosphorus, or a metal element other than lithium and manganese, and further preferably nickel. In the case where the whole particle of a lithium-manganese composite oxide is measured, it is preferable to satisfy the following at the time of discharging: $0<a/(b+c)<2$; $c>0$; and $0.26\leq(b+c)/d<0.5$. Note that the ratios of metal, silicon, phosphorus, and other elements to the total composition in the whole particle of a lithium-manganese composite oxide can be measured with, for example, an inductively coupled plasma mass spectrometer (ICP-MS). The ratio of oxygen to the total composition in the whole particle of a lithium-manganese composite oxide can be measured by, for example, energy dispersive X-ray spectroscopy (EDX). Alternatively, the ratio of oxygen to the total composition in the whole particle of a lithium-manganese composite oxide can be measured by ICP-MS combined with fusion gas analysis and valence evaluation of X-ray absorption fine structure (XAFS) analysis. Note that the lithium-manganese composite oxide is an oxide containing at least lithium and manganese, and may contain at least one selected from chromium, cobalt, aluminum, nickel, iron, magnesium, molybdenum, zinc, indium, gallium, copper, titanium, niobium, silicon, phosphorus, and the like.

A cross-sectional structure example of an active material layer 200 containing a graphene compound as a conductive material is described below.

Figure 13A:
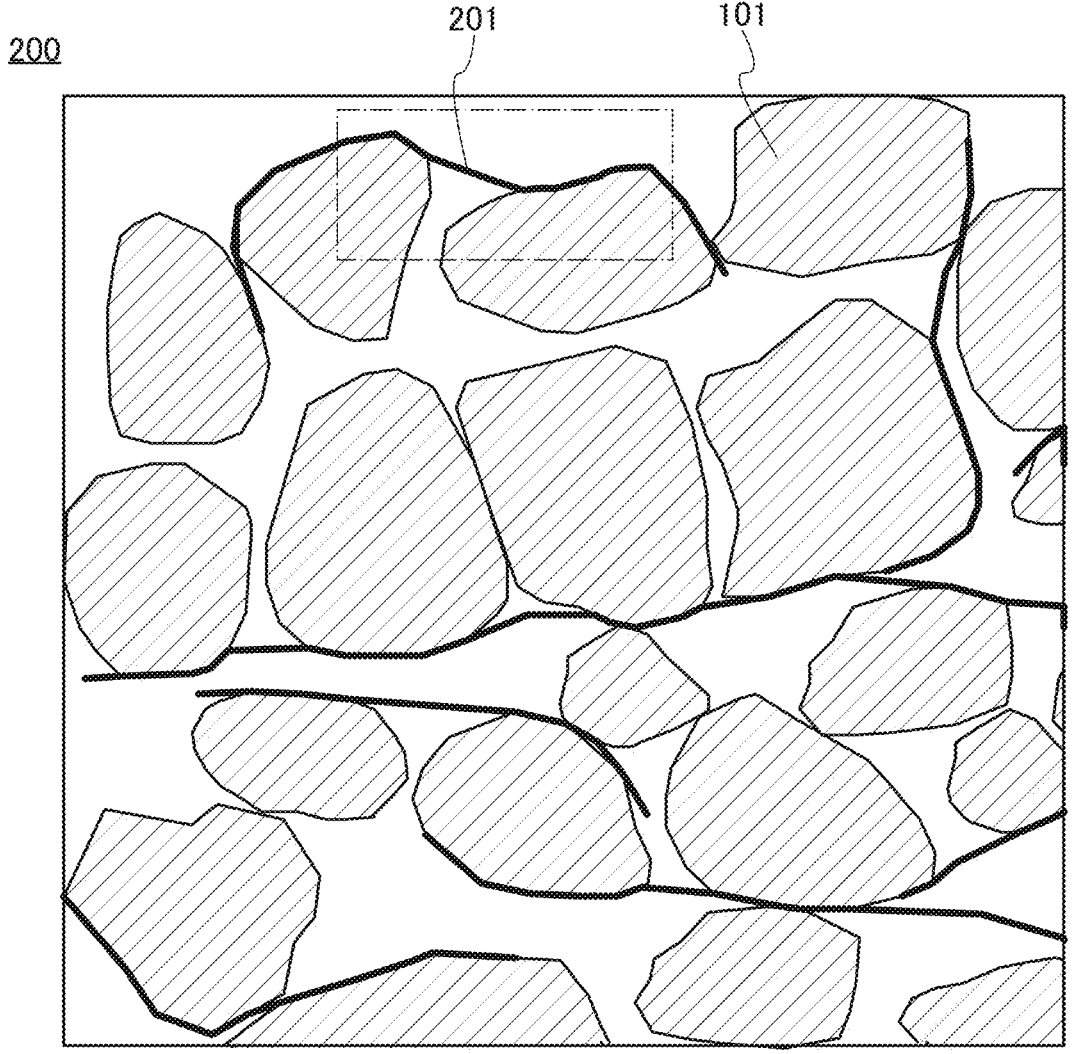
FIGS. 13A and 13B are cross-sectional views of an active material layer containing a graphene compound as a conductive material.

FIG. 13A is a longitudinal cross-sectional view of the active material layer 200. The active material layer 200 includes particles of the positive electrode active material 101, graphene and a graphene compound 201 serving as conductive materials, and a binder (not illustrated).

A graphene compound in this specification and the like refers to multilayer graphene, multi graphene, graphene oxide, multilayer graphene oxide, multi graphene oxide, reduced graphene oxide, reduced multilayer graphene oxide, reduced multi graphene oxide, graphene quantum dots, and the like. A graphene compound contains carbon, has a plate-like shape, a sheet-like shape, or the like, and has a two-dimensional structure formed of a six-membered ring composed of carbon atoms. The two-dimensional structure formed of the six-membered ring composed of carbon atoms may be referred to as a carbon sheet. A graphene compound may include a functional group. The graphene compound is preferably bent. The graphene compound may be rounded like a carbon nanofiber.

In this specification and the like, graphene oxide refers to a graphene compound that contains carbon and oxygen, has a sheet-like shape, and includes a functional group, in particular, an epoxy group, a carboxy group, or a hydroxy group.

In this specification and the like, reduced graphene oxide contains carbon and oxygen, has a sheet-like shape, and has a two-dimensional structure formed of a six-membered ring composed of carbon atoms. The reduced graphene oxide may also be referred to as a carbon sheet. The reduced graphene oxide functions by itself and may have a stacked-layer structure. The reduced graphene oxide preferably includes a portion where the carbon concentration is higher than 80 atomic % and the oxygen concentration is higher than or equal to 2 atomic % and lower than or equal to 15 atomic %. With such a carbon concentration and such an oxygen concentration, the reduced graphene oxide can function as a conductive material with high conductivity even with a small amount. In addition, the intensity ratio G/D of a G band to a D band of the Raman spectrum of the reduced graphene oxide is preferably 1 or more. The reduced graphene oxide with such an intensity ratio can function as a conductive material with high conductivity even with a small amount.

Figure 13B:
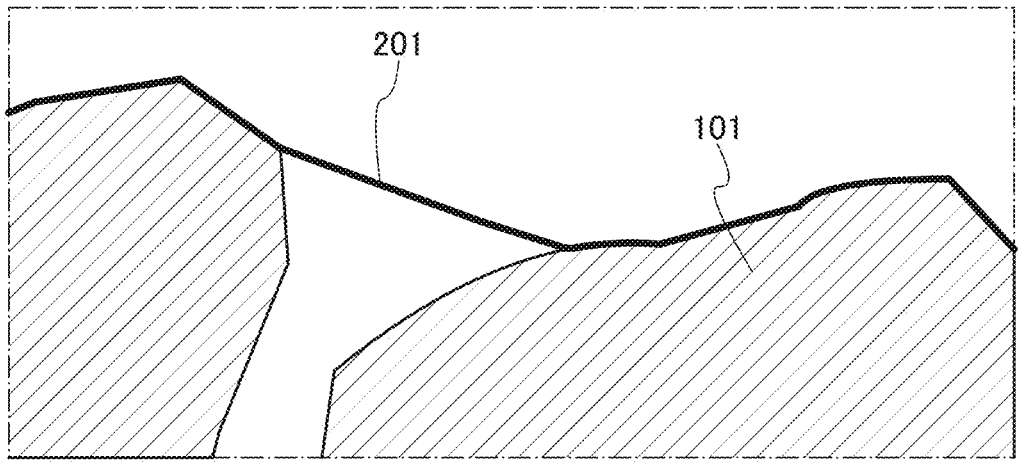

The longitudinal cross section of the active material layer 200 in FIG. 13B shows substantially uniform dispersion of the sheet-like graphene and graphene compounds 201 in the active material layer 200. The graphene and graphene compounds 201 are schematically shown by thick lines in FIG. 13B but are actually thin films each having a thickness corresponding to the thickness of a single layer or a multilayer of carbon molecules. The plurality of graphene and graphene compounds 201 are formed to partly coat or adhere to the surfaces of the plurality of particles of the positive electrode active material 101, so that the graphene and graphene compounds 201 make surface contact with the particles of the positive electrode active material 101. Note that the graphene and graphene compound 201 preferably cling (stick) to at least part of an active material.

The graphene and graphene compound 201 preferably overlay (superpose) an active material. The shape of the graphene and graphene compound 201 preferably conforms to (mirrors) at least part of the shape of a plurality of active materials. The shape of a plurality of active materials means, for example, a projection and a depression of a single active material particle or projections and depressions formed by a plurality of active material particles. The graphene and graphene compound 201 preferably surround at least part of an active material. The graphene and graphene compound 201 may have a hole (opening).

Here, the plurality of graphene compounds are bonded to each other to form a net-like graphene compound sheet (hereinafter, referred to as a graphene compound net or a graphene net). A graphene net that covers the active material can function as a binder for bonding the active material particles. Accordingly, the amount of the binder can be reduced, or the binder does not have to be used. This can increase the proportion of the active material in the electrode volume or weight. That is to say, the capacity of the secondary battery can be increased.

Here, it is preferable to perform reduction after a layer to be the active material layer 200 is formed in such a manner that graphene oxide is used as the graphene and graphene compound 201 and mixed with an active material. That is, the formed active material layer preferably contains the reduced graphene oxide. When graphene oxide with extremely high dispersibility in a polar solvent is used for the formation of the graphene and graphene compounds 201, the graphene and graphene compounds 201 can be substantially uniformly dispersed in the active material layer 200. The solvent is removed by volatilization from a dispersion medium in which graphene oxide is uniformly dispersed, and the graphene oxide is reduced; hence, the graphene and graphene compounds 201 remaining in the active material layer 200 partly overlap with each other and are dispersed such that surface contact is made, thereby forming a three-dimensional conduction path. Note that graphene oxide can be reduced by heat treatment or with the use of a reducing agent, for example.

Unlike a conductive material in the form of particles, such as acetylene black, which makes point contact with an active material, the graphene and graphene compound 201 are capable of making low-resistance surface contact; accordingly, the electrical conduction between the particles of the positive electrode active material 101 and the graphene and graphene compound 201 can be improved with a small amount of the graphene and graphene compound 201 compared with a normal conductive material. Thus, the proportion of the positive electrode active material 101 in the active material layer 200 can be increased, resulting in increased discharge capacity of the secondary battery.

Alternatively, a graphene compound serving as a conductive material can be formed in advance with a spray dry apparatus as a coating film to cover the entire surface of the active material, and a conductive path between the active material particles can be formed using the graphene compound.

[Negative Electrode]

The negative electrode includes a negative electrode active material layer and a negative electrode current collector. The negative electrode active material layer may contain a conductive material and a binder.

[Negative Electrode Active Material]

As a negative electrode active material, for example, an alloy-based material or a carbon-based material can be used.

For the negative electrode active material, an element that enables charge and discharge reactions by an alloying reaction and a dealloying reaction with lithium can be used. For example, a material containing at least one of silicon, tin, gallium, aluminum, germanium, lead, antimony, bismuth, silver, zinc, cadmium, indium, and the like can be used. Such elements have higher capacity than carbon. In particular, silicon has a high theoretical capacity of 4200 mAh/g. For this reason, silicon is preferably used as the negative electrode active material. Alternatively, a compound containing any of the above elements may be used. Examples of the compound include $SiO$, $Mg_2Si$, $Mg_2Ge$, $SnO$, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, $InSb$, and $SbSn$. Here, an element that enables charge and discharge reactions by an alloying reaction and a dealloying reaction with lithium, a compound containing the element, and the like may be referred to as an alloy-based material.

In this specification and the like, SiO refers, for example, to silicon monoxide. Note that SiO can alternatively be expressed as $SiO_x$. Here, x preferably has an approximate value of 1. For example, x is preferably more than or equal to 0.2 and less than or equal to 1.5, further preferably more than or equal to 0.3 and less than or equal to 1.2.

As the carbon-based material, graphite, graphitizing carbon (soft carbon), non-graphitizing carbon (hard carbon), carbon nanotube, graphene, carbon black, or the like can be used.

Examples of graphite include artificial graphite and natural graphite. Examples of artificial graphite include mesocarbon microbeads (MCMB), coke-based artificial graphite, and pitch-based artificial graphite. As artificial graphite, spherical graphite having a spherical shape can be used. For example, MCMB is preferably used because it may have a spherical shape. Moreover, MCMB may preferably be used because it can relatively easily have a small surface area. Examples of natural graphite include flake graphite and spherical natural graphite.

Graphite has a low potential substantially equal to that of a lithium metal (higher than or equal to 0.05 V and lower than or equal to 0.3 V vs. Li/Li+) when lithium ions are intercalated into graphite (while a lithium-graphite intercalation compound is formed). For this reason, a lithium-ion secondary battery can have a high operating voltage. In addition, graphite is preferred because of its advantages such as a relatively high capacity per unit volume, relatively small volume expansion, low cost, and higher level of safety than that of a lithium metal.

As the negative electrode active material, an oxide such as titanium dioxide ($TiO_2$), lithium titanium oxide ($Li_4Ti_5O_{12}$), a lithium-graphite intercalation compound ($Li_xC_6$), niobium pentoxide ($Nb_2O_5$), tungsten oxide ($WO_2$), or molybdenum oxide ($MoO_2$) can be used.

Alternatively, as the negative electrode active material, $Li_{3-x}M_xN$ (M is Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active material and thus the negative electrode active material can be used in combination with a material for a positive electrode active material that does not contain lithium ions, such as $V_2O_5$ or $Cr_3O8$. Note that in the case of using a material containing lithium ions as a positive electrode active material, the nitride containing lithium and a transition metal can be used as the negative electrode active material by extracting the lithium ions contained in the positive electrode active material in advance.

Alternatively, a material that causes a conversion reaction can be used for the negative electrode active material; for example, a transition metal oxide that does not form an alloy with lithium, such as cobalt oxide (CoO), nickel oxide (NiO), or iron oxide (FeO), may be used. Other examples of the material that causes a conversion reaction include oxides such as $Fe_2O3$, CuO, $Cu_2O$, $RuO_2$, and $Cr_2O3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

For the conductive material and the binder that can be included in the negative electrode active material layer, materials similar to those of the conductive material and the binder that can be included in the positive electrode active material layer can be used.

[Negative Electrode Current Collector]

For the negative electrode current collector, a material similar to that of the positive electrode current collector can be used. Note that a material that is not alloyed with carrier ions of lithium or the like is preferably used for the negative electrode current collector.

[Electrolyte Solution]

The electrolyte solution contains a solvent and an electrolyte. As the solvent of the electrolyte solution, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, ethyl acetate, methyl propionate, ethyl propionate, propyl propionate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

Alternatively, the use of one or more ionic liquids (room temperature molten salts) that are less likely to burn and volatize as the solvent of the electrolyte solution can prevent a secondary battery from exploding or catching fire even when the secondary battery internally shorts out or the internal temperature increases owing to overcharge or the like. An ionic liquid contains a cation and an anion, specifically, an organic cation and an anion. Examples of the organic cation used for the electrolyte solution include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolyte solution include a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, and a perfluoroalkylphosphate anion.

As the electrolyte dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

The electrolyte solution used for a secondary battery is preferably highly purified and contains small numbers of dust particles and elements other than the constituent elements of the electrolyte solution (hereinafter, also simply referred to as impurities). Specifically, the weight ratio of impurities to the electrolyte solution is preferably less than or equal to 1%, further preferably less than or equal to 0.1%, still further preferably less than or equal to 0.01%.

Furthermore, an additive agent such as vinylene carbonate, propane sultone (PS), tert-butylbenzene (TBB), fluoroethylene carbonate (FEC), lithium bis(oxalate)borate (LiBOB), or a dinitrile compound such as succinonitrile or adiponitrile may be added to the electrolyte solution. The concentration of the material to be added in the whole solvent is, for example, higher than or equal to 0.1 wt % and lower than or equal to 5 wt %.

Alternatively, a polymer gel electrolyte obtained in such a manner that a polymer is swelled with an electrolyte solution may be used.

When a polymer gel electrolyte is used, safety against liquid leakage and the like is improved. Moreover, a secondary battery can be thinner and more lightweight.

As a polymer that undergoes gelation, a silicone gel, an acrylic gel, an acrylonitrile gel, a polyethylene oxide-based gel, a polypropylene oxide-based gel, a fluorine-based polymer gel, or the like can be used.

Examples of the polymer include a polymer having a polyalkylene oxide structure, such as polyethylene oxide (PEO); PVDF; polyacrylonitrile; and a copolymer containing any of them. For example, PVDF-HFP, which is a copolymer of PVDF and hexafluoropropylene (HFP) can be used. The formed polymer may be porous.

Instead of the electrolyte solution, a solid electrolyte including an inorganic material such as a sulfide-based or oxide-based inorganic material, or a solid electrolyte including a polymer material such as a polyethylene oxide (PEO)-based polymer material may alternatively be used. When the solid electrolyte is used, a separator and a spacer are not necessary. Furthermore, the battery can be entirely solidified; therefore, there is no possibility of liquid leakage and thus the safety of the battery is dramatically improved.

[Separator]

The secondary battery preferably includes a separator. The separator can be formed using, for example, paper, nonwoven fabric, glass fiber, ceramics, or synthetic fiber containing nylon (polyamide), vinylon (polyvinyl alcohol-based fiber), polyester, acrylic, polyolefin, or polyurethane. The separator is preferably formed to have an envelope-like shape to wrap one of the positive electrode and the negative electrode.

The separator may have a multilayer structure. For example, an organic material film of polypropylene, polyethylene, or the like can be coated with a ceramic-based material, a fluorine-based material, a polyamide-based material, a mixture thereof, or the like. Examples of the ceramic-based material include aluminum oxide particles and silicon oxide particles. Examples of the fluorine-based material include PVDF and polytetrafluoroethylene. Examples of the polyamide-based material include nylon and aramid (meta-based aramid and para-based aramid).

When the separator is coated with the ceramic-based material, the oxidation resistance is improved; hence, deterioration of the separator in charging and discharging at a high voltage can be suppressed and thus the reliability of the secondary battery can be improved. When the separator is coated with the fluorine-based material, the separator is easily brought into close contact with an electrode, resulting in high output characteristics. When the separator is coated with the polyamide-based material, in particular, aramid, the safety of the secondary battery is improved because heat resistance is improved.

For example, both surfaces of a polypropylene film may be coated with a mixed material of aluminum oxide and aramid. Alternatively, a surface of a polypropylene film that is in contact with the positive electrode may be coated with a mixed material of aluminum oxide and aramid, and a surface of the polypropylene film that is in contact with the negative electrode may be coated with the fluorine-based material.

With the use of a separator having a multilayer structure, the capacity per volume of the secondary battery can be increased because the safety of the secondary battery can be maintained even when the total thickness of the separator is small.

[Exterior Body]

For an exterior body included in the secondary battery, a metal material such as aluminum or a resin material can be used, for example. A film-like exterior body can also be used. As the film, for example, it is possible to use a film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided over the metal thin film as the outer surface of the exterior body.

<Structure Example 2 of Secondary Battery>

A structure of a secondary battery including a solid electrolyte layer will be described below as another structure example of a secondary battery.

Figure 14A:
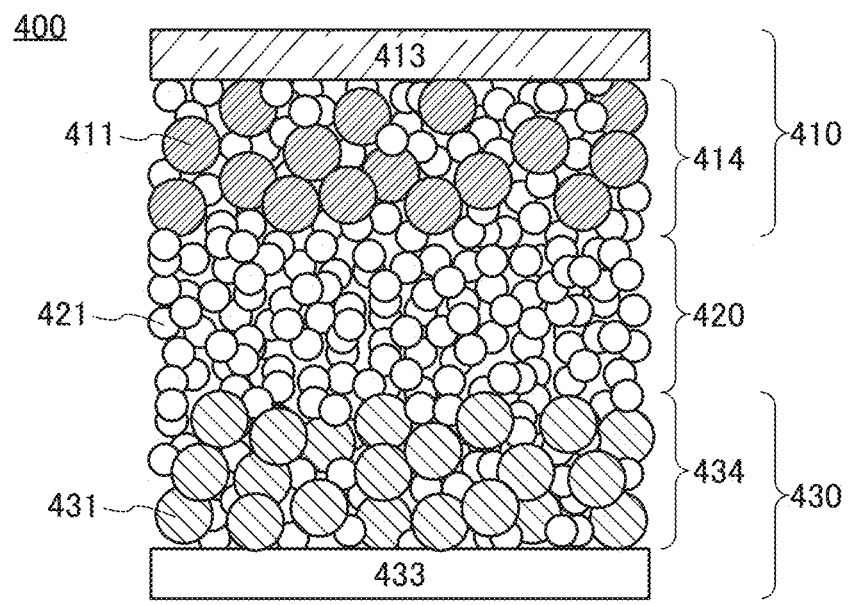
FIGS. 14A and 14B illustrate examples of a secondary battery.

As illustrated in FIG. 14A, a secondary battery 400 of one embodiment of the present invention includes a positive electrode 410, a solid electrolyte layer 420, and a negative electrode 430.

The positive electrode 410 includes a positive electrode current collector 413 and a positive electrode active material layer 414. The positive electrode active material layer 414 includes a positive electrode active material 411 and a solid electrolyte 421. The positive electrode active material layer 414 may also include a conductive additive and a binder.

The solid electrolyte layer 420 includes the solid electrolyte 421. The solid electrolyte layer 420 is positioned between the positive electrode 410 and the negative electrode 430 and is a region that includes neither the positive electrode active material 411 nor a negative electrode active material 431.

Figure 14B:
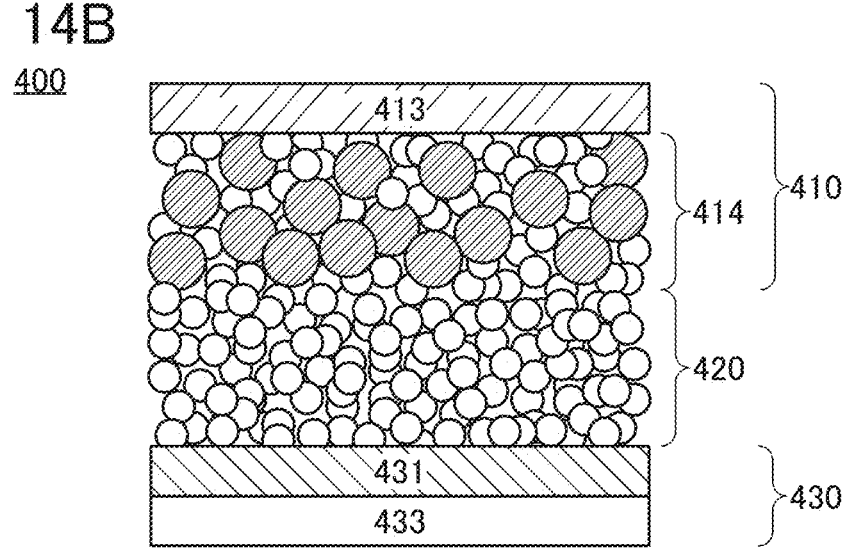

The negative electrode 430 includes a negative electrode current collector 433 and a negative electrode active material layer 434. The negative electrode active material layer 434 includes the negative electrode active material 431 and the solid electrolyte 421. The negative electrode active material layer 434 may also include a conductive additive and a binder. Note that when metal lithium is used for the negative electrode 430, it is possible that the negative electrode 430 does not include the solid electrolyte 421 as illustrated in FIG. 14B. The use of metal lithium for the negative electrode 430 is preferable because the energy density of the secondary battery 400 can be increased.

As the solid electrolyte 421 included in the solid electrolyte layer 420, a sulfide-based solid electrolyte, an oxide-based solid electrolyte, or a halide-based solid electrolyte can be used, for example.

Examples of the sulfide-based solid electrolyte include a thio-silicon-based material (e.g., $Li_{10}GeP_2S_{12}$ and $Li_{3.25}Ge_{0.25}P_{0.75}S_4$), sulfide glass (e.g., $70Li_2S \cdot 30P_2S_5$, $30Li_2S \cdot 26B_2S_3 \cdot 44LiI$, $63Li_2S \cdot 38SiS_2 \cdot 1Li_3PO_4$, $57Li_2S \cdot 38SiS_2 \cdot 5Li_4SiO_4$, and $50Li_2S \cdot 50GeS_2$), and sulfide-based crystallized glass (e.g., $Li_7P_3S_{11}$ and $Li_{3.25}P_{0.95}S_4$). The sulfide-based solid electrolyte has advantages such as high conductivity of some materials, low-temperature synthesis, and ease of maintaining a path for electrical conduction after charging and discharging because of its relative softness.

Examples of the oxide-based solid electrolyte include a material with a perovskite crystal structure (e.g., $La_{2/3-x}Li_{3x}TiO_3$), a material with a NASICON crystal structure (e.g., $Li_{1+x}Al_xTi_{2-x}(PO_4)_3$), a material with a garnet crystal structure (e.g., $Li_7La_3Zr_2O_{12}$), a material with a LISICON crystal structure (e.g., $Li_{14}ZnGe_4O_{16}$), oxide glass (e.g., $Li_3PO_4$—$Li_4SiO_4$ and $50Li_4SiO_4 \cdot 50Li_3BO_3$), and oxide-based crystallized glass (e.g., $Li_{1.07}Al_{0.69}Ti_{1.46}(PO_4)_3$ and $Li_{1.5}Al_{0.5}Ge_{1.5}(PO_4)_3$). The oxide-based solid electrolyte has an advantage of stability in the air.

Examples of the halide-based solid electrolyte include $LiAlCl_4$, $Li_3InBr_6$, LiF, LiCl, LiBr, and LiI. Moreover, a composite material in which pores of porous aluminum oxide or porous silica are filled with such a halide-based solid electrolyte can be used as the solid electrolyte.

Alternatively, a plurality of solid electrolytes may be mixed and used.

In particular, $Li_{1+x}Al_xTi_{2-x}(PO_4)_3 (0 \leq x \leq 1)$ having a NASICON crystal structure (hereinafter, LATP) is preferable because LATP contains aluminum and titanium, each of which is the element the positive electrode active material used in the secondary battery 400 of one embodiment of the present invention is allowed to contain, and thus a synergistic effect of improving the cycling performance is expected. Moreover, higher productivity due to the reduction in the number of steps is expected. Note that in this specification and the like, a material having a NASICON crystal structure refers to a compound that is represented by $M_2(XO_4)_3$(M: transition metal; X: S, P, As, Mo, W, or the like) and has a structure in which $MO_6$ octahedra and $XO_4$ tetrahedra that share common corners are arranged three-dimensionally.

[Exterior Body and Shape of Secondary Battery]

An exterior body of the secondary battery 400 of one embodiment of the present invention can be formed using a variety of materials and have a variety of shapes, and preferably has a function of applying pressure to the positive electrode, the solid electrolyte layer, and the negative electrode.

Figure 15A:
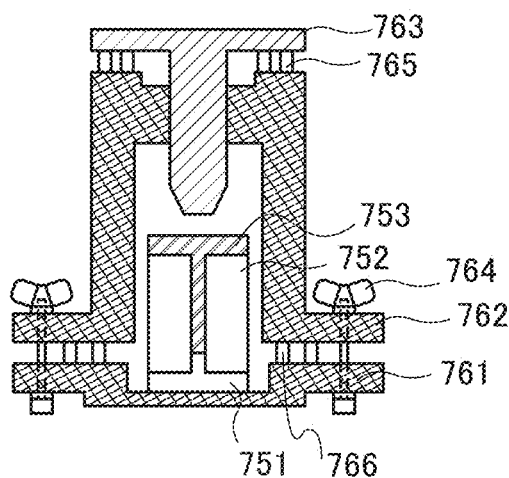
FIGS. 15A to 15C illustrate an example of a secondary battery.
Figure 15B:
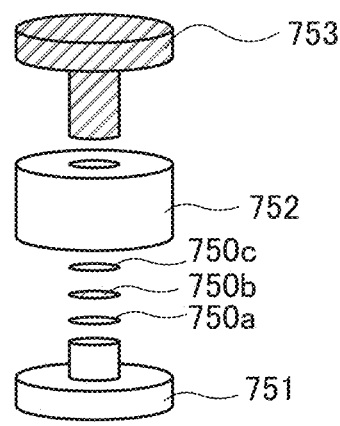
Figure 15C:
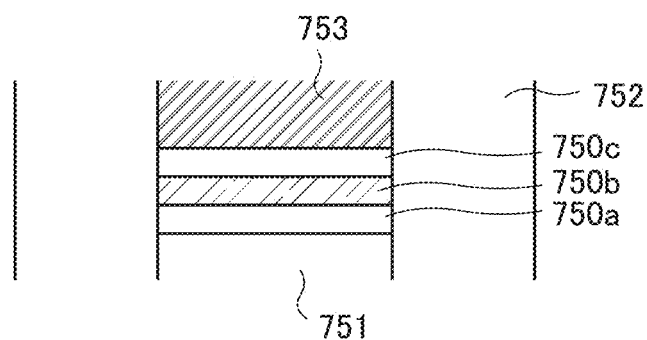

FIGS. 15A to 15C show an example of a cell for evaluating materials of an all-solid-state battery.

FIG. 15A is a schematic cross-sectional view of the evaluation cell. The evaluation cell includes a lower component 761, an upper component 762, and a fixation screw and a butterfly nut 764 for fixing these components. By rotating a pressure screw 763, an electrode plate 753 is pressed to fix an evaluation material. An insulator 766 is provided between the lower component 761 and the upper component 762 that are made of a stainless steel material. An O ring 765 for hermetic sealing is provided between the upper component 762 and the pressure screw 763.

The evaluation material is placed on an electrode plate 751, surrounded by an insulating tube 752, and pressed from above by the electrode plate 753. FIG. 15B is an enlarged perspective view of the evaluation material and its vicinity.

A stack of a positive electrode 750a, a solid electrolyte layer 750b, and a negative electrode 750c is shown here as an example of the evaluation material, and its cross section is shown in FIG. 15C. Note that the same portions in FIGS. 15A to 15C are denoted by the same reference numerals.

The electrode plate 751 and the lower component 761 that are electrically connected to the positive electrode 750a correspond to a positive electrode terminal. The electrode plate 753 and the upper component 762 that are electrically connected to the negative electrode 750c correspond to a negative electrode terminal. The electric resistance or the like can be measured while pressure is applied to the evaluation material through the electrode plate 751 and the electrode plate 753.

The exterior body of the secondary battery of one embodiment of the present invention is preferably a package having excellent airtightness. For example, a ceramic package or a resin package can be used. When the exterior body is sealed, the air is preferably blocked in a closed atmosphere, for example, in a glove box.

Figure 16A:
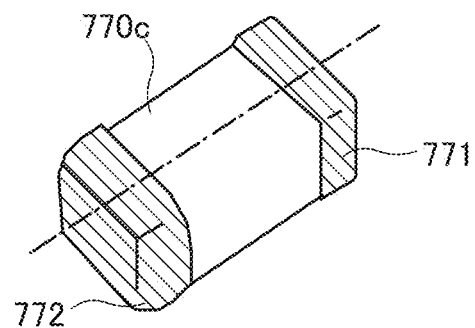
FIGS. 16A and 16B illustrate an example of a secondary battery.

FIG. 16A is a perspective view of a secondary battery of one embodiment of the present invention that has an exterior body and a shape different from those in FIGS. 15A to 15C. The secondary battery in FIG. 16A includes external electrodes 771 and 772 and is sealed with an exterior body including a plurality of package components.

Figure 16B:
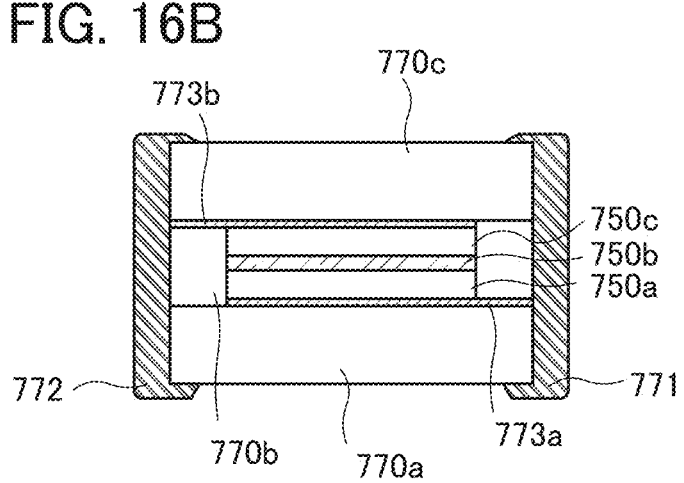

FIG. 16B illustrates an example of a cross section along the dashed-dotted line in FIG. 16A. A stack including the positive electrode 750a, the solid electrolyte layer 750b, and the negative electrode 750c is surrounded and sealed by a package component 770a including an electrode layer 773a on a flat plate, a frame-like package component 770b, and a package component 770c including an electrode layer 773b on a flat plate. For the package components 770a, 770b, and 770c, an insulating material such as a resin material or ceramic can be used.

The external electrode 771 is electrically connected to the positive electrode 750a through the electrode layer 773a and functions as a positive electrode terminal. The external electrode 772 is electrically connected to the negative electrode 750c through the electrode layer 773b and functions as a negative electrode terminal.

This embodiment can be implemented in appropriate combination with any of the other embodiments.

Embodiment 6

In this embodiment, examples of the shape of a secondary battery including the positive electrode described in the above embodiment will be described. For the materials used for the secondary battery described in this embodiment, refer to the description of the above embodiment.

<Coin-Type Secondary Battery>

Figure 17A:
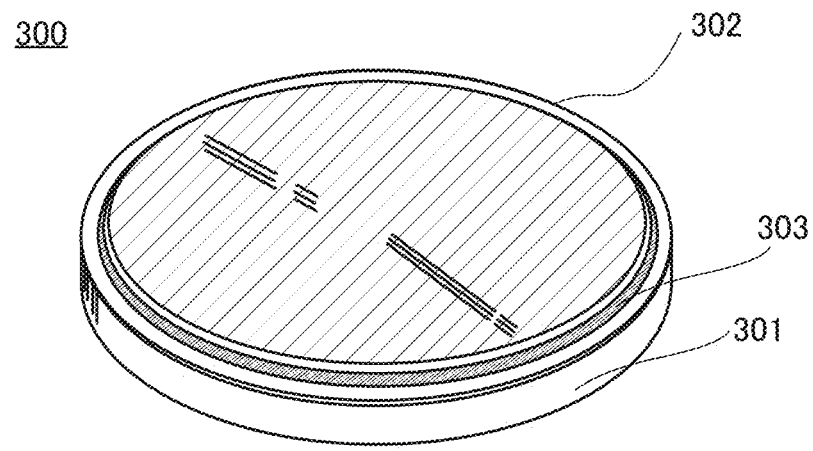
FIGS. 17A to 17C illustrate a coin-type secondary battery.
Figure 17B:
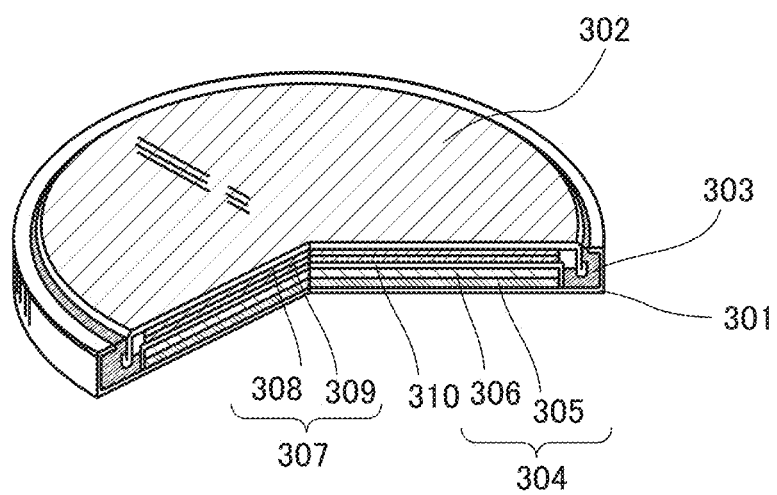

First, an example of a coin-type secondary battery is described. FIG. 17A is an external view of a coin-type (single-layer flat-type) secondary battery, and FIG. 17B is a cross-sectional view thereof.

In a coin-type secondary battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. A negative electrode 307 includes a negative electrode current collector 308 and a negative electrode active material layer 309 provided in contact with the negative electrode current collector 308.

Note that only one surface of each of the positive electrode 304 and the negative electrode 307 used for the coin-type secondary battery 300 is provided with an active material layer.

For the positive electrode can 301 and the negative electrode can 302, a metal having corrosion resistance to an electrolyte solution, such as nickel, aluminum, or titanium, an alloy of such a metal, or an alloy of such a metal and another metal (e.g., stainless steel) can be used. The positive electrode can 301 and the negative electrode can 302 are preferably covered with nickel, aluminum, or the like in order to prevent corrosion due to the electrolyte solution. The positive electrode can 301 and the negative electrode can 302 are electrically connected to the positive electrode 304 and the negative electrode 307, respectively.

The negative electrode 307, the positive electrode 304, and a separator 310 are immersed in the electrolyte solution. Then, as illustrated in FIG. 17B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 located therebetween. In this manner, the coin-type secondary battery 300 is manufactured.

When the positive electrode active material described in the above embodiment is used in the positive electrode 304, the coin-type secondary battery 300 can have high capacity and excellent cycling performance.

Here, a current flow in charging a secondary battery is described with reference to FIG. 17C. When a secondary battery using lithium is regarded as a closed circuit, lithium ions transfer and a current flows in the same direction. Note that in the secondary battery using lithium, an anode and a cathode change places in charging and discharging, and an oxidation reaction and a reduction reaction occur on the corresponding sides; hence, an electrode with a high reaction potential is called a positive electrode and an electrode with a low reaction potential is called a negative electrode. For this reason, in this specification, the positive electrode is referred to as a "positive electrode" or a "plus electrode" and the negative electrode is referred to as a "negative electrode" or a "minus electrode" in all the cases where charging is performed, discharging is performed, a reverse pulse current is supplied, and a charge current is supplied. The use of the terms "anode" and "cathode", which are related to an oxidation reaction and a reduction reaction, might cause confusion because the anode and the cathode change places at the time of charging and discharging. Therefore, the terms "anode" and "cathode" are not used in this specification. If the term "anode" or "cathode" is used, whether it is at the time of charging or discharging is noted, as well as whether the term corresponds to a positive (plus) electrode or a negative (minus) electrode.

Figure 17C:
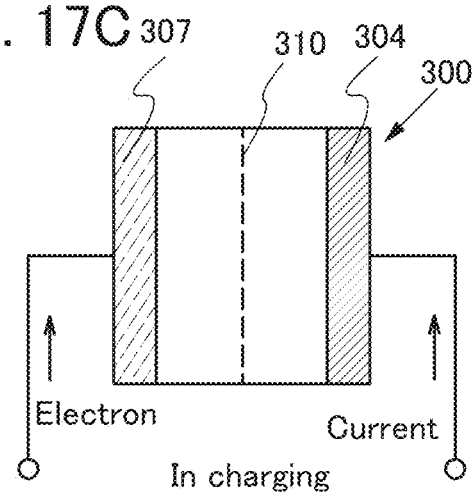

A charger is connected to the two terminals in FIG. 17C, and the secondary battery 300 is charged. As the charging of the secondary battery 300 proceeds, a potential difference between the electrodes increases.

<Cylindrical Secondary Battery>

Figure 18A:
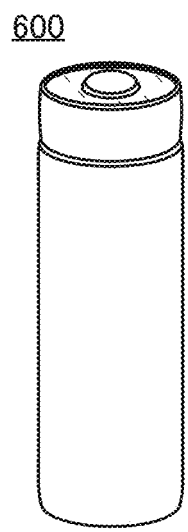
FIGS. 18A to 18D illustrate a cylindrical secondary battery.
Figure 18B:
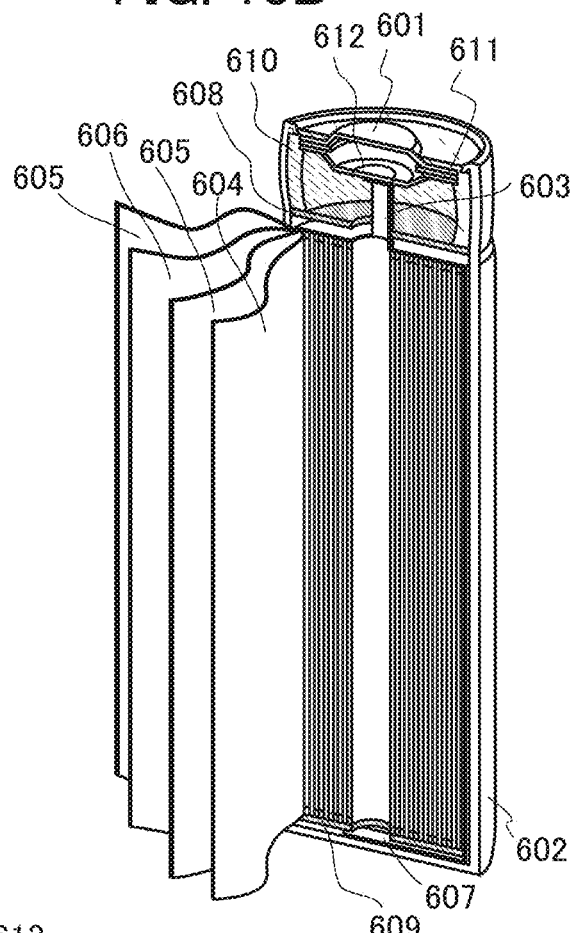

Next, an example of a cylindrical secondary battery is described with reference to FIGS. 18A to 18D. FIG. 18A is an external view of a cylindrical secondary battery 600. FIG. 18B is a schematic cross-sectional view of the cylindrical secondary battery 600. As illustrated in FIG. 18B, the cylindrical secondary battery 600 includes a positive electrode cap (battery lid) 601 on the top surface and a battery can (outer can) 602 on the side and bottom surfaces. The positive electrode cap 601 and the battery can (outer can) 602 are insulated from each other by a gasket (insulating gasket) 610.

Inside the battery can 602 having a hollow cylindrical shape, a battery element in which a strip-like positive electrode 604 and a strip-like negative electrode 606 are wound with a strip-like separator 605 located therebetween is provided. Although not illustrated, the battery element is wound around a center pin. One end of the battery can 602 is close and the other end thereof is open. For the battery can 602, a metal having corrosion resistance to an electrolyte solution, such as nickel, aluminum, or titanium, an alloy of such a metal, or an alloy of such a metal and another metal (e.g., stainless steel) can be used. The battery can 602 is preferably covered with nickel, aluminum, or the like in order to prevent corrosion due to the electrolyte solution. Inside the battery can 602, the battery element in which the positive electrode, the negative electrode, and the separator are wound is provided between a pair of insulating plates 608 and 609 that face each other. Furthermore, the inside of the battery can 602 provided with the battery element is filled with a nonaqueous electrolyte solution (not illustrated). As the nonaqueous electrolyte solution, an electrolyte solution similar to that for the coin-type secondary battery can be used.

Since the positive electrode and the negative electrode of the cylindrical storage battery are wound, active materials are preferably formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. The PTC element 611, which is a thermally sensitive resistor whose resistance increases as temperature rises, limits the amount of current by increasing the resistance, in order to prevent abnormal heat generation. Barium titanate (BaTiO$_3$)-based semiconductor ceramic or the like can be used for the PTC element.

Figure 18C:
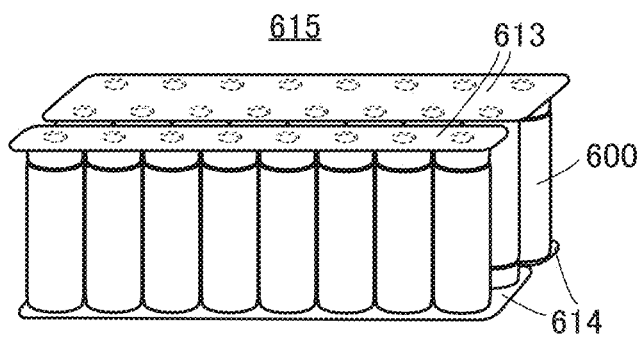

As illustrated in FIG. 18C, a plurality of secondary batteries 600 may be sandwiched between a conductive plate 613 and a conductive plate 614 to form a module 615. The plurality of secondary batteries 600 may be connected in parallel, connected in series, or connected in series after being connected in parallel. With the module 615 including the plurality of secondary batteries 600, large electric power can be extracted.

Figure 18D:
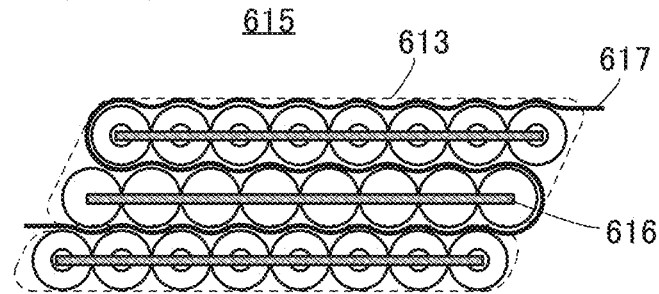

FIG. 18D is a top view of the module 615. The conductive plate 613 is shown by a dotted line for clarity of the drawing. As illustrated in FIG. 18D, the module 615 may include a conductive wire 616 that electrically connects the plurality of secondary batteries 600 to each other. The conductive plate can be provided over the conductive wire 616 to overlap each other. In addition, a temperature control device 617 may be provided between the plurality of secondary batteries 600. The secondary batteries 600 can be cooled with the temperature control device 617 when overheated, whereas the secondary batteries 600 can be heated with the temperature control device 617 when cooled too much. Thus, the performance of the module 615 is less likely to be influenced by the outside temperature. A heating medium included in the temperature control device 617 preferably has an insulating property and incombustibility.

When the positive electrode active material described in the above embodiment is used in the positive electrode 604, the cylindrical secondary battery 600 can have high capacity and excellent cycling performance.

<Structure Example of Secondary Battery>

Other structure examples of secondary batteries will be described with reference to FIGS. 19A and 19B, FIGS. 20A to 20D, FIGS. 21A and 21B, FIG. 22, and FIGS. 23A to 23C.

Figure 19A:
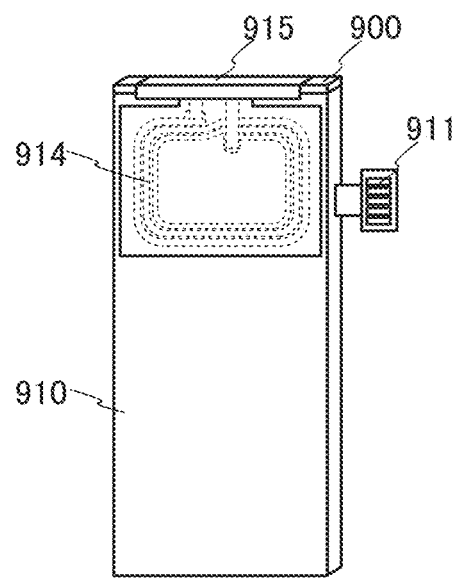
FIGS. 19A and 19B illustrate an example of a secondary battery.
Figure 19B:
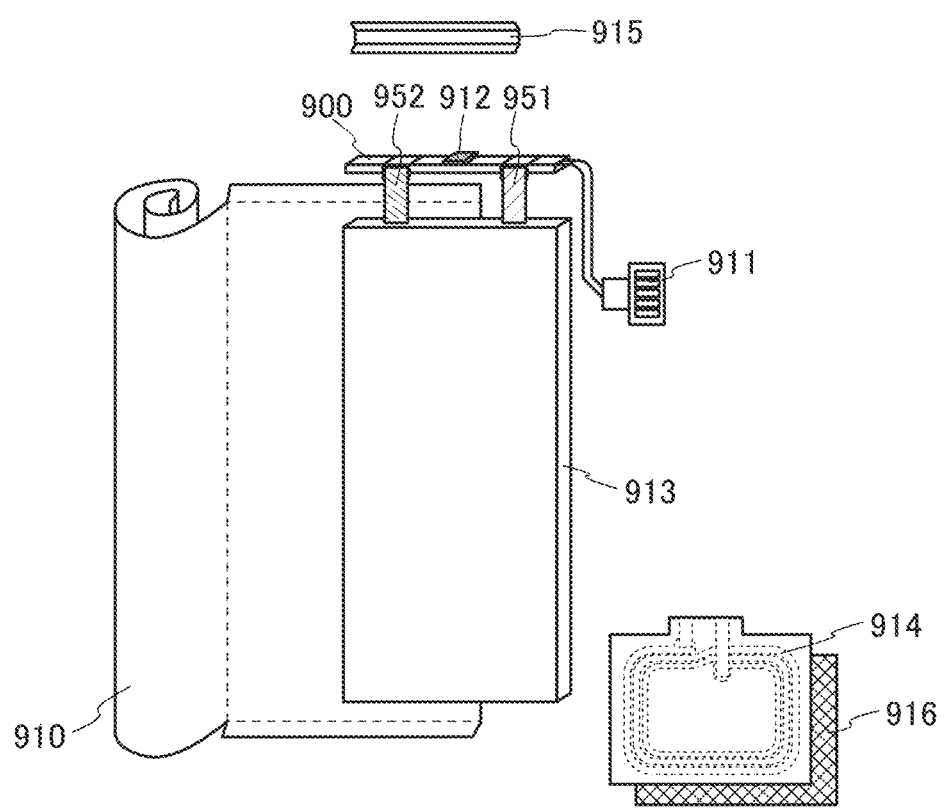

FIGS. 19A and 19B are external views of a battery pack. The battery pack includes a secondary battery 913 and a circuit board 900. The secondary battery 913 is connected to an antenna 914 through the circuit board 900. A label 910 is attached to the secondary battery 913. In addition, as illustrated in FIG. 19B, the secondary battery 913 is connected to a terminal 951 and a terminal 952. The circuit board 900 is fixed by a sealant 915.

The circuit board 900 includes a terminal 911 and a circuit 912. The terminal 911 is connected to the terminals 951 and 952, the antenna 914, and the circuit 912. Note that a plurality of terminals 911 may be provided to serve separately as a control signal input terminal, a power supply terminal, and the like.

The circuit 912 may be provided on the rear surface of the circuit board 900. Note that the shape of the antenna 914 is not limited to a coil shape and may be a linear shape or a plate shape. Furthermore, a planar antenna, an aperture antenna, a traveling-wave antenna, an EH antenna, a magnetic-field antenna, a dielectric antenna, or the like may be used. Alternatively, the antenna 914 may be a flat-plate conductor. The flat-plate conductor can serve as one of conductors for electric field coupling. That is, the antenna 914 can serve as one of two conductors of a capacitor. Thus, electric power can be transmitted and received not only by an electromagnetic field or a magnetic field but also by an electric field.

The battery pack includes a layer 916 between the secondary battery 913 and the antenna 914. The layer 916 has a function of blocking an electromagnetic field from the secondary battery 913, for example. As the layer 916, for example, a magnetic body can be used.

Note that the structure of the battery pack is not limited to that shown in FIGS. 19A and 19B.

Figure 20A:
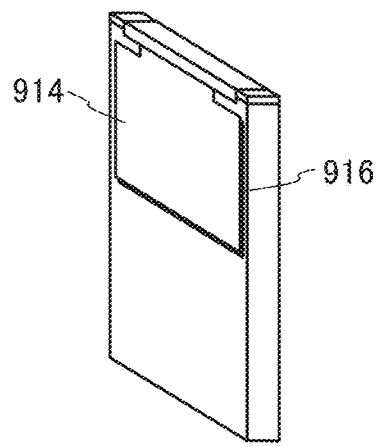
FIGS. 20A to 20D illustrate examples of a secondary battery.
Figure 20B:
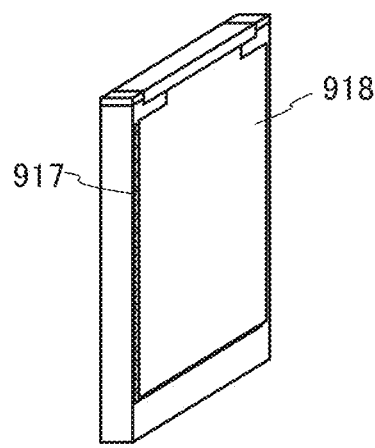

For example, as shown in FIGS. 20A and 20B, two opposite surfaces of the secondary battery 913 in FIGS. 19A and 19B may be provided with respective antennas. FIG. 20A is an external view illustrating one of the two surfaces, and FIG. 20B is an external view illustrating the other of the two surfaces. For portions identical to those in FIGS. 19A and 19B, refer to the description of the secondary battery illustrated in FIGS. 19A and 19B as appropriate.

As illustrated in FIG. 20A, the antenna 914 is provided on one of the opposite surfaces of the secondary battery 913 with the layer 916 located therebetween. As illustrated in FIG. 20B, an antenna 918 is provided on the other of the opposite surfaces of the secondary battery 913 with a layer 917 located therebetween. The layer 917 has a function of blocking an electromagnetic field from the secondary battery 913, for example. As the layer 917, for example, a magnetic body can be used.

With the above structure, both of the antennas 914 and 918 can be increased in size. The antenna 918 has a function of communicating data with an external device, for example. An antenna with a shape that can be used for the antenna 914, for example, can be used as the antenna 918. As a system for communication using the antenna 918 between the secondary battery and another device, a response method that can be used between the secondary battery and another device, such as near field communication (NFC), can be employed.

Figure 20C:
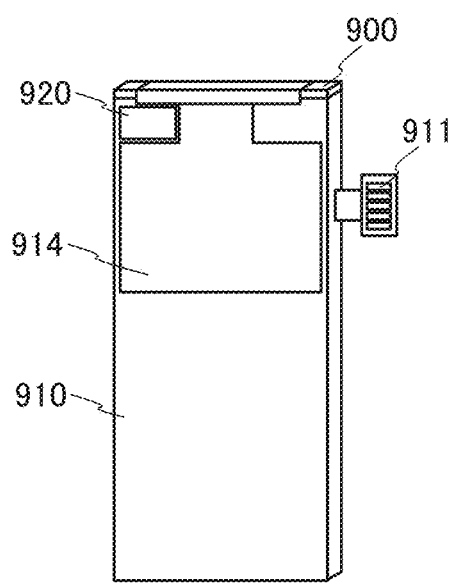

Alternatively, as illustrated in FIG. 20C, the secondary battery 913 in FIGS. 19A and 19B may be provided with a display device 920. The display device 920 is electrically connected to the terminal 911. Note that the label 910 is not necessarily provided in a portion where the display device 920 is provided. For portions identical to those in FIGS. 19A and 19B, refer to the description of the secondary battery illustrated in FIGS. 19A and 19B as appropriate.

The display device 920 can display, for example, an image showing whether charging is being carried out, an image showing the amount of stored power, or the like. As the display device 920, electronic paper, a liquid crystal display device, or an electroluminescent (EL) display device can be used, for instance. For example, the use of electronic paper can reduce power consumption of the display device 920.

Figure 20D:
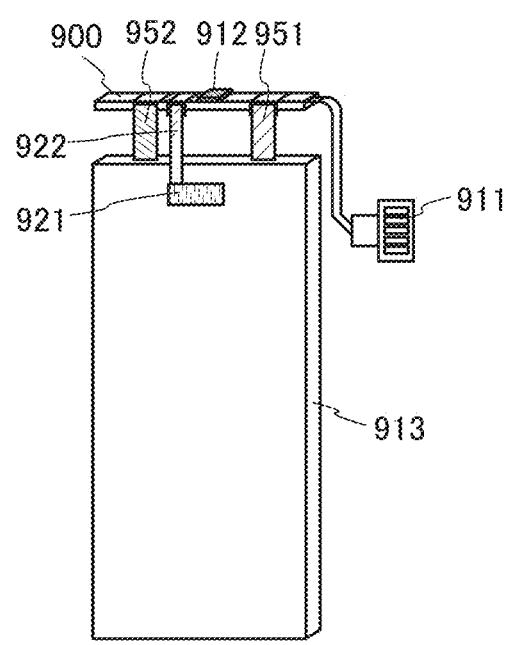

Alternatively, as illustrated in FIG. 20D, the secondary battery 913 in FIGS. 19A and 19B may be provided with a sensor 921. The sensor 921 is electrically connected to the terminal 911 via a terminal 922. For portions identical to those in FIGS. 19A and 19B, refer to the description of the secondary battery illustrated in FIGS. 19A and 19B as appropriate.

The sensor 921 has a function of measuring, for example, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays. With the sensor 921, for example, data on an environment where the secondary battery is placed (e.g., temperature) can be acquired and stored in a memory inside the circuit 912.

Another structure example of the secondary battery 913 is described with reference to FIGS. 21A and 21B and FIG. 22.

Figure 21A:
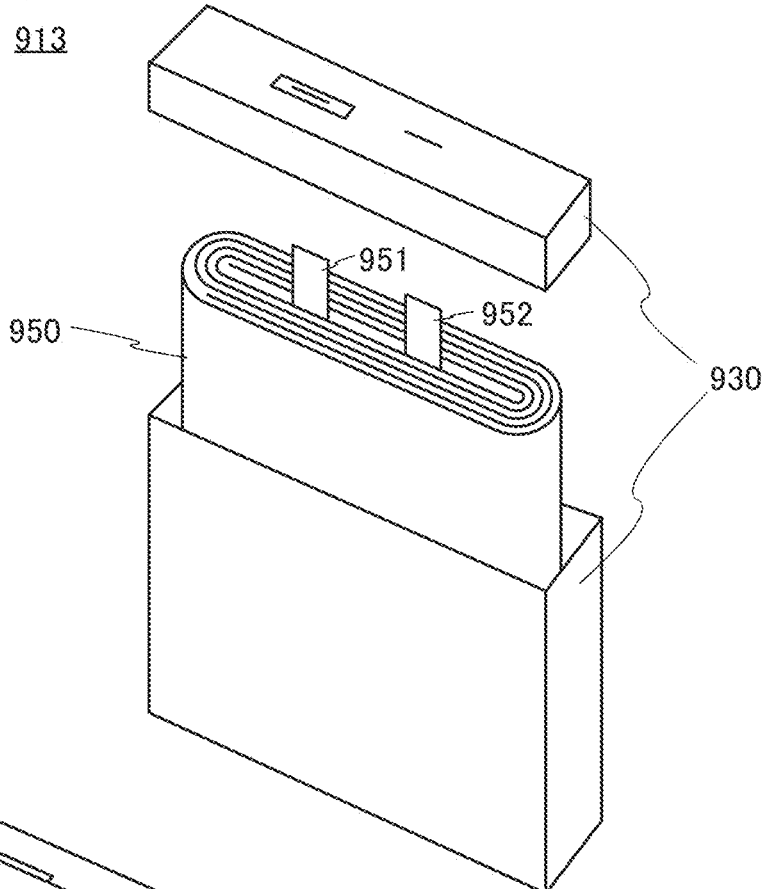
FIGS. 21A and 21B illustrate examples of a secondary battery.

The secondary battery 913 illustrated in FIG. 21A includes a wound body 950 provided with the terminals 951 and 952 inside a housing 930. The wound body 950 is immersed in an electrolyte solution inside the housing 930. The terminal 952 is in contact with the housing 930. An insulator or the like inhibits contact between the terminal 951 and the housing 930. Note that in FIG. 21A, the housing 930 divided into two pieces is illustrated for convenience; however, in the actual structure, the wound body 950 is covered with the housing 930 and the terminals 951 and 952 extend to the outside of the housing 930. For the housing 930, a metal material (e.g., aluminum) or a resin material can be used.

Figure 21B:
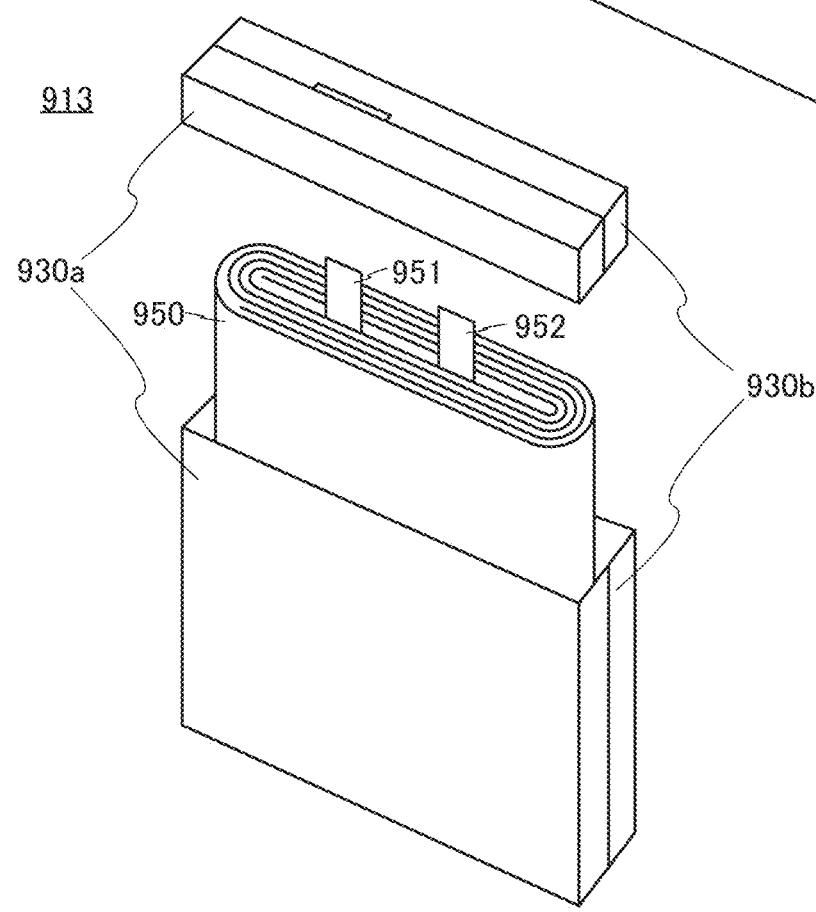

Note that as illustrated in FIG. 21B, the housing 930 in FIG. 21A may be formed using a plurality of materials. For example, in the secondary battery 913 in FIG. 21B, a housing 930a and a housing 930b are attached to each other, and the wound body 950 is provided in a region surrounded by the housing 930a and the housing 930b.

For the housing 930a, an insulating material such as an organic resin can be used. In particular, when a material such as an organic resin is used for the side on which an antenna is formed, blocking of an electric field by the secondary battery 913 can be inhibited. When an electric field is not significantly blocked by the housing 930a, an antenna such as the antenna 914 may be provided inside the housing 930a. For the housing 930b, a metal material can be used, for example.

Figure 22:
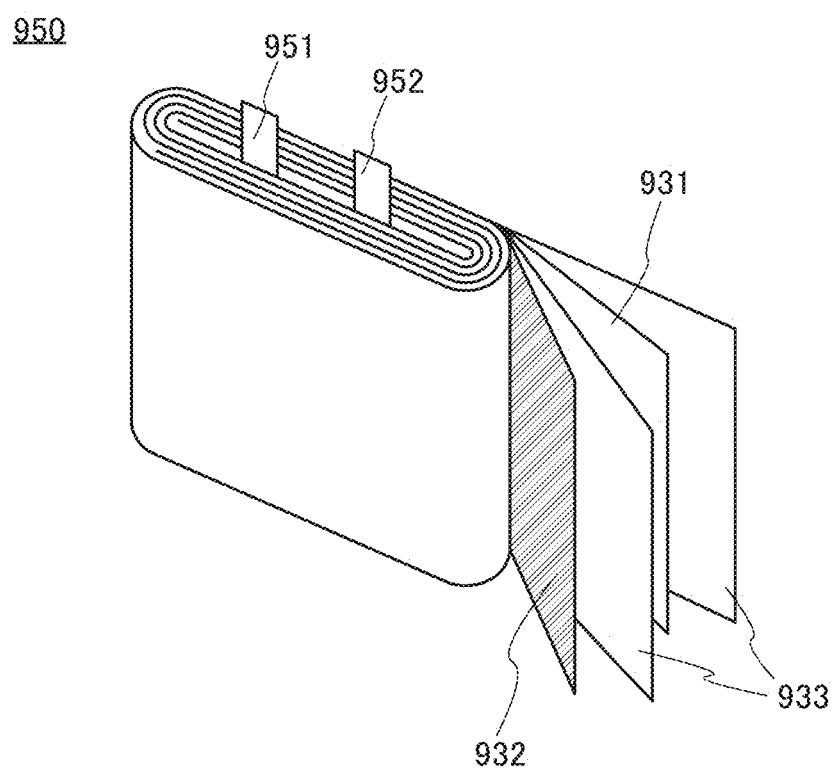
FIG. 22 illustrates an example of a secondary battery.

FIG. 22 illustrates the structure of the wound body 950. The wound body 950 includes a negative electrode 931, a positive electrode 932, and separators 933. The wound body 950 is obtained by winding a sheet of a stack in which the negative electrode 931 and the positive electrode 932 overlap with the separator 933 therebetween. Note that a plurality of stacks each including the negative electrode 931, the positive electrode 932, and the separators 933 may be overlaid.

The negative electrode 931 is connected to the terminal 911 in FIGS. 19A and 19B via one of the terminals 951 and

952. The positive electrode 932 is connected to the terminal 911 in FIGS. 19A and 19B via the other of the terminals 951 and 952.

When the positive electrode active material described in the above embodiment is used in the positive electrode 932, the secondary battery 913 can have high capacity and excellent cycling performance.

<Laminated Secondary Battery>

Next, examples of a laminated secondary battery will be described with reference to FIGS. 23A to 23C, FIGS. 24A and 24B, FIG. 25, FIG. 26, and FIGS. 27A to 27C.

When a laminated secondary battery has flexibility and is used in an electronic device at least part of which is flexible, the secondary battery can be bent accordingly as the electronic device is bent.

A laminated secondary battery 980 is described with reference to FIGS. 23A to 23C. The laminated secondary battery 980 includes a wound body 993 illustrated in FIG. 23A. The wound body 993 includes a negative electrode 994, a positive electrode 995, and separators 996. The wound body 993 is, like the wound body 950 illustrated in FIG. 22, obtained by winding a sheet of a stack in which the negative electrode 994 and the positive electrode 995 overlap with the separator 996 therebetween.

Note that the number of stacks each including the negative electrode 994, the positive electrode 995, and the separator 996 can be determined as appropriate depending on required capacity and element volume. The negative electrode 994 is connected to a negative electrode current collector (not illustrated) via one of a lead electrode 997 and a lead electrode 998. The positive electrode 995 is connected to a positive electrode current collector (not illustrated) via the other of the lead electrode 997 and the lead electrode 998.

Figure 23A:
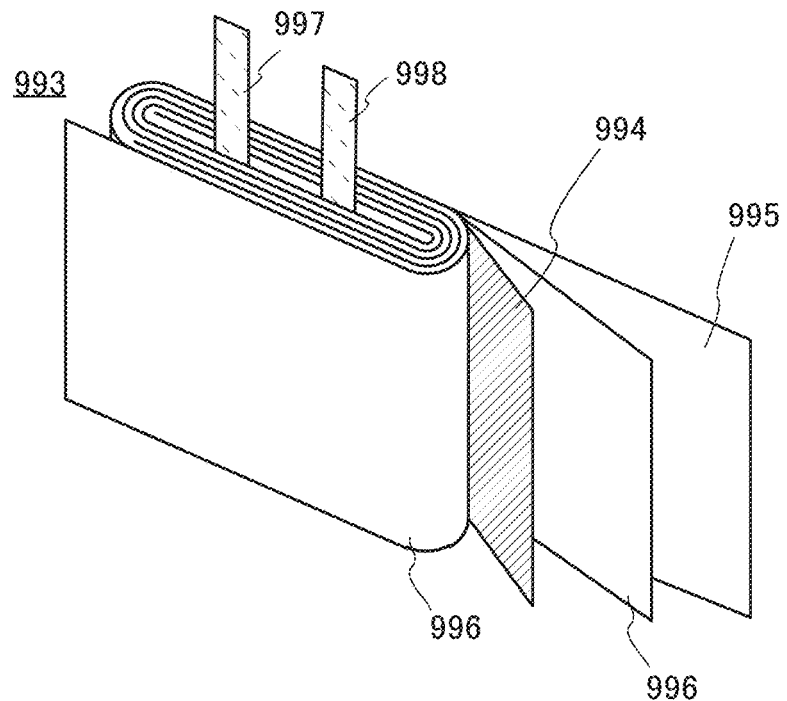
FIGS. 23A to 23C illustrate a laminated secondary battery.
Figure 23B:
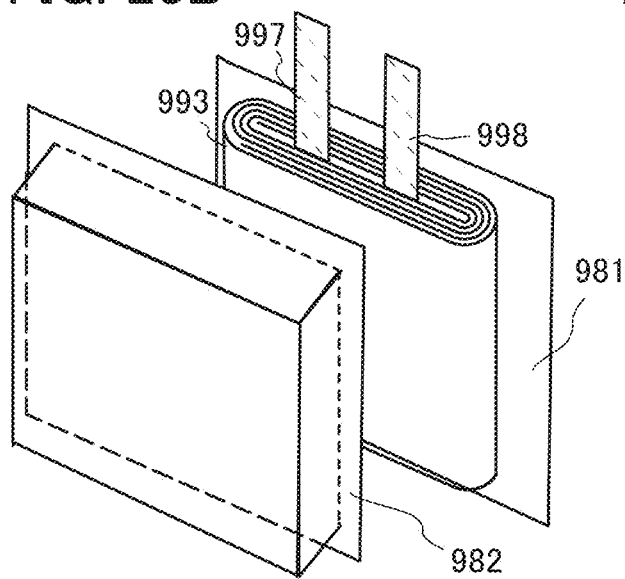
Figure 23C:
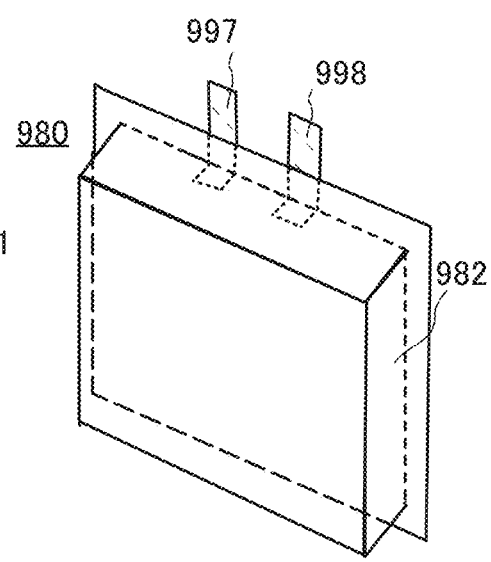

As illustrated in FIG. 23B, the wound body 993 is packed in a space formed by bonding a film 981 and a film 982 having a depression by thermocompression bonding or the like, whereby the secondary battery 980 can be formed as illustrated in FIG. 23C. Note that the film 981 and the film 982 serve as an exterior body. The wound body 993 includes the lead electrode 997 and the lead electrode 998, and is immersed in an electrolyte solution inside a space surrounded by the film 981 and the film 982 having a depression.

For the film 981 and the film 982 having a depression, a metal material such as aluminum or a resin material can be used, for example. With the use of a resin material for the film 981 and the film 982 having a depression, the film 981 and the film 982 having a depression can be changed in their forms when external force is applied; thus, a flexible storage battery can be manufactured.

Although FIGS. 23B and 23C illustrate an example in which a space is formed by the two films, the wound body 993 may be placed in a space formed by bending one film.

When the positive electrode active material described in the above embodiment is used in the positive electrode 995, the secondary battery 980 can have high capacity and excellent cycling performance.

Figure 24A:
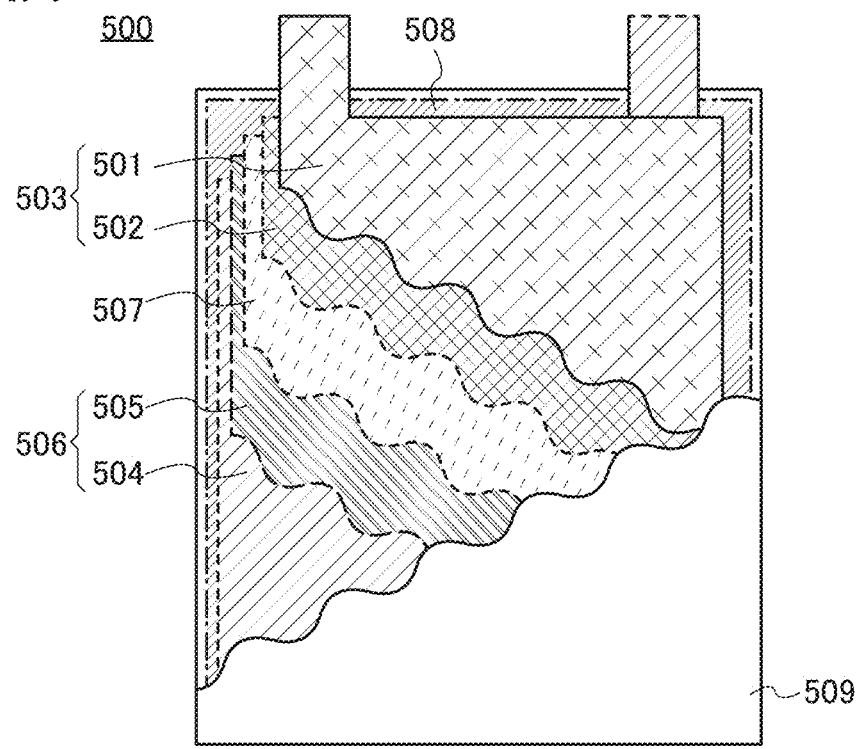
FIGS. 24A and 24B illustrate a laminated secondary battery.
Figure 24B:
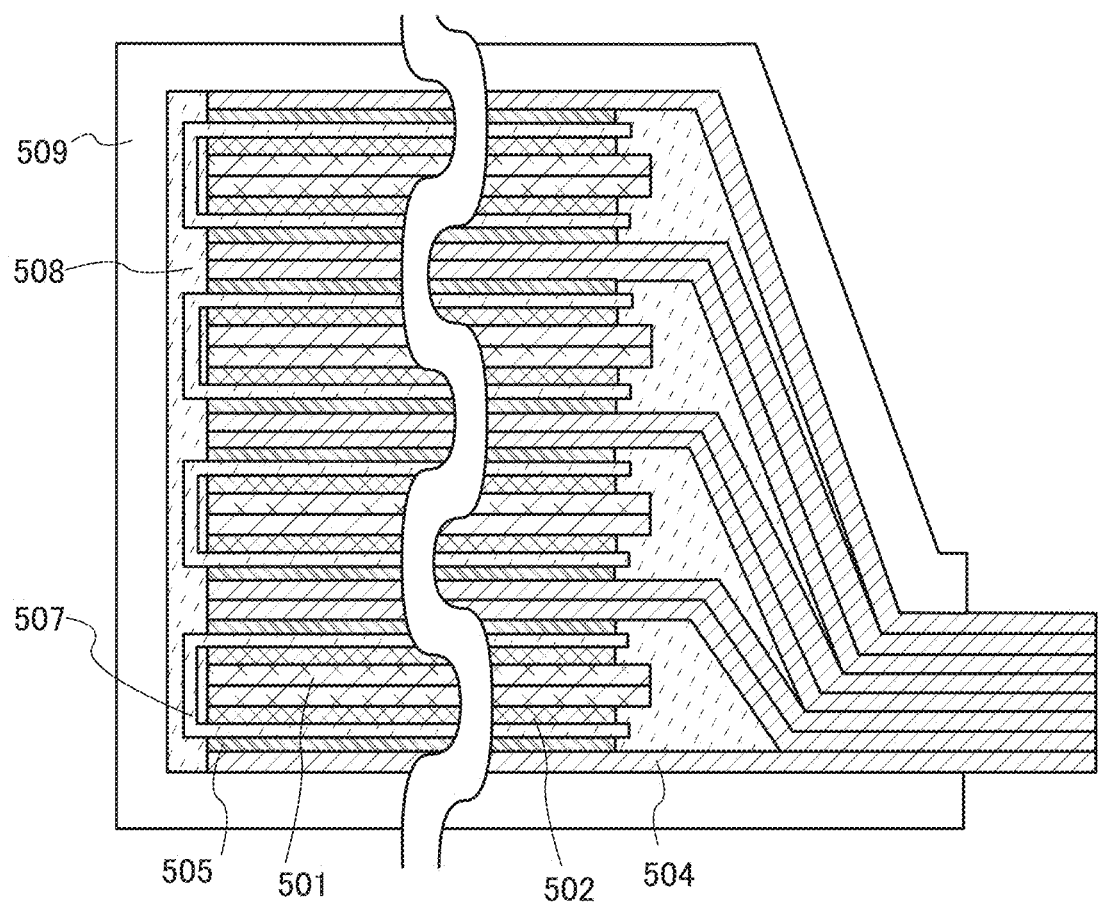

FIGS. 23A to 23C illustrate an example of the secondary battery 980 including a wound body in a space formed by films serving as an exterior body; alternatively, as illustrated in FIGS. 24A and 24B, a secondary battery may include a plurality of strip-shaped positive electrodes, a plurality of strip-shaped separators, and a plurality of strip-shaped negative electrodes in a space formed by films serving as an exterior body, for example.

A laminated secondary battery 500 illustrated in FIG. 24A includes a positive electrode 503 including a positive electrode current collector 501 and a positive electrode active material layer 502, a negative electrode 506 including a negative electrode current collector 504 and a negative electrode active material layer 505, a separator 507, an electrolyte solution 508, and an exterior body 509. The separator 507 is provided between the positive electrode 503 and the negative electrode 506 in the exterior body 509. The inside of the exterior body 509 is filled with the electrolyte solution 508. The electrolyte solution described in Embodiment 3 can be used as the electrolyte solution 508.

In the laminated secondary battery 500 illustrated in FIG. 24A, the positive electrode current collector 501 and the negative electrode current collector 504 also serve as terminals for obtaining electrical contact with the outside. For this reason, the positive electrode current collector 501 and the negative electrode current collector 504 may be arranged to be partly exposed to the outside of the exterior body 509. Alternatively, a lead electrode and the positive electrode current collector 501 or the negative electrode current collector 504 may be bonded to each other by ultrasonic welding, and instead of the positive electrode current collector 501 and the negative electrode current collector 504, the lead electrode may be exposed to the outside of the exterior body 509.

As the exterior body 509 in the laminated secondary battery 500, a laminate film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided over the metal thin film as the outer surface of the exterior body can be used, for example.

FIG. 24B illustrates an example of a cross-sectional structure of the laminated secondary battery 500. Although FIG. 24A illustrates an example in which two current collectors are included for simplicity, an actual battery includes a plurality of electrode layers as illustrated in FIG. 24B.

In FIG. 24B, the number of electrode layers is 16, for example. The laminated secondary battery 500 has flexibility even though including 16 electrode layers. FIG. 24B illustrates a structure including eight layers of negative electrode current collectors 504 and eight layers of positive electrode current collectors 501, i.e., 16 layers in total. Note that FIG. 24B illustrates a cross section of the lead portion of the negative electrode, and the eight negative electrode current collectors 504 are bonded to each other by ultrasonic welding. It is needless to say that the number of electrode layers is not limited to 16 and may be more than 16 or less than 16. With a large number of electrode layers, the secondary battery can have high capacity. By contrast, with a small number of electrode layers, the secondary battery can have small thickness and high flexibility.

Figure 25:
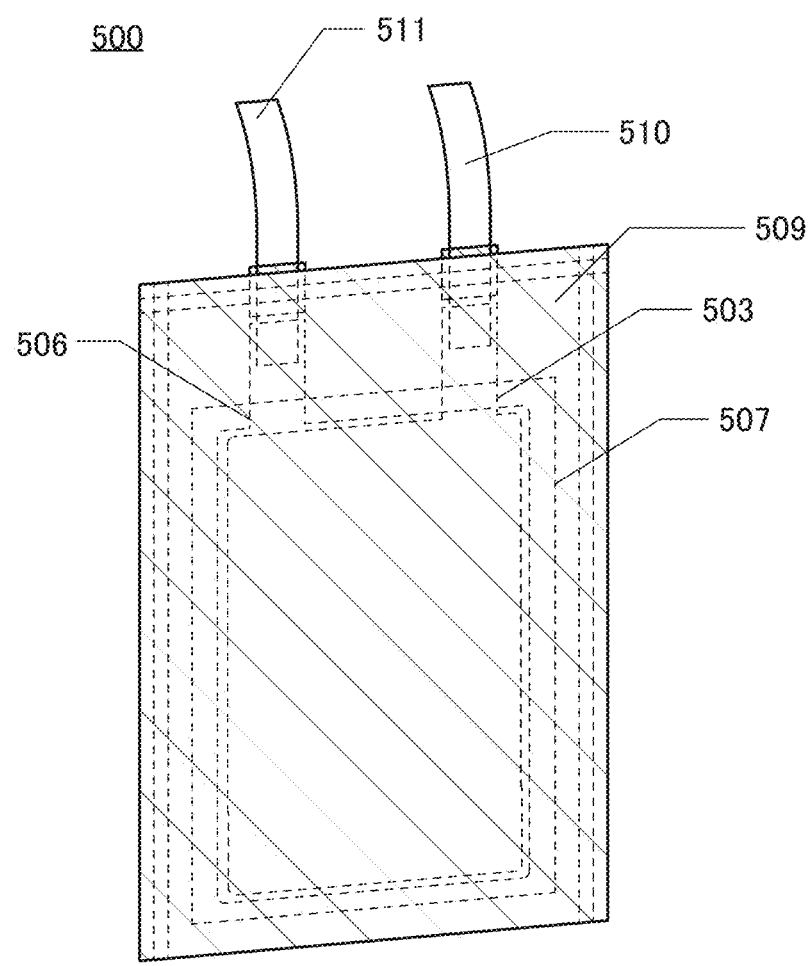
FIG. 25 is an external view of a secondary battery.
Figure 26:
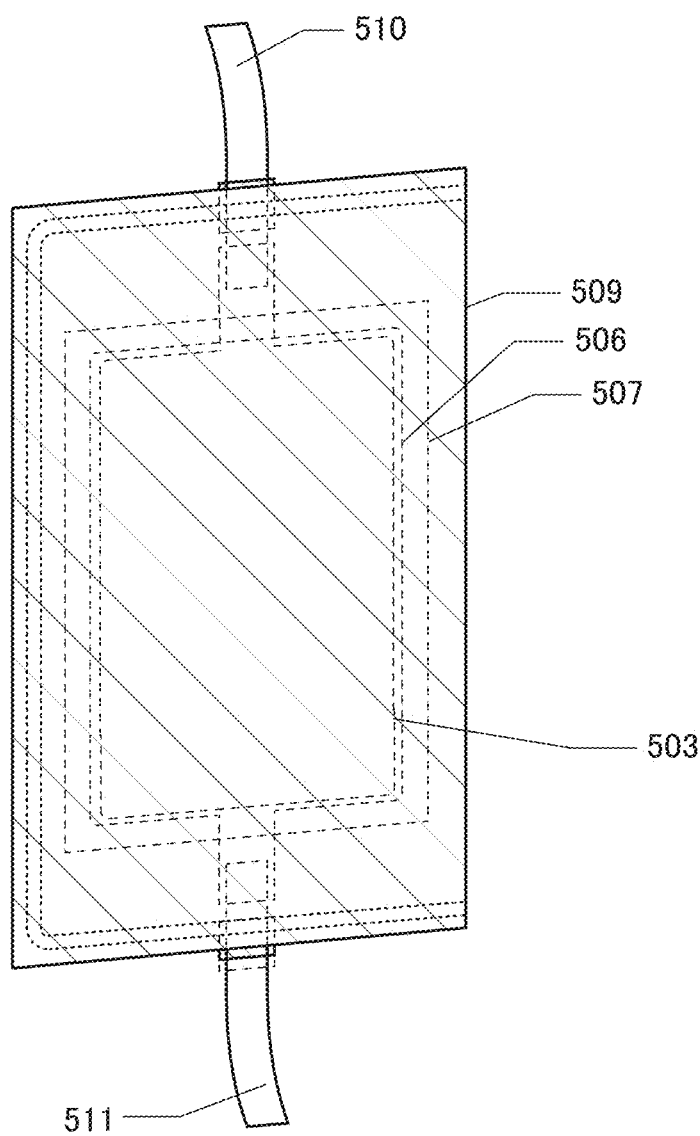
FIG. 26 is an external view of a secondary battery.

FIG. 25 and FIG. 26 illustrate examples of an external view of the laminated secondary battery 500. FIG. 25 and FIG. 26 illustrate the positive electrode 503, the negative electrode 506, the separator 507, the exterior body 509, a positive electrode lead electrode 510, and a negative electrode lead electrode 511.

Figure 27A:
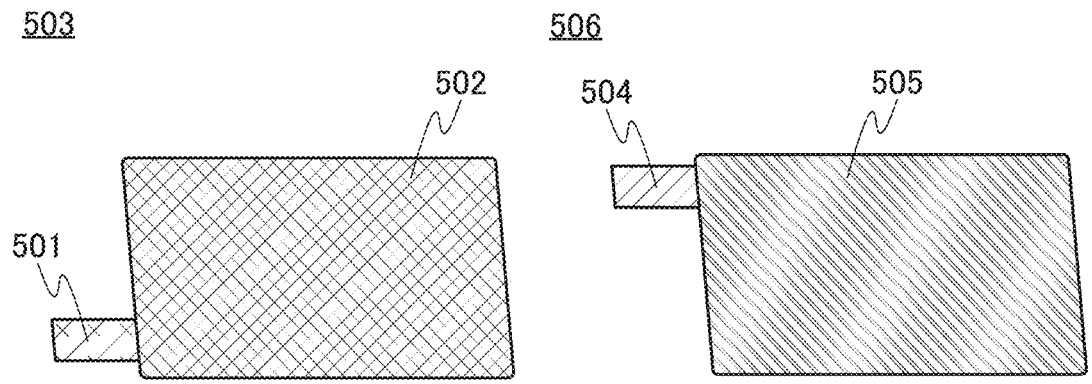
FIGS. 27A to 27C illustrate a method for forming a secondary battery.

FIG. 27A illustrates external views of the positive electrode 503 and the negative electrode 506. The positive electrode 503 includes the positive electrode current collector 501, and the positive electrode active material layer 502 is formed on a surface of the positive electrode current collector 501. The positive electrode 503 also includes a region where the positive electrode current collector 501 is partly exposed (hereinafter, referred to as a tab region). The negative electrode 506 includes the negative electrode current collector 504, and the negative electrode active material layer 505 is formed on a surface of the negative electrode current collector 504. The negative electrode 506 also includes a region where the negative electrode current collector 504 is partly exposed, that is, a tab region. The areas and the shapes of the tab regions included in the positive electrode and the negative electrode are not limited to those in the example illustrated in FIG. 27A.

<Method for Manufacturing Laminated Secondary Battery>

Figure 27B:
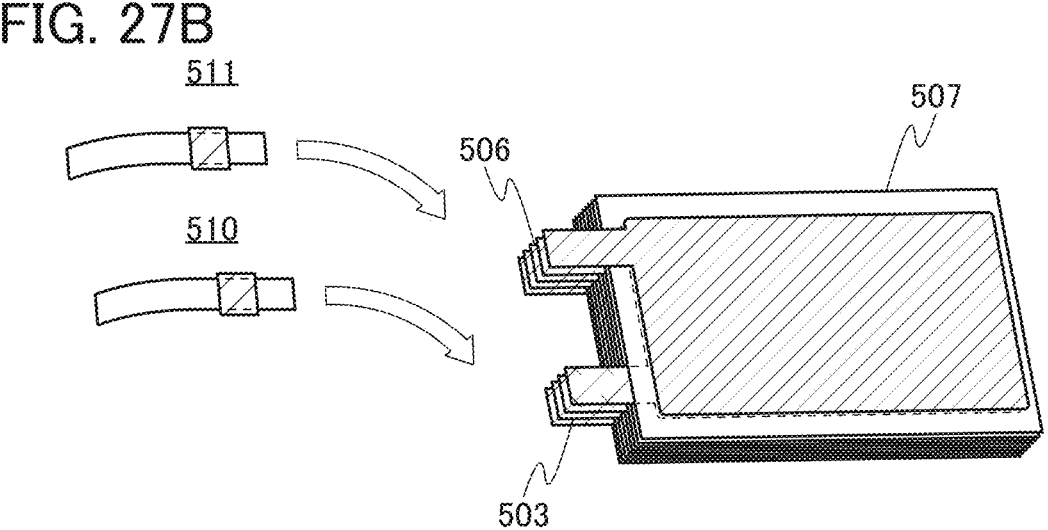

Here, an example of a method for manufacturing the laminated secondary battery whose external view is illustrated in FIG. 25 will be described with reference to FIGS. 27B and 27C.

First, the negative electrode 506, the separator 507, and the positive electrode 503 are stacked. FIG. 27B illustrates the stacked negative electrodes 506, separators 507, and positive electrodes 503. The secondary battery described here as an example includes five negative electrodes and four positive electrodes. Next, the tab regions of the positive electrodes 503 are bonded to each other, and the tab region of the positive electrode on the outermost surface and the positive electrode lead electrode 510 are bonded to each other. The bonding can be performed by ultrasonic welding, for example. In a similar manner, the tab regions of the negative electrodes 506 are bonded to each other, and the tab region of the negative electrode on the outermost surface and the negative electrode lead electrode 511 are bonded to each other.

Then, the negative electrodes 506, the separators 507, and the positive electrodes 503 are placed over the exterior body 509.

Figure 27C:
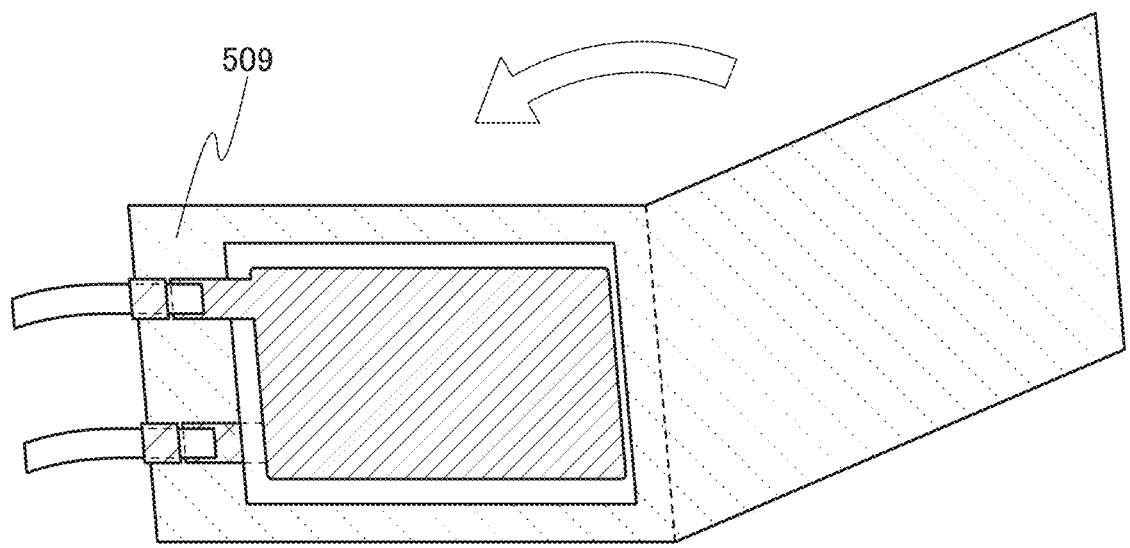

Subsequently, the exterior body 509 is folded along a dashed line as illustrated in FIG. 27C. Then, the outer edges of the exterior body 509 are bonded to each other. The bonding can be performed by thermocompression, for example. At this time, a part (or one side) of the exterior body 509 is left unbonded (to provide an inlet) so that the electrolyte solution 508 can be introduced later.

Next, the electrolyte solution 508 (not illustrated) is introduced into the exterior body 509 from the inlet of the exterior body 509. The electrolyte solution 508 is preferably introduced in a reduced pressure atmosphere or in an inert atmosphere. Lastly, the inlet is sealed by bonding. In this manner, the laminated secondary battery 500 can be manufactured.

When the positive electrode active material described in the above embodiment is used in the positive electrode 503, the secondary battery can have high capacity and excellent cycling performance.

In an all-solid-state battery, the contact state of the inside interface can be kept favorable by applying a predetermined pressure in the direction of stacking positive electrodes and negative electrodes. By applying a predetermined pressure in the direction of stacking the positive electrodes and the negative electrodes, the amount of expansion of the all-solid-state battery in the stacking direction due to charging and discharging can be suppressed, and the reliability of the all-solid-state battery can be improved.

This embodiment can be implemented in appropriate combination with any of the other embodiments.

Embodiment 7

In this embodiment, examples of electronic devices each including the secondary battery of one embodiment of the present invention will be described.

FIGS. 28A to 28G show examples of electronic devices including the bendable secondary battery described in the above embodiment. Examples of electronic devices including a bendable secondary battery include television sets (also referred to as televisions or television receivers), monitors of computers and the like, digital cameras, digital video cameras, digital photo frames, mobile phones (also referred to as cellular phones or mobile phone devices), portable game machines, portable information terminals, audio reproducing devices, and large game machines such as pachinko machines.

A flexible secondary battery can also be incorporated along a curved inside/outside wall surface of a house or a building or a curved interior/exterior surface of an automobile.

Figure 28A:
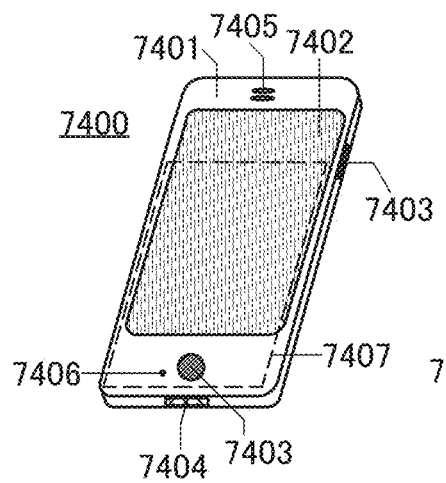
FIGS. 28A to 28H illustrate examples of electronic devices.

FIG. 28A illustrates an example of a mobile phone. A mobile phone 7400 is provided with a display portion 7402 incorporated in a housing 7401, operation buttons 7403, an external connection port 7404, a speaker 7405, a microphone 7406, and the like.

The mobile phone 7400 includes a secondary battery 7407. By using the secondary battery of one embodiment of the present invention as the secondary battery 7407, a lightweight long-life mobile phone can be provided.

Figure 28B:
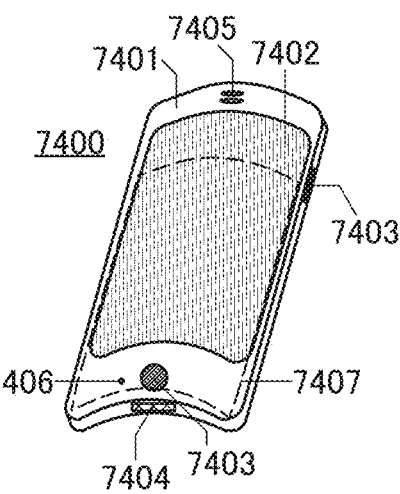
Figure 28C:
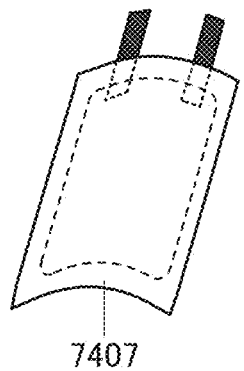

FIG. 28B illustrates the mobile phone 7400 in a state of being bent. When the whole mobile phone 7400 is bent by the external force, the secondary battery 7407 included in the mobile phone 7400 is also bent. FIG. 28C illustrates the secondary battery 7407 that is being bent at that time. The secondary battery 7407 is a thin storage battery. The secondary battery 7407 is fixed in a state of being bent. The secondary battery 7407 includes a lead electrode electrically connected to a current collector. The current collector is, for example, copper foil and is partly alloyed with gallium; thus, adhesion between the current collector and an active material layer in contact with the current collector is improved and the secondary battery 7407 can have high reliability even in a state of being bent.

Figure 28D:
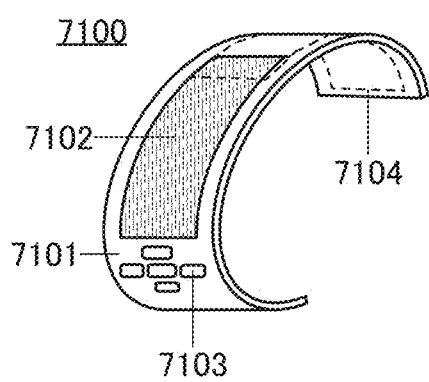
Figure 28E:

FIG. 28D illustrates an example of a bangle-type display device. A portable display device 7100 includes a housing 7101, a display portion 7102, operation buttons 7103, and a secondary battery 7104. FIG. 28E illustrates the secondary battery 7104 that is being bent. When the display device is worn on a user's arm while the secondary battery 7104 is bent, the housing changes its shape and the curvature of part or the whole of the secondary battery 7104 is changed. Note that the radius of curvature of a curve at a point refers to the radius of the circular arc that best approximates the curve at that point. The reciprocal of the radius of curvature is curvature. Specifically, part or the whole of the housing or the main surface of the secondary battery 7104 is changed with a radius of curvature in the range of 40 mm to 150 mm. When the radius of curvature of the main surface of the secondary battery 7104 ranges from 40 mm to 150 mm, the reliability can be kept high. By using the secondary battery of one embodiment of the present invention as the secondary battery 7104, a lightweight long-life portable display device can be provided.

Figure 28F:
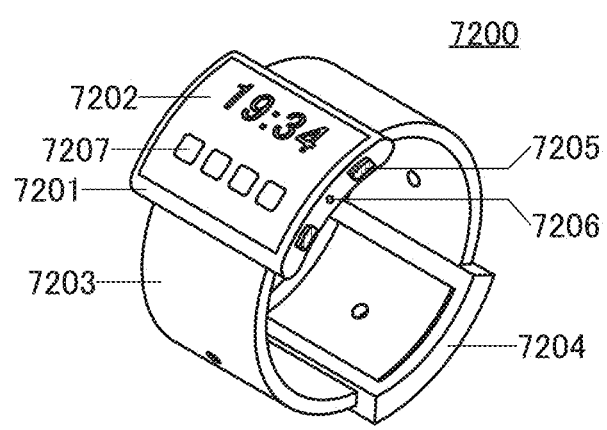

FIG. 28F illustrates an example of a watch-type portable information terminal. A portable information terminal 7200 includes a housing 7201, a display portion 7202, a band 7203, a buckle 7204, an operation button 7205, an input/output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. In addition, the display portion 7202 includes a touch sensor, and operation can be performed by touching the screen with a finger, a stylus, or the like. For example, by touching an icon 7207 displayed on the display portion 7202, an application can be started.

With the operation button 7205, a variety of functions such as time setting, power on/off, on/off of wireless communication, setting and cancellation of a silent mode, and setting and cancellation of a power saving mode can be performed. For example, the functions of the operation button 7205 can be set freely by the operating system incorporated in the portable information terminal 7200.

The portable information terminal 7200 can employ near field communication based on an existing communication standard. For example, mutual communication between the portable information terminal 7200 and a headset capable of wireless communication can be performed, and thus hands-free calling is possible.

Moreover, the portable information terminal 7200 includes the input/output terminal 7206, and data can be directly transmitted to and received from another information terminal via a connector. In addition, charging via the input/output terminal 7206 is possible. Note that the charging operation may be performed by wireless power feeding without using the input/output terminal 7206.

The display portion 7202 of the portable information terminal 7200 includes the secondary battery of one embodiment of the present invention. With the use of the secondary battery of one embodiment of the present invention, a lightweight long-life portable information terminal can be provided. For example, the secondary battery 7104 in FIG. 28E that is in the state of being curved can be provided in the housing 7201. Alternatively, the secondary battery 7104 in FIG. 28E can be provided in the band 7203 such that it can be curved.

The portable information terminal 7200 preferably includes a sensor. As the sensor, a human body sensor such as a fingerprint sensor, a pulse sensor, or a temperature sensor, a touch sensor, a pressure sensitive sensor, or an acceleration sensor is preferably mounted, for example.

Figure 28G:
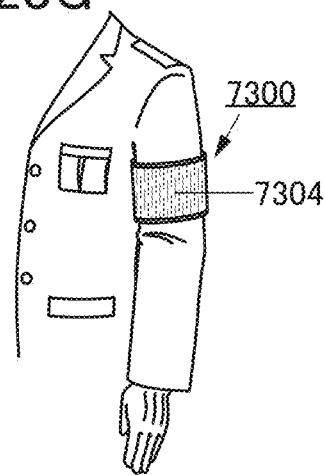

FIG. 28G illustrates an example of an armband display device. A display device 7300 includes a display portion 7304 and the secondary battery of one embodiment of the present invention. The display device 7300 can include a touch sensor in the display portion 7304 and can serve as a portable information terminal.

The display surface of the display portion 7304 is curved, and images can be displayed on the curved display surface. A display state of the display device 7300 can be changed by, for example, near field communication based on an existing communication standard.

The display device 7300 includes an input/output terminal, and data can be directly transmitted to and received from another information terminal via a connector. In addition, charging via the input/output terminal is possible. Note that the charging operation may be performed by wireless power feeding without using the input/output terminal.

By using the secondary battery of one embodiment of the present invention as the secondary battery included in the display device 7300, a lightweight long-life display device can be provided.

Examples of electronic devices each including the secondary battery with excellent cycling performance described in the above embodiment will be described with reference to FIG. 28H, FIGS. 29A to 29C, and FIG. 30.

By using the secondary battery of one embodiment of the present invention as a secondary battery of a daily electronic device, a lightweight long-life product can be provided. Examples of daily electronic devices include an electric toothbrush, an electric shaver, and electric beauty equipment. As secondary batteries for these products, small and lightweight stick-type secondary batteries with high capacity are desired in consideration of handling ease for users.

Figure 28H:
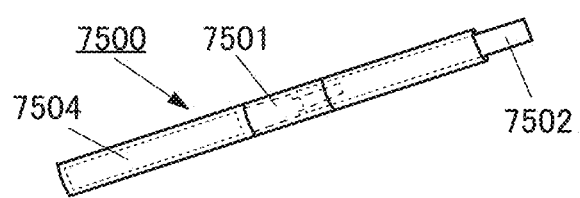

FIG. 28H is a perspective view of a device called a vaporizer (electronic cigarette). In FIG. 28H, an electronic cigarette 7500 includes an atomizer 7501 including a heating element, a secondary battery 7504 that supplies power to the atomizer, and a cartridge 7502 including a liquid supply bottle, a sensor, and the like. To improve safety, a protection circuit that prevents overcharge and overdischarge of the secondary battery 7504 may be electrically connected to the secondary battery 7504. The secondary battery 7504 in FIG. 28H includes an external terminal for connection to a charger. When the electronic cigarette 7500 is held by a user, the secondary battery 7504 is at the tip of the device; thus, it is preferred that the secondary battery 7504 have a short total length and be lightweight. With the secondary battery of one embodiment of the present invention, which has high capacity and favorable cycling performance, the small and lightweight electronic cigarette 7500 that can be used for a long time over a long period can be provided.

Figure 29A:
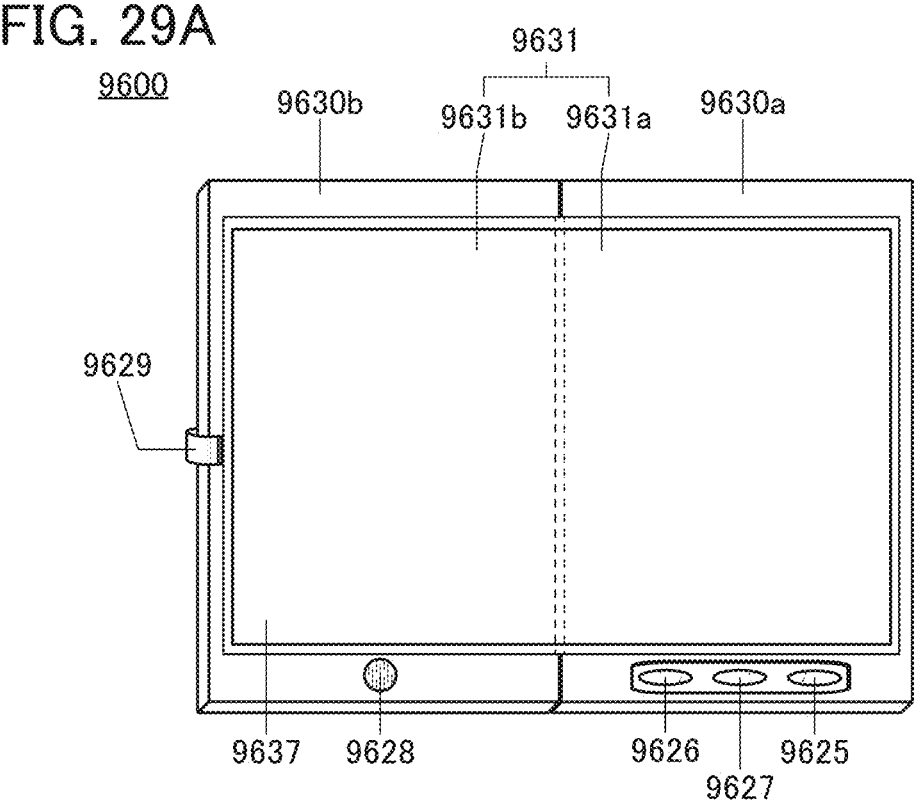
FIGS. 29A to 29C illustrate an example of an electronic device.
Figure 29B:
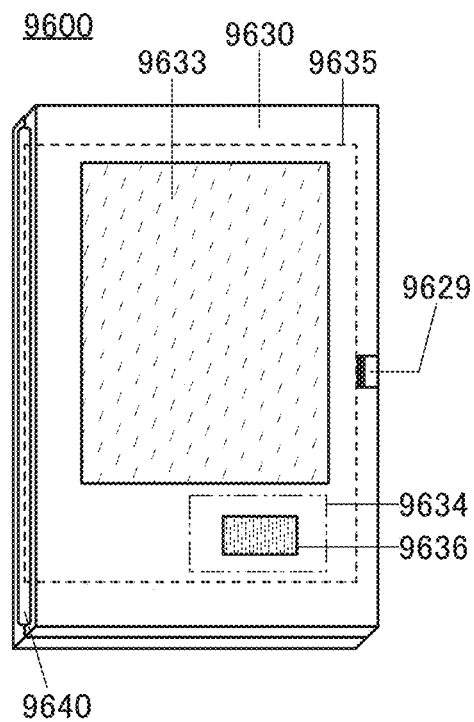

Next, FIGS. 29A and 29B illustrate an example of a tablet terminal that can be folded in half A tablet terminal 9600 illustrated in FIGS. 29A and 29B includes a housing 9630a, a housing 9630b, a movable portion 9640 connecting the housings 9630a and 9630b, a display portion 9631 including a display portion 9631a and a display portion 9631b, switches 9625 to 9627, a fastener 9629, and an operation switch 9628. The use of a flexible panel for the display portion 9631 achieves a tablet terminal with a larger display portion. FIG. 29A illustrates the tablet terminal 9600 that is opened, and FIG. 29B illustrates the tablet terminal 9600 that is closed.

The tablet terminal 9600 includes a power storage unit 9635 inside the housings 9630a and 9630b. The power storage unit 9635 is provided across the housings 9630a and 9630b, passing through the movable portion 9640.

Part of or the entire display portion 9631 can be a touch panel region, and data can be input by touching text, an input form, an image including an icon, and the like displayed on the region. For example, it is possible that keyboard buttons are displayed on the entire display portion 9631a on the housing 9630a side, and data such as text and an image is displayed on the display portion 9631b on the housing 9630b side.

It is also possible that a keyboard is displayed on the display portion 9631b on the housing 9630b side, and data such as text or an image is displayed on the display portion 9631a on the housing 9630a side. Furthermore, a switching button for showing/hiding a keyboard on a touch panel may be displayed on the display portion 9631 so that the keyboard is displayed on the display portion 9631 by touching the button with a finger, a stylus, or the like.

In addition, touch input can be performed concurrently in a touch panel region in the display portion 9631*a* on the housing 9630*a* side and a touch panel region in the display portion 9631*b* on the housing 9630*b* side.

The switches 9625 to 9627 may function not only as an interface for operating the tablet terminal 9600 but also as an interface that can switch various functions. For example, at least one of the switches 9625 to 9627 may have a function of switching on/off of the tablet terminal 9600. For another example, at least one of the switches 9625 to 9627 may have a function of switching display between a portrait mode and a landscape mode and a function of switching display between monochrome display and color display. For another example, at least one of the switches 9625 to 9627 may have a function of adjusting the luminance of the display portion 9631. The luminance of the display portion 9631 can be optimized in accordance with the amount of external light in use of the tablet terminal 9600, which is detected by an optical sensor incorporated in the tablet terminal 9600. Note that in addition to the optical sensor, the tablet terminal may incorporate another sensing device such as a sensor for measuring inclination, like a gyroscope sensor or an acceleration sensor.

The display portion 9631*a* on the housing 9630*a* side and the display portion 9631*b* on the housing 9630*b* side have substantially the same display area in FIG. 29A; however, there is no particular limitation on the display areas of the display portions 9631*a* and 9631*b*, and the display portions may have different areas or different display quality. For example, one of the display portions 9631*a* and 9631*b* may display higher-definition images than the other.

The tablet terminal 9600 is folded in half in FIG. 29B. The tablet terminal 9600 includes a housing 9630, a solar cell 9633, and a charge/discharge control circuit 9634 including a DC-DC converter 9636. The power storage unit of one embodiment of the present invention is used as the power storage unit 9635.

As described above, the tablet terminal 9600 can be folded in half such that the housings 9630*a* and 9630*b* overlap with each other when not in use. Accordingly, the display portion 9631 can be protected, which increases the durability of the tablet terminal 9600. With the power storage unit 9635 including the secondary battery of one embodiment of the present invention, which has high capacity and favorable cycling performance, the tablet terminal 9600 capable of being used for a long time over a long period can be provided.

The tablet terminal 9600 illustrated in FIGS. 29A and 29B can also have a function of displaying various kinds of data (e.g., a still image, a moving image, and a text image), a function of displaying a calendar, a date, the time, or the like on the display portion, a touch input function of operating or editing data displayed on the display portion by touch input, a function of controlling processing by various kinds of software (programs), and the like.

The solar cell 9633, which is attached on the surface of the tablet terminal 9600, supplies electric power to the touch panel, the display portion, a video signal processing portion, and the like. Note that the solar cell 9633 can be provided on one or both surfaces of the housing 9630, and the power storage unit 9635 can be charged efficiently. The use of a lithium-ion battery as the power storage unit 9635 brings an advantage such as a reduction in size.

Figure 29C:
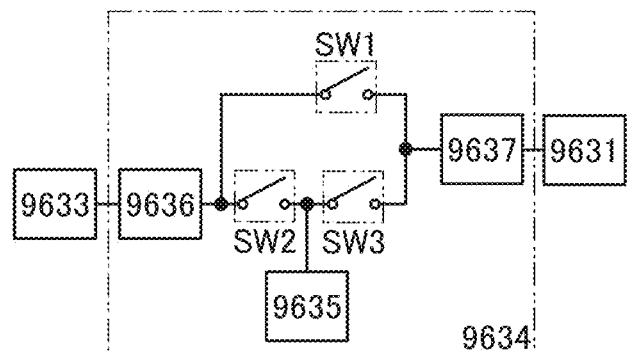

The structure and operation of the charge/discharge control circuit 9634 illustrated in FIG. 29B will be described with reference to a block diagram in FIG. 29C. FIG. 29C illustrates the solar cell 9633, the power storage unit 9635, the DC-DC converter 9636, a converter 9637, switches SW1 to SW3, and the display portion 9631. The power storage unit 9635, the DC-DC converter 9636, the converter 9637, and the switches SW1 to SW3 correspond to the charge/discharge control circuit 9634 in FIG. 29B.

First, an operation example in which electric power is generated by the solar cell 9633 using external light is described. The voltage of electric power generated by the solar cell is raised or lowered by the DC-DC converter 9636 to a voltage for charging the power storage unit 9635. When the display portion 9631 operates with the electric power from the solar cell 9633, the switch SW1 is turned on and the voltage of the electric power is raised or lowered by the converter 9637 to a voltage needed for the display portion 9631. When display on the display portion 9631 is not performed, the switch SW1 is turned off and the switch SW2 is turned on, so that the power storage unit 9635 can be charged.

Note that the solar cell 9633 is described as an example of a power generation unit; however, one embodiment of the present invention is not limited to this example. The power storage unit 9635 may be charged using another power generation unit such as a piezoelectric element or a thermoelectric conversion element (Peltier element). For example, the power storage unit 9635 may be charged with a non-contact power transmission module that transmits and receives electric power wirelessly (without contact), or with a combination of other charging units.

Figure 30:
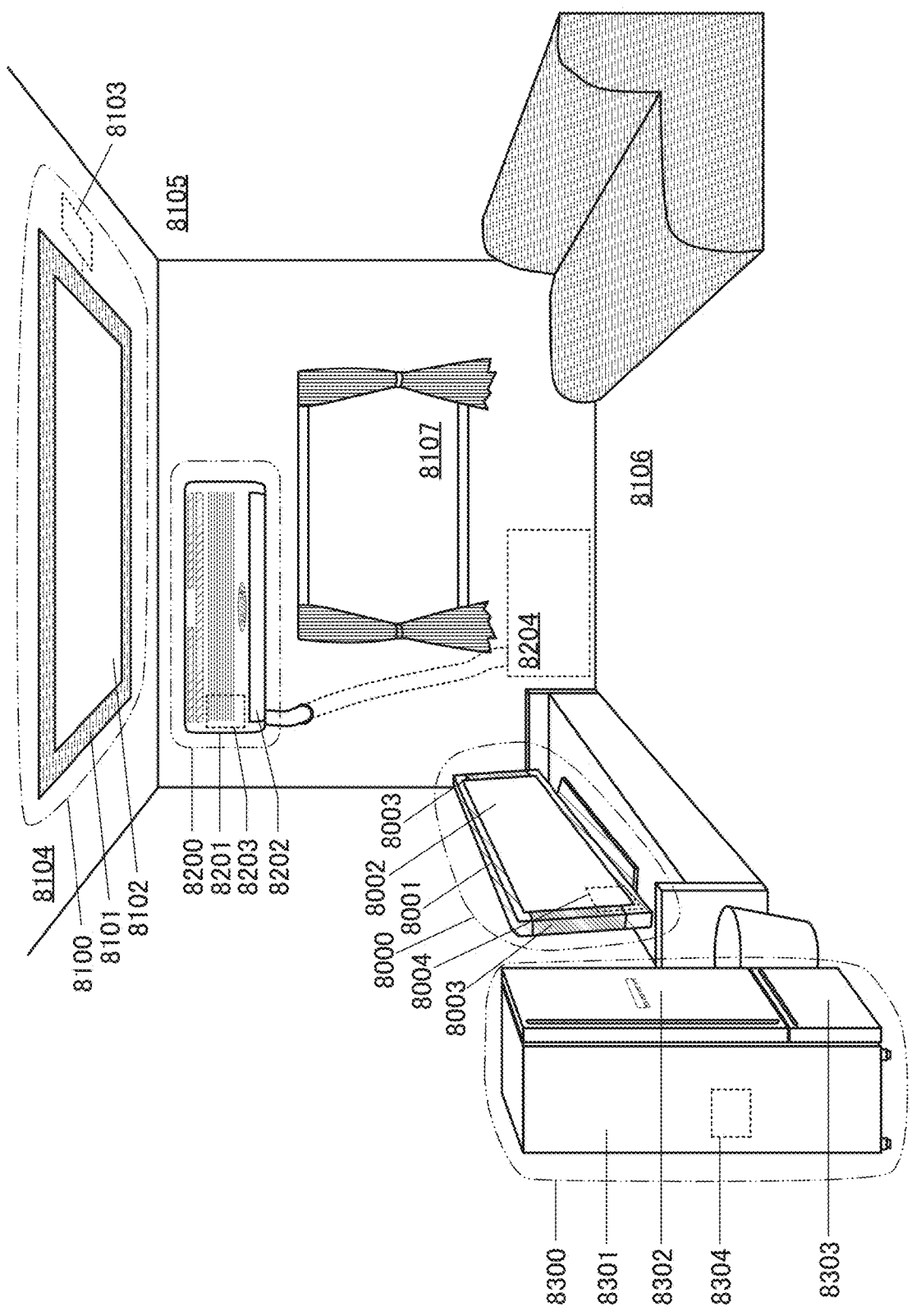
FIG. 30 illustrates examples of electronic devices.

FIG. 30 illustrates other examples of electronic devices. In FIG. 30, a display device 8000 is an example of an electronic device using a secondary battery 8004 of one embodiment of the present invention. Specifically, the display device 8000 corresponds to a display device for TV broadcast reception and includes a housing 8001, a display portion 8002, speaker portions 8003, the secondary battery 8004, and the like. The secondary battery 8004 of one embodiment of the present invention is provided in the housing 8001. The display device 8000 can receive electric power from a commercial power supply. Alternatively, the display device 8000 can use electric power stored in the secondary battery 8004. Thus, the display device 8000 can operate with the use of the secondary battery 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 30, an installation lighting device 8100 is an example of an electronic device using a secondary battery 8103 of one embodiment of the present invention. Specifically, the lighting device 8100 includes a housing 8101, a light source 8102, the secondary battery 8103, and the like. Although FIG. 30 illustrates the case where the secondary battery 8103 is provided in a ceiling 8104 on which the housing 8101 and the light source 8102 are installed, the secondary battery 8103 may be provided in the housing 8101. The lighting device 8100 can receive electric power from a commercial power supply. Alternatively, the lighting device 8100 can use electric power stored in the secondary battery 8103. Thus, the lighting device 8100 can operate with the use of the secondary battery 8103 of one embodiment of the present invention as an uninterruptible power supply even when electric power cannot be supplied from a commercial power supply due to power failure or the like.

Note that although the installation lighting device 8100 provided in the ceiling 8104 is illustrated as an example in FIG. 30, the secondary battery of one embodiment of the present invention can be used in an installation lighting device provided in, for example, a wall 8105, a floor 8106, a window 8107, or the like other than the ceiling 8104. Alternatively, the secondary battery can be used in a tabletop lighting device or the like.

As the light source 8102, an artificial light source that emits light artificially by using electric power can be used. Specific examples of the artificial light source include an incandescent lamp, a discharge lamp such as a fluorescent lamp, and light-emitting elements such as an LED and an organic EL element.

In FIG. 30, an air conditioner including an indoor unit 8200 and an outdoor unit 8204 is an example of an electronic device using a secondary battery 8203 of one embodiment of the present invention. Specifically, the indoor unit 8200 includes a housing 8201, an air outlet 8202, the secondary battery 8203, and the like. Although FIG. 30 illustrates the case where the secondary battery 8203 is provided in the indoor unit 8200, the secondary battery 8203 may be provided in the outdoor unit 8204. Alternatively, the secondary batteries 8203 may be provided in both the indoor unit 8200 and the outdoor unit 8204. The air conditioner can receive electric power from a commercial power supply. Alternatively, the air conditioner can use electric power stored in the secondary battery 8203. Particularly in the case where the secondary batteries 8203 are provided in both the indoor unit 8200 and the outdoor unit 8204, the air conditioner can operate with the use of the secondary batteries 8203 of one embodiment of the present invention as uninterruptible power supplies even when electric power cannot be supplied from a commercial power supply due to power failure or the like.

Note that although the split-type air conditioner including the indoor unit and the outdoor unit is illustrated as an example in FIG. 30, the secondary battery of one embodiment of the present invention can also be used in an air conditioner in which the functions of an indoor unit and an outdoor unit are integrated in one housing.

In FIG. 30, an electric refrigerator-freezer 8300 is an example of an electronic device using a secondary battery 8304 of one embodiment of the present invention. Specifically, the electric refrigerator-freezer 8300 includes a housing 8301, a refrigerator door 8302, a freezer door 8303, the secondary battery 8304, and the like. The secondary battery 8304 is provided inside the housing 8301 in FIG. 30. The electric refrigerator-freezer 8300 can receive electric power from a commercial power supply. Alternatively, the electric refrigerator-freezer 8300 can use electric power stored in the secondary battery 8304. Thus, the electric refrigerator-freezer 8300 can operate with the use of the secondary battery 8304 of one embodiment of the present invention as an uninterruptible power supply even when electric power cannot be supplied from a commercial power supply due to power failure or the like.

Note that among the electronic devices described above, a high-frequency heating apparatus such as a microwave oven and an electronic device such as an electric rice cooker require high power in a short time. The tripping of a breaker of a commercial power supply in use of such an electronic device can be prevented by using the secondary battery of one embodiment of the present invention as an auxiliary power supply for supplying electric power which cannot be supplied enough by a commercial power supply.

In addition, by storing electric power in the secondary battery in a time period during which electronic devices are not used, particularly a time period during which the proportion of the amount of electric power that is actually used to the total amount of electric power that can be supplied from a commercial power supply (such a proportion is referred to as an electricity usage rate) is low, the electricity usage rate can be reduced in a time period other than the above. For example, in the case of the electric refrigerator-freezer 8300, electric power is stored in the secondary battery 8304 in night time when the temperature is low and the refrigerator door 8302 and the freezer door 8303 are not often opened or closed. On the other hand, in daytime when the temperature is high and the refrigerator door 8302 and the freezer door 8303 are frequently opened and closed, the secondary battery 8304 is used as an auxiliary power supply; thus, the electricity usage rate in daytime can be reduced.

According to one embodiment of the present invention, the secondary battery can have excellent cycling performance and improved reliability. Moreover, according to one embodiment of the present invention, a secondary battery with high capacity can be obtained; hence, the secondary battery itself can be made more compact and lightweight as a result of improved characteristics of the secondary battery. Thus, the use of the secondary battery of one embodiment of the present invention enables the electronic device described in this embodiment to be more lightweight and have a longer lifetime.

This embodiment can be implemented in appropriate combination with any of the other embodiments.

Embodiment 8

In this embodiment, examples of electronic devices each including the secondary battery described in the above embodiment are described with reference to FIGS. 31A to 31C and FIGS. 32A to 32C.

Figure 31A:
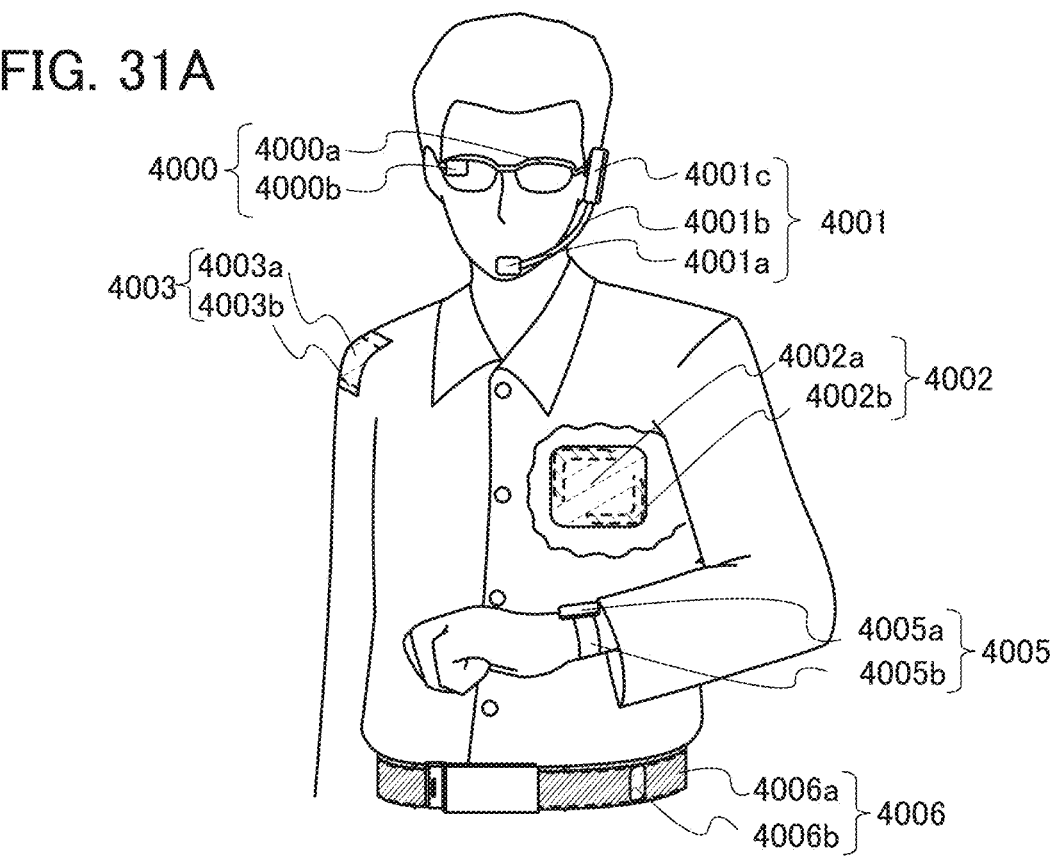
FIGS. 31A to 31C illustrate examples of electronic devices.

FIG. 31A illustrates examples of wearable devices. A secondary battery is used as a power source of a wearable device. To have improved splash resistance, water resistance, or dust resistance in daily use or outdoor use by a user, a wearable device is desirably capable of being charged with and without a wire whose connector portion for connection is exposed.

For example, the secondary battery of one embodiment of the present invention can be provided in a glasses-type device 4000 illustrated in FIG. 31A. The glasses-type device 4000 includes a frame 4000*a* and a display part 4000*b*. The secondary battery is provided in a temple of the frame 4000*a* having a curved shape, whereby the glasses-type device 4000 can be lightweight, can have a well-balanced weight, and can be used continuously for a long time. With the use of the secondary battery of one embodiment of the present invention, space saving required with a reduction in the size of a housing can be achieved.

The secondary battery of one embodiment of the present invention can be provided in a headset-type device 4001. The headset-type device 4001 includes at least a microphone part 4001*a*, a flexible pipe 4001*b*, and an earphone portion 4001*c*. The secondary battery can be provided in the flexible pipe 4001*b* and the earphone portion 4001*c*. With the use of the secondary battery of one embodiment of the present invention, space saving required with a reduction in the size of a housing can be achieved.

The secondary battery of one embodiment of the present invention can be provided in a device 4002 that can be attached directly to a body. A secondary battery 4002b can be provided in a thin housing 4002a of the device 4002. With the use of the secondary battery of one embodiment of the present invention, space saving required with a reduction in the size of a housing can be achieved.

The secondary battery of one embodiment of the present invention can be provided in a device 4003 that can be attached to clothes. A secondary battery 4003b can be provided in a thin housing 4003a of the device 4003. With the use of the secondary battery of one embodiment of the present invention, space saving required with a reduction in the size of a housing can be achieved.

The secondary battery of one embodiment of the present invention can be provided in a belt-type device 4006. The belt-type device 4006 includes a belt portion 4006a and a wireless power feeding and receiving portion 4006b, and the secondary battery can be provided inside the belt portion 4006a. With the use of the secondary battery of one embodiment of the present invention, space saving required with a reduction in the size of a housing can be achieved.

The secondary battery of one embodiment of the present invention can be provided in a watch-type device 4005. The watch-type device 4005 includes a display portion 4005a and a belt portion 4005b, and the secondary battery can be provided in the display portion 4005a or the belt portion 4005b. With the use of the secondary battery of one embodiment of the present invention, space saving required with a reduction in the size of a housing can be achieved.

The display portion 4005a can display various kinds of information such as time and reception information of an e-mail or an incoming call.

In addition, the watch-type device 4005 is a wearable device that is wound around an arm directly; thus, a sensor that measures the pulse, the blood pressure, or the like of the user may be incorporated therein. Data on the exercise quantity and health of the user can be stored to be used for health maintenance.

Figure 31B:
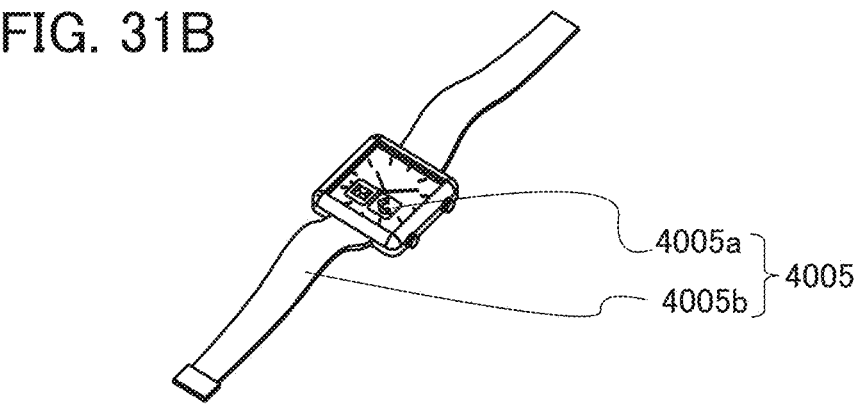

FIG. 31B is a perspective view of the watch-type device 4005 that is detached from an arm.

Figure 31C:
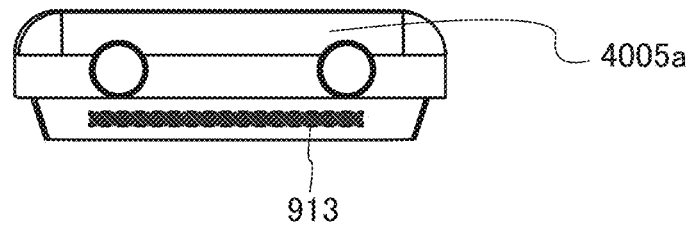

FIG. 31C is a side view. FIG. 31C illustrates a state where the secondary battery 913 is incorporated in the watch-type device 4005. The secondary battery 913 is the secondary battery described in Embodiment 5. The secondary battery 913, which is small and lightweight, overlaps with the display portion 4005a.

Figure 32A:
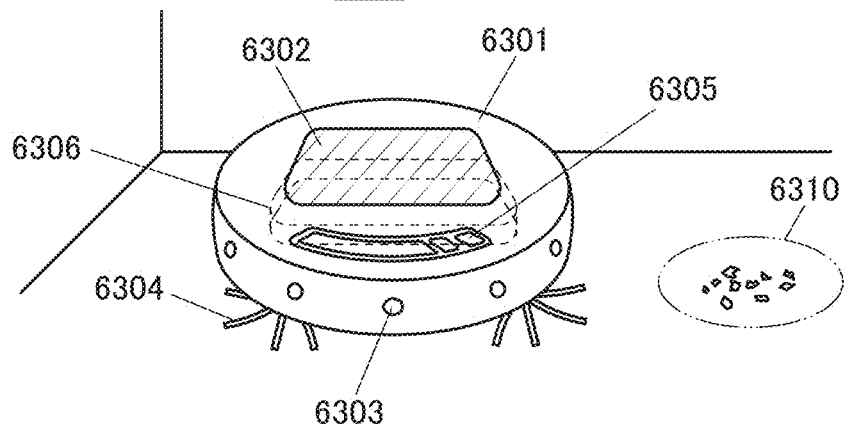
FIGS. 32A to 32C illustrate examples of electronic devices.

FIG. 32A illustrates an example of a cleaning robot. A cleaning robot 6300 includes a display portion 6302 placed on the top surface of a housing 6301, a plurality of cameras 6303 placed on the side surface of the housing 6301, a brush 6304, operation buttons 6305, a secondary battery 6306, a variety of sensors, and the like. Although not illustrated, the cleaning robot 6300 is provided with a tire, an inlet, and the like. The cleaning robot 6300 is self-propelled, detects dust 6310, and sucks up the dust through the inlet provided on the bottom surface.

For example, the cleaning robot 6300 can determine whether there is an obstacle such as a wall, furniture, or a step by analyzing images taken by the cameras 6303. In the case where the cleaning robot 6300 detects an object that is likely to be caught in the brush 6304 (e.g., a wire) by image analysis, the rotation of the brush 6304 can be stopped. The cleaning robot 6300 further includes a secondary battery 6306 of one embodiment of the present invention and a semiconductor device or an electronic component. The cleaning robot 6300 including the secondary battery 6306 of one embodiment of the present invention can be a highly reliable electronic device that can operate for a long time.

Figure 32B:
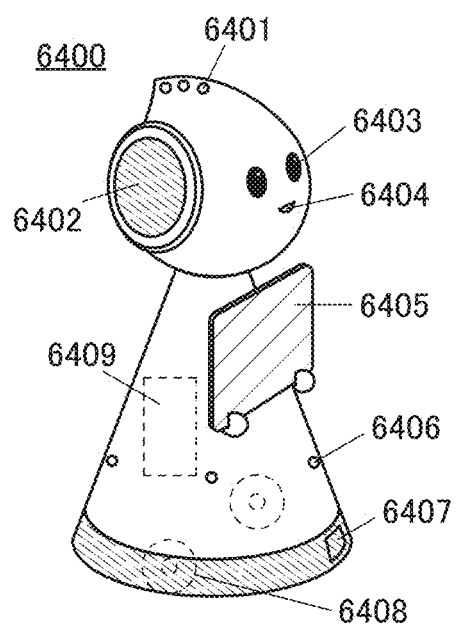

FIG. 32B illustrates an example of a robot. A robot 6400 illustrated in FIG. 32B includes a secondary battery 6409, an illuminance sensor 6401, a microphone 6402, an upper camera 6403, a speaker 6404, a display portion 6405, a lower camera 6406, an obstacle sensor 6407, a moving mechanism 6408, an arithmetic device, and the like.

The microphone 6402 has a function of detecting a speaking voice of a user, an environmental sound, and the like. The speaker 6404 has a function of outputting sound. The robot 6400 can communicate with a user using the microphone 6402 and the speaker 6404.

The display portion 6405 has a function of displaying various kinds of information. The robot 6400 can display information desired by a user on the display portion 6405. The display portion 6405 may be provided with a touch panel. Moreover, the display portion 6405 may be a detachable information terminal, in which case charging and data communication can be performed when the display portion 6405 is set at the home position of the robot 6400.

The upper camera 6403 and the lower camera 6406 each have a function of taking an image of the surroundings of the robot 6400. The obstacle sensor 6407 can detect an obstacle in the direction where the robot 6400 advances with the moving mechanism 6408. The robot 6400 can move safely by recognizing the surroundings with the upper camera 6403, the lower camera 6406, and the obstacle sensor 6407.

The robot 6400 further includes the secondary battery 6409 of one embodiment of the present invention and a semiconductor device or an electronic component. The robot 6400 including the secondary battery of one embodiment of the present invention can be a highly reliable electronic device that can operate for a long time.

Figure 32C:
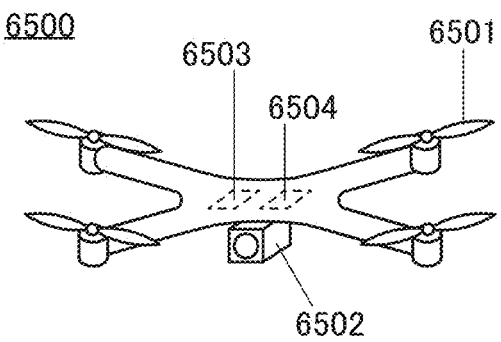

FIG. 32C illustrates an example of a flying object. A flying object 6500 illustrated in FIG. 32C includes propellers 6501, a camera 6502, a secondary battery 6503, and the like and has a function of flying autonomously.

For example, image data taken by the camera 6502 is stored in an electronic component 6504. The electronic component 6504 can analyze the image data to detect whether there is an obstacle in the way of the movement. Moreover, the electronic component 6504 can estimate the remaining battery level from a change in the power storage capacity of the secondary battery 6503. The flying object 6500 further includes the secondary battery 6503 of one embodiment of the present invention. The flying object 6500 including the secondary battery of one embodiment of the present invention can be a highly reliable electronic device that can operate for a long time.

This embodiment can be implemented in appropriate combination with any of the other embodiments.

Embodiment 9

In this embodiment, examples of vehicles each including the secondary battery of one embodiment of the present invention will be described.

The use of secondary batteries in vehicles enables production of next-generation clean energy vehicles such as hybrid electric vehicles (HEV), electric vehicles (EV), and plug-in hybrid electric vehicles (PHEV).

Figure 33A:
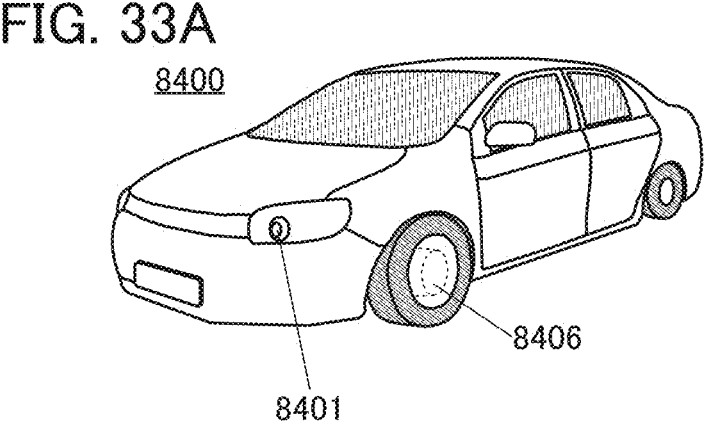
FIGS. 33A to 33C illustrate examples of vehicles.
Figure 33B:
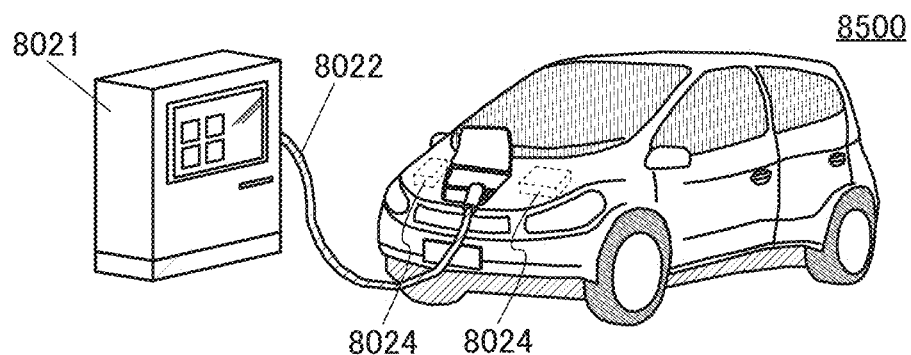
Figure 33C:
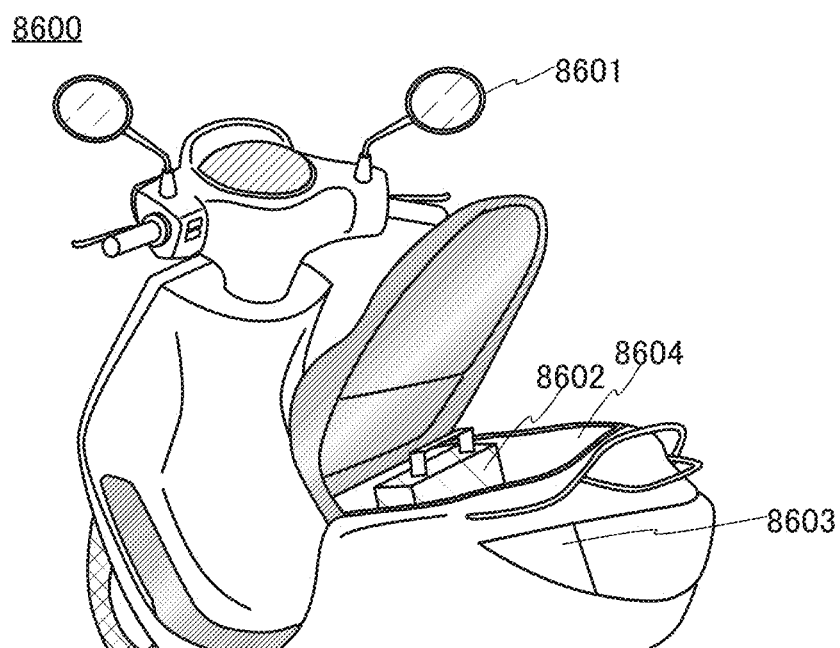

FIGS. 33A to 33C each illustrate an example of a vehicle including the secondary battery of one embodiment of the present invention. An automobile 8400 illustrated in FIG. 33A is an electric vehicle that runs on the power of an electric motor. Alternatively, the automobile 8400 is a hybrid electric vehicle capable of driving using either an electric motor or an engine as appropriate. The use of the secondary battery of one embodiment of the present invention allows fabrication of a high-mileage vehicle. The automobile 8400 includes the secondary battery. As the secondary battery, the modules of the secondary batteries illustrated in FIGS. 18C and 18D can be arranged to be used in a floor portion in the automobile. Alternatively, a battery pack in which a plurality of secondary batteries each of which is illustrated in FIGS. 21A and 21B are combined may be placed in the floor portion in the automobile. The secondary battery is used not only for driving an electric motor 8406, but also for supplying electric power to light-emitting devices such as a headlight 8401 and a room light (not illustrated).

The secondary battery can also supply electric power to a display device included in the automobile 8400, such as a speedometer and a tachometer. Furthermore, the secondary battery can supply electric power to a semiconductor device included in the automobile 8400, such as a navigation system.

FIG. 33B illustrates an automobile 8500 including the secondary battery. The automobile 8500 can be charged when the secondary battery is supplied with electric power through external charging equipment by a plug-in system, a contactless power feeding system, or the like. In FIG. 33B, a secondary battery 8024 included in the automobile 8500 is charged with the use of a ground-based charging apparatus 8021 through a cable 8022. In charging, a given method such as CHAdeMO (registered trademark) or Combined Charging System can be employed as a charging method, the standard of a connector, or the like as appropriate. The charging apparatus 8021 may be a charging station provided in a commerce facility or a power source in a house. For example, with the use of a plug-in technique, the secondary battery 8024 included in the automobile 8500 can be charged by being supplied with electric power from outside. The charging can be performed by converting AC electric power into DC electric power through a converter such as an AC-DC converter.

Although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the vehicle is stopped but also when driven. In addition, the contactless power feeding system may be utilized to perform transmission and reception of electric power between vehicles. Furthermore, a solar cell may be provided in the exterior of the vehicle to charge the secondary battery when the vehicle stops or moves. To supply electric power in such a contactless manner, an electromagnetic induction method or a magnetic resonance method can be used.

FIG. 33C shows an example of a motorcycle including the secondary battery of one embodiment of the present invention. A motor scooter 8600 illustrated in FIG. 33C includes a secondary battery 8602, side mirrors 8601, and indicators 8603. The secondary battery 8602 can supply electric power to the indicators 8603.

In the motor scooter 8600 illustrated in FIG. 33C, the secondary battery 8602 can be held in an under-seat storage unit 8604. The secondary battery 8602 can be held in the under-seat storage unit 8604 even with a small size. The secondary battery 8602 is detachable; thus, the secondary battery 8602 is carried indoors when charged, and is stored before the motor scooter is driven.

According to one embodiment of the present invention, the secondary battery can have improved cycling performance and an increased capacity. Thus, the secondary battery itself can be made more compact and lightweight. The compact and lightweight secondary battery contributes to a reduction in the weight of a vehicle and hence increases the mileage. Furthermore, the secondary battery included in the vehicle can be used as a power source for supplying electric power to products other than the vehicle. In such a case, the use of a commercial power supply can be avoided at peak time of electric power demand, for example. Avoiding the use of a commercial power supply at peak time of electric power demand can contribute to energy saving and a reduction in carbon dioxide emissions. Moreover, the secondary battery with favorable cycling performance can be used over a long period; thus, the use amount of rare metals such as cobalt can be reduced.

This embodiment can be implemented in appropriate combination with any of the other embodiments.

Example 1

In this example, the positive electrode active material described in Embodiment 1 was formed, its characteristics were analyzed, and its performance was evaluated.

<Formation and Analysis of Positive Electrode Active Material>

Samples formed in this example are described with reference to the formation method in FIG. 11.

As a positive electrode active material containing cobalt as the transition metal M and not containing impurities, commercially available lithium cobalt oxide (CELLSEED C-10N, manufactured by Nippon Chemical Industrial Co., Ltd.) was used; this was Sample 1 (comparative example).

As in Step S42 to Step S44 in FIG. 11, titanium oxide was added to Sample 1 by a sol-gel method. Here, TTIP was added such that the number of titanium atoms was 0.5 with the number of cobalt atoms in Sample 1 regarded as 100. Then, the heating was performed as in Step S45. The heating was performed at 850° C. for 2 hours in an oxygen atmosphere (flow rate: 10 L/min). The positive electrode active material containing cobalt as the transition metal M and titanium as the impurity was Sample 2.

As in Step S11 to Step S14 and Step S31 in FIG. 11, lithium fluoride and magnesium fluoride were added to Sample 1 by a solid phase method. Lithium fluoride and magnesium fluoride were added such that the number of molecules of lithium fluoride was 0.17 and the number of molecules of magnesium fluoride was 0.5 with the number of cobalt atoms regarded as 100. Then, the heating was performed as in Step S34. In the heating, raw materials were put in an alumina crucible and a lid was put on it. The heating was performed at 850° C. for 60 hours. The positive electrode active material containing cobalt as the transition metal M and magnesium and fluorine as the impurities was Sample 3.

As in Step S11 to Step S14 and Step S31 in FIG. 11, lithium fluoride and magnesium fluoride were added to Sample 1 by a solid phase method. Lithium fluoride and magnesium fluoride were added such that the number of molecules of lithium fluoride was 0.17 and the number of molecules of magnesium fluoride was 0.5 with the number of cobalt atoms regarded as 100. Then, the heating was performed as in Step S34. The heating was performed at 900° C. for 20 hours in an oxygen atmosphere (flow rate: 10 L/min). Next, as in Step S42 to Step S44, titanium oxide was added by a sol-gel method. The addition amount of titanium and the heating conditions were the same as those of Sample 2. The positive electrode active material containing cobalt as the transition metal M and magnesium, fluorine, and titanium as the impurities was Sample 4.

As in Step S11 to Step S20 and Step S31 in FIG. 11, lithium fluoride, magnesium fluoride, nickel hydroxide, and aluminum hydroxide were added to Sample 1 by a solid phase method. Lithium fluoride, magnesium fluoride, nickel hydroxide, and aluminum hydroxide were added such that the number of molecules of lithium fluoride was 0.33, the number of molecules of magnesium fluoride was 1, the number of nickel atoms was 0.5, and the number of aluminum atoms was 0.5 with the number of cobalt atoms regarded as 100. Then, the heating was performed as in Step S34. The heating was performed at 900° C. for 10 hours, and then, firm adhesion between the particles was broken by hitting with a pestle. The heating and the breaking of the adhesion were repeated three times. The positive electrode active material containing cobalt and nickel as the transition metals M and magnesium, fluorine, and aluminum as the impurities was Sample 5.

As in Step S42 to Step S44, titanium oxide was added to Sample 5 by a sol-gel method. The addition amount of titanium and the heating conditions were the same as those of Sample 2. The positive electrode active material containing cobalt and nickel as the transition metals M and magnesium, fluorine, aluminum, and titanium as the impurities was Sample 6.

Table 1 shows the formation conditions of Samples 1 to 6.

TABLE 1

| Sample | Transition metal M | Impurity element | Annealing |
|---|---|---|---|
| Sample 1 | Co | No | No |
| Sample 2 | Co | Ti (sol-gel method) | 850° C., 2 h |
| Sample 3 | Co | Mg, F (solid phase method) | 850° C., 60 h |
| Sample 4 | Co | Mg, F (solid phase method) Ti (sol-gel method) | 900° C., 20 h 850° C., 2 h |
| Sample 5 | Co 100 Ni 0.5 | Mg, F, Al (solid phase method) | (900° C., 10 h) × 3 |
| Sample 6 | Co 100 Ni 0.5 | Mg, F, Al (solid phase method) Ti (sol-gel method) | (900° C., 10 h) × 3 850° C., 2 h |

FIG. 34A is a surface SEM image of Sample 2. As shown in FIG. 34A, the positive electrode active material has depressions that are probably cracks. FIG. 34B is an enlarged image of the depressions. FIG. 34C shows linear EDX analysis results of the straight line in FIG. 34B.

FIG. 34C revealed that the depressions had higher titanium concentrations than the other regions. That is, titanium existed on part of the inner walls of the depressions. It was found that oxygen also existed. Thus, titanium oxide was presumably embedded in the depressions.

Cobalt was uniformly detected from the entire region of the positive electrode active material. The amount of oxygen detected from the depressions was slightly smaller than that from the other regions, and oxygen was substantially uniformly detected from the other regions.

Figure 35A:
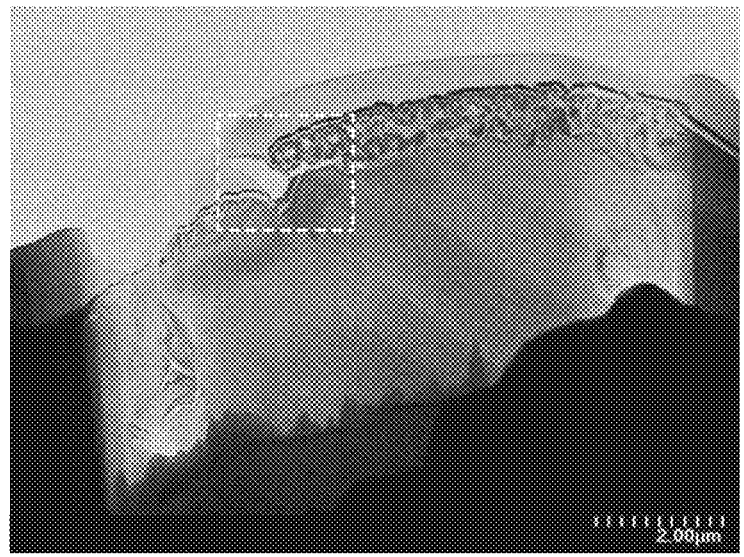
FIGS. 35A and 35B are cross-sectional STEM images of a positive electrode active material.
Figure 35B:
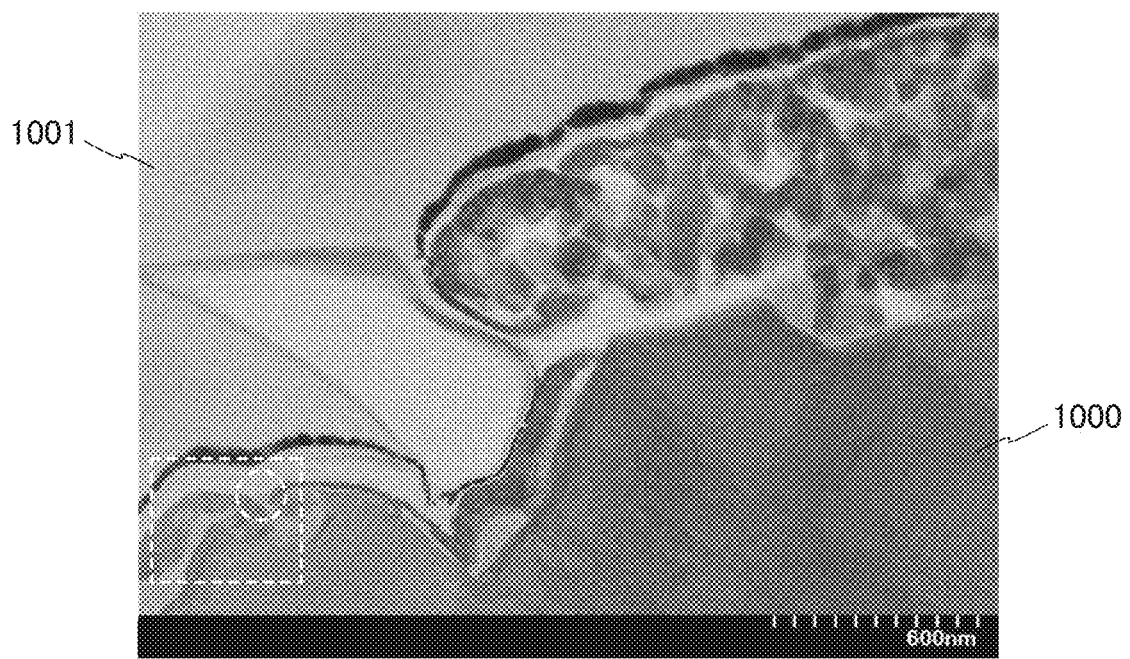
Figure 36A:
FIGS. 36A to 36C are EDX mapping images of a positive electrode active material.
Figure 36B:
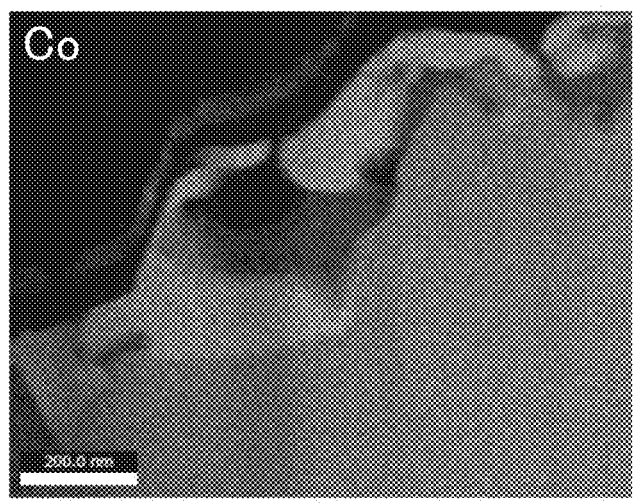
Figure 36C:

FIG. 35A is a cross-sectional STEM image of Sample 2. FIG. 35B is an enlarged image of a portion surrounded by white dotted lines in FIG. 35A. A protective film 1001 containing C and Pt formed for the STEM observation was observed over a positive electrode active material 1000. FIGS. 36A to 36C show EDX mapping images of the white dotted square in FIG. 35B, which is a surface portion of the positive electrode active material 1000. FIG. 36A, FIG. 36B, and FIG. 36C are the mapping images of oxygen, cobalt, and titanium, respectively.

Oxygen and cobalt were uniformly distributed over the surface portion and the inner portion of the positive electrode active material. By contrast, as shown in FIG. 36C and the white dotted circle in FIG. 35B, titanium was embedded in the depressions.

As described above, it is probable that titanium oxide is selectively attached to the depressions.

The above results demonstrate that Sample 2 is the positive electrode active material 101 including the depressions 101c and the embedded portions 102, in which the embedded portions 102 have higher titanium concentrations than the surface portion.

Figure 37A:
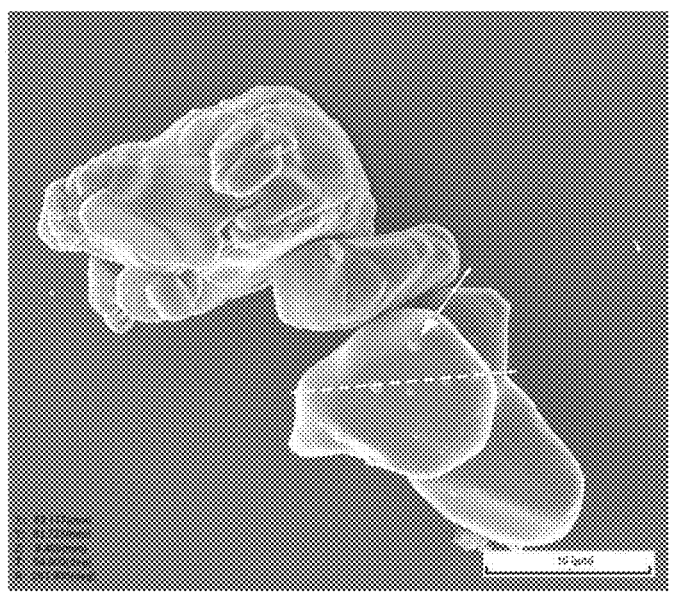
FIG. 37A is a surface SEM image of a positive electrode active material.
Figure 37B:
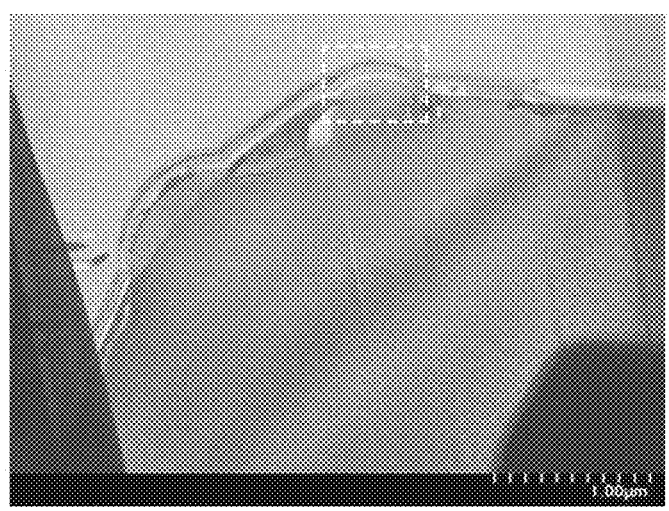
FIGS. 37B and 37C are cross-sectional STEM images of the positive electrode active material.
Figure 37C:
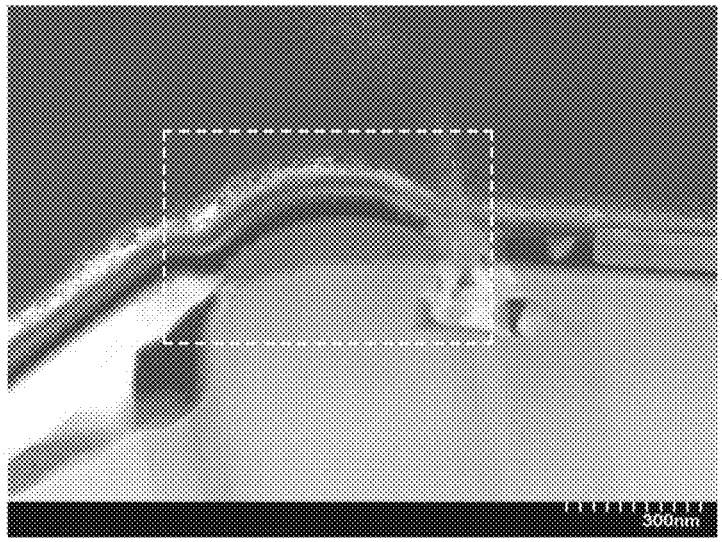

FIG. 37A is a surface SEM image of Sample 4. A positive electrode active material having a projection, as indicated by the arrow, was observed. FIG. 37B is a STEM image of the cross section taken along the white dotted line in FIG. 37A. FIG. 37C is an enlarged cross-sectional STEM image of a portion, which is a projection, surrounded by white dotted lines in FIG. 37B.

FIGS. 38A to 38E show EDX mapping images of the white dotted square in FIG. 37C. FIG. 38A, FIG. 38B, FIG. 38C, FIG. 38D, and FIG. 38E are the mapping images of oxygen, fluorine, magnesium, titanium, and cobalt, respectively. Note that in the EDX, fluorine has a peak close to that of cobalt; thus, the detection accuracy of fluorine is low. In this example and the like, fluorine in the inner portion is at a background level.

Figure 38A:
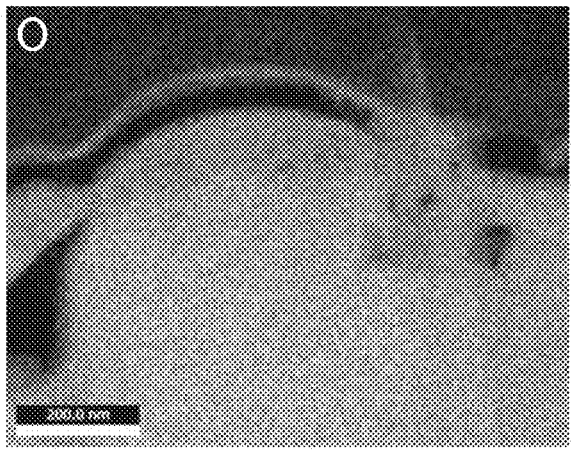
FIGS. 38A to 38E are EDX mapping images of a positive electrode active material.
Figure 38B:
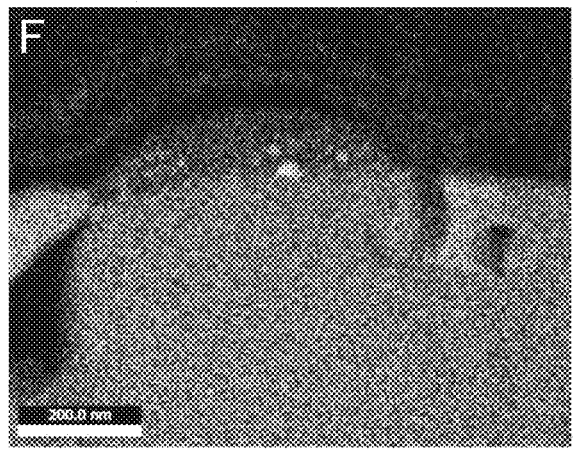

FIG. 38B revealed that the projection included a high fluorine concentration region whose fluorine concentration was different from that of the background. The fluorine concentration in the high fluorine concentration region was higher than that of a high impurity metal concentration region.

Figure 38C:
Figure 38D:
Figure 38E:
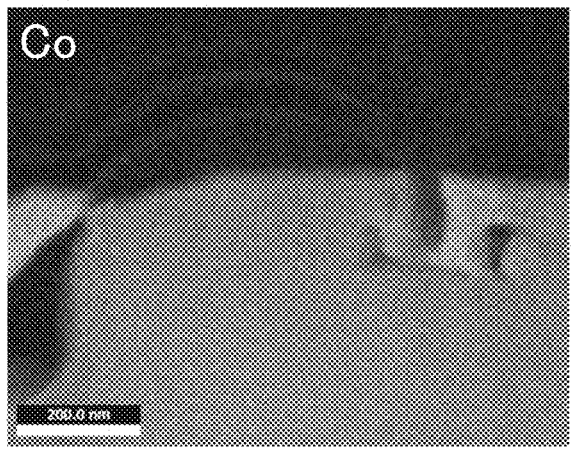

FIGS. 38C and 38D indicated that the projection included the high impurity metal concentration region whose concentrations of magnesium and titanium were higher than those in the inner portion and the high fluorine concentration region. As described above, it was found that the projection included the high fluorine concentration region and the high impurity metal concentration region. Excess magnesium and titanium in the positive electrode active material were probably aggregated in the high impurity metal concentration region. The high fluorine concentration region existed near the center of the projection, suggesting that the high fluorine concentration region was a trigger for the aggregation of the impurities.

Oxygen and cobalt uniformly existed in the inner portion and the surface portion of the positive electrode active material. Oxygen, magnesium, and titanium uniformly existed in the projection other than the high fluorine concentration region.

Figure 39A:
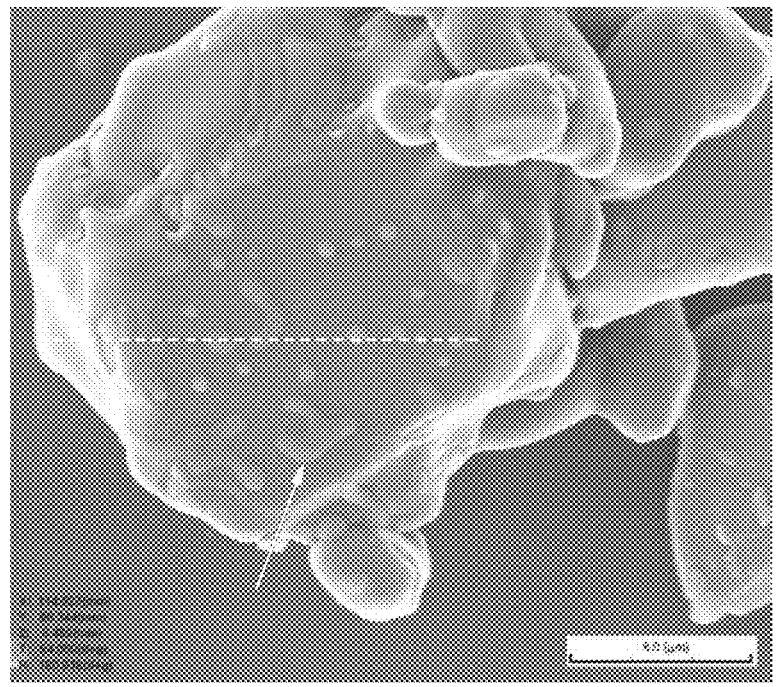
FIG. 39A is a surface SEM image of a positive electrode active material.
Figure 39B:
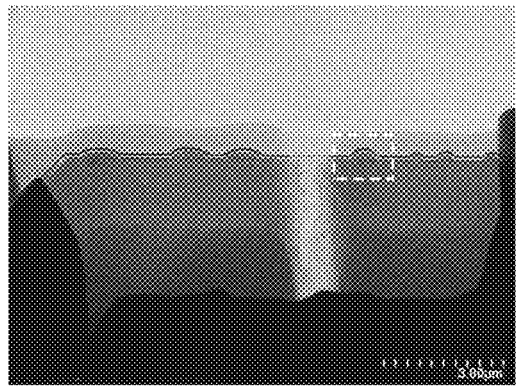
FIGS. 39B and 39C are cross-sectional STEM images of the positive electrode active material.

FIG. 39A is a surface SEM image of Sample 6. A positive electrode active material having a plurality of projections, as indicated by the arrow, was observed. FIG. 39B is a STEM image of the cross section taken along the white dotted line in FIG. 39A.

Figure 39C:
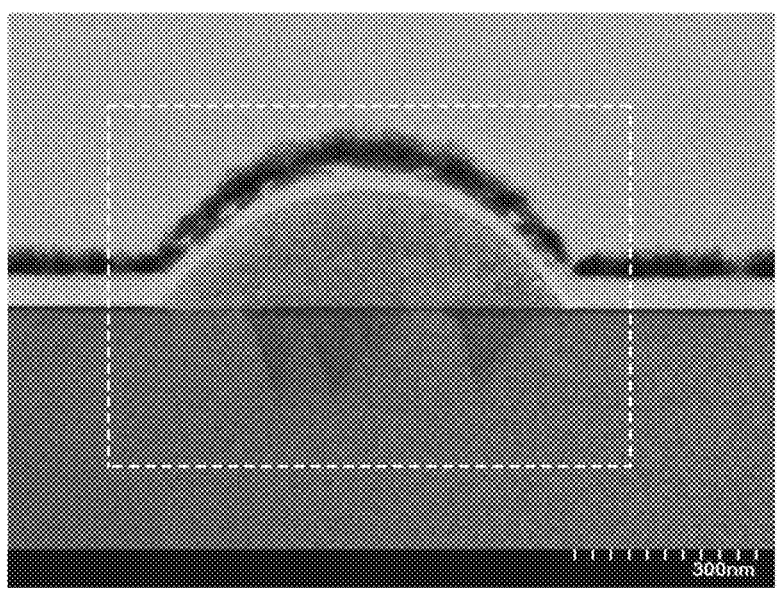

FIG. 39C is an enlarged cross-sectional STEM image of a portion, which is a projection, surrounded by white dotted lines in FIG. 39B.

FIGS. 40A to 40G show EDX mapping images of the white dotted square in FIG. 39C. FIG. 40A, FIG. 40B, FIG. 40C, FIG. 40D, FIG. 40E, FIG. 40F, and FIG. 40G are the mapping images of oxygen, fluorine, magnesium, titanium, nickel, aluminum, and cobalt, respectively.

FIGS. 40A to 40G revealed that the projection included the high fluorine concentration region having a higher fluorine concentration than the surface portion, the inner portion, and the high impurity metal concentration region. It was also found that the projection included the high impurity metal concentration region having higher concentrations of magnesium, titanium, and nickel than the surface portion, the inner portion, and the high fluorine concentration region.

Figure 40A:
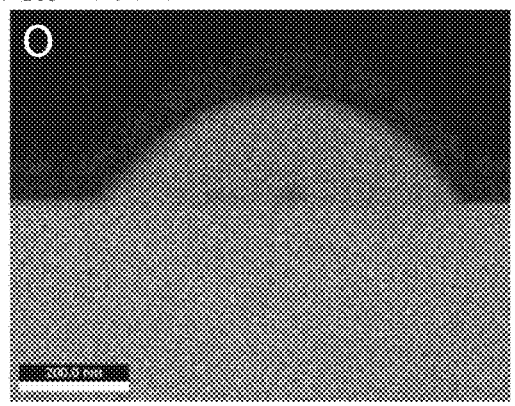
FIGS. 40A to 40G are EDX mapping images of a positive electrode active material.
Figure 40B:
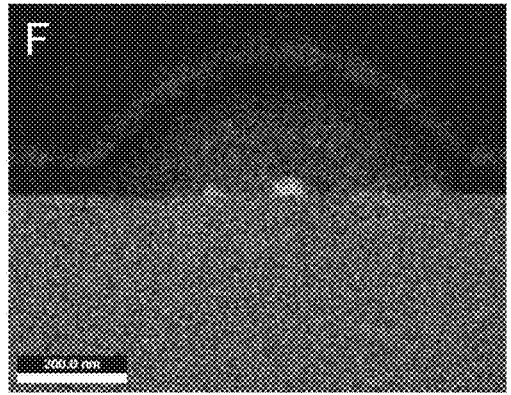
Figure 40C:
Figure 40D:
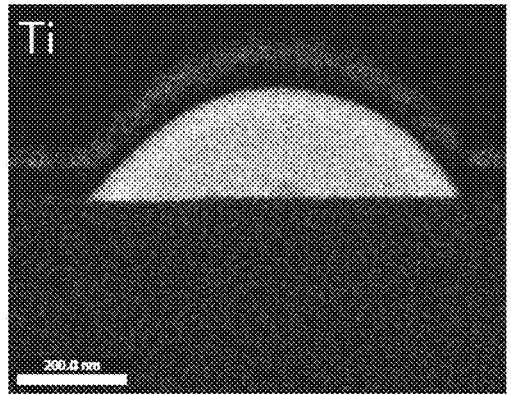
Figure 40E:
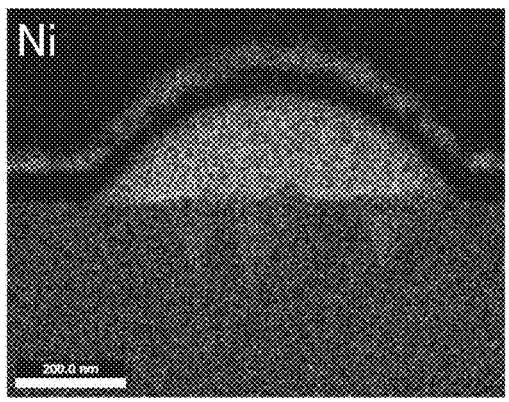
Figure 40F:
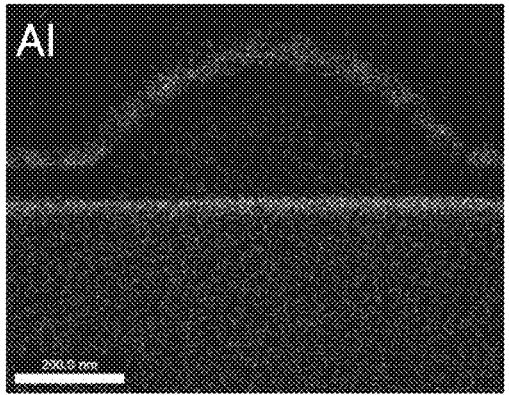
Figure 40G:
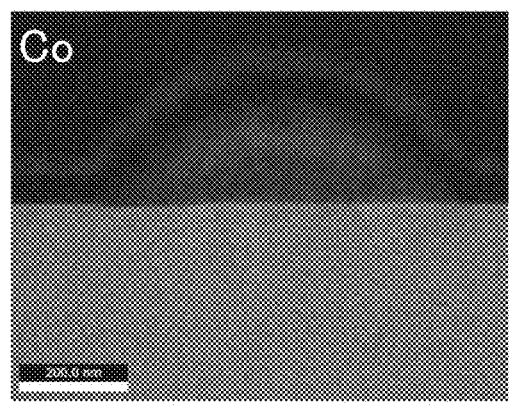

The mapping image of nickel in FIG. 40E showed that a high nickel concentration region partly existed in the surface portion and the inner portion. Excess magnesium, titanium, and nickel in the positive electrode active material were probably aggregated in the high impurity metal concentration region. In particular, it was suggested that the high nickel concentration region partly existing in the inner portion 101b was a trace of nickel drawn from the inner portion 101b to the high impurity metal concentration region.

By contrast, the aluminum concentration in the surface portion was higher than that in the inner portion or the projection, indicating that aluminum was not aggregated in the high impurity metal concentration region but remained in the surface portion.

Figure 41A:
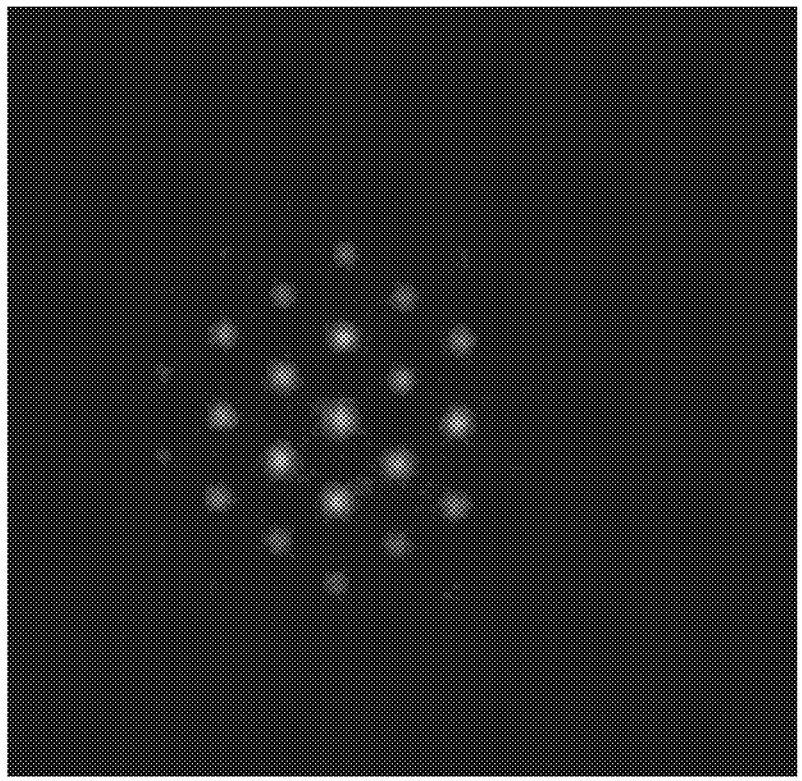
FIG. 41A is a nanobeam electron diffraction pattern of a projection of a positive electrode active material, and FIG.
Figure 41B:
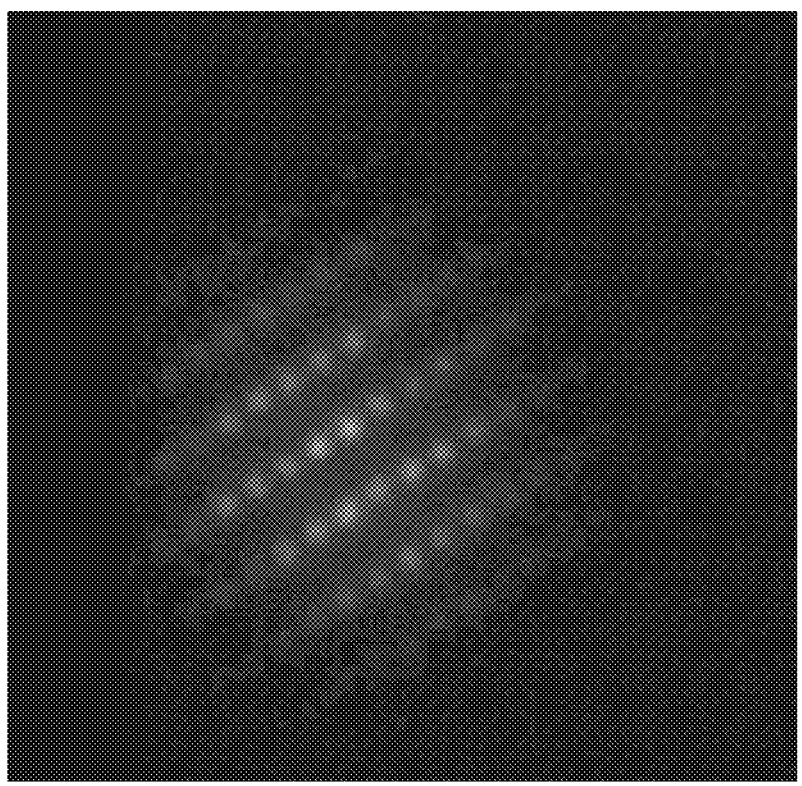

FIG. 41A shows a nanobeam electron diffraction pattern of a projection of Sample 6. This was probably [110] incidence of a cubic crystal. Thus, the projection presumably had a spinel crystal structure or a rock-salt crystal structure. FIG. 41B shows a nanobeam electron diffraction pattern of an inner portion of Sample 6. This was probably a hexagonal crystal. Thus, the inner portion presumably had a layered rock-salt crystal structure.

Note that the depressions or the projections were not observed in Samples 1, 3, and 5.

<Formation and Evaluation of Secondary Battery>

Secondary batteries were formed using the positive electrode active materials of Samples 1 to 6. First, each of the positive electrode active materials of Samples 1 to 6, AB, and PVDF were mixed at a weight ratio of 95:3:2 to form slurries, and the slurries were applied to aluminum current collectors. As a solvent of the slurries, NMP was used.

After the current collectors were coated with the slurries, the solvent was volatilized. Then, pressure was applied at 210 kN/m and then at 1467 kN/m. Through the above process, the positive electrodes were obtained. In the positive electrodes, the carried amount was approximately 7 mg/cm$^2$. The density was 3.8 g/cc or higher.

CR2032 coin-type battery cells (diameter: 20 mm, height: 3.2 mm) were fabricated with the use of the formed positive electrodes.

A lithium metal was used for a counter electrode.

As an electrolyte contained in the electrolyte solution, 1 mol/L lithium hexafluorophosphate (LiPF$_6$) was used. As the electrolyte solution, a solution in which 2 wt % vinylene carbonate (VC) was added to ethylene carbonate (EC) and diethyl carbonate (DEC) mixed at a volume ratio of 3:7 was used.

As a separator, 25-μm-thick polypropylene was used.

A positive electrode can and a negative electrode can that were formed of stainless steel (SUS) were used.

FIG. 42 shows the charge and discharge cycling performance of the secondary batteries of Samples 1 and 2. FIG. 43 shows the charge and discharge cycling performance of the secondary batteries of Samples 3 and 4. FIG. 44 shows the charge and discharge cycling performance of the secondary batteries of Samples 5 and 6. The measurement was performed at 45° C. The CC/CV charging (0.5 C, 4.6 V, 0.05 C cut) and the CC discharging (0.5 C, 2.5 V cut) were performed, and a 10-minute break was taken before the next charging. Note that 1 C was set to 200 mA/g in this example and the like.

Samples 3 to 6 containing magnesium and fluorine as the impurities exhibited excellent cycling performance even at a relatively high temperature of 45° C.

In each of Samples 2, 4, and 6 including the depression or the projection as the region where impurities are unevenly distributed, the discharge capacity was increased as compared with the samples not including the depression or the projection. For example, the discharge capacity of Sample 1 was 215.5 mAh/g, and the discharge capacity of Sample 2 was 221.1 mAh/g. The discharge capacity of Sample 3 was 228.9 mAh/g, and the discharge capacity of Sample 4 was 232.7 mAh/g. The discharge capacity of Sample 5 was 221.5 mAh/g, and the discharge capacity of Sample 6 was 227.2 mAh/g.

Samples 2, 4, and 6 containing titanium as the impurity each include titanium oxide on the surface of the positive electrode active material. Thus, the titanium oxide probably improves the wettability at the interface between the electrolyte solution and the positive electrode active material. This facilitates the solvation and desolvation of lithium ions, which probably reduces the resistance of the secondary batteries.

In Sample 2, the region where impurities are unevenly distributed inhibits dissolution of the transition metal from a crack, breakage of the crystal structure, cracking of the inner portion 101b, and the like; as a result, the discharge capacity probably increases. In each of Samples 4 and 6, excess impurities such as magnesium are removed from the inner portion 101b owing to the region where impurities are unevenly distributed; thus, the inner portion 101b can have appropriate impurity concentrations. This probably reduces the resistance of the formed secondary batteries, resulting in an increase in the discharge capacity.

Example 2

In this example, positive electrode active materials were formed by the methods described in Embodiment 2, their characteristics were analyzed, and their performance was evaluated.

<Formation and Analysis of Positive Electrode Active Material>

Samples formed in this example are described with reference to the formation methods in FIG. 9 and FIG. 10.

As a positive electrode active material containing cobalt as the transition metal M and not containing impurities, Sample 1 (comparative example) was prepared as in Example 1.

As in Step S11 to Step S20 and Step S25 in FIG. 9, lithium fluoride, magnesium fluoride, nickel hydroxide, and aluminum hydroxide were added to Sample 1 by a solid phase method. Lithium fluoride, magnesium fluoride, nickel hydroxide, and aluminum hydroxide were added such that the number of molecules of lithium fluoride was 0.33, the number of molecules of magnesium fluoride was 1, the number of nickel atoms was 0.5, and the number of aluminum atoms was 0.5 with the number of cobalt atoms regarded as 100. Then, the heating was performed as in Step S34. The heating was performed at 850° C. for 60 hours. The positive electrode active material containing cobalt and nickel as the transition metals M and magnesium, fluorine, and aluminum as the impurities was Sample 11.

Figure 10:
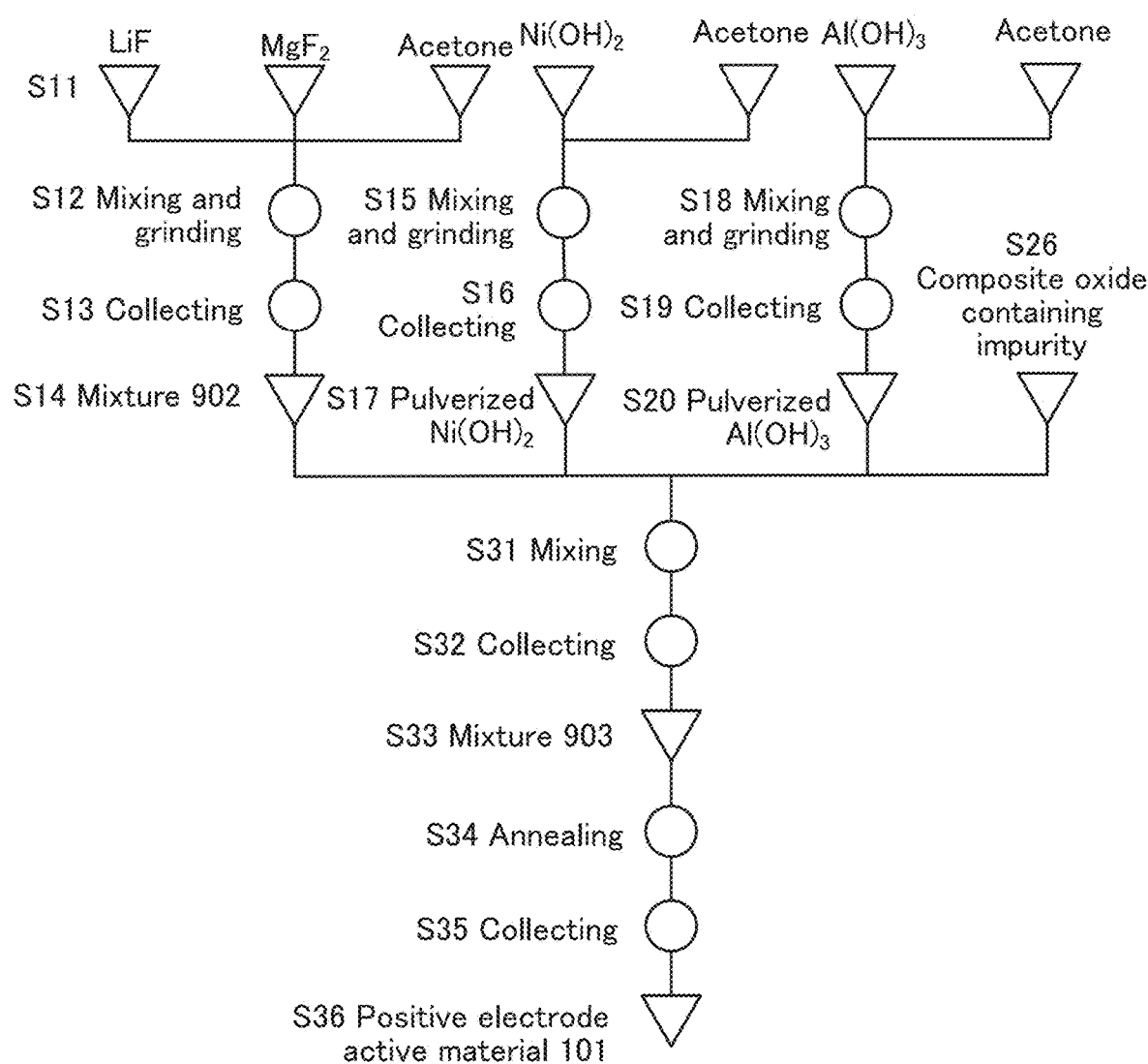
FIG. 10 shows a method for forming a positive electrode active material.

As in Step S11 to Step S14 and Step S26 in FIG. 10, lithium fluoride was added to a composite oxide containing impurities by a solid phase method. As the composite oxide containing impurities, a composite oxide containing titanium, aluminum, and magnesium as the impurities was used. Lithium fluoride was added such that the number of molecules of lithium fluoride was 0.17 with the number of cobalt atoms in the composite oxide containing impurities regarded as 100. Then, the heating was performed as in Step S34. The heating was performed at 850° C. for 20 hours. The positive electrode active material containing cobalt as the transition metal M and magnesium, fluorine, aluminum, and titanium as the impurities was Sample 12.

Sample 13 was formed in the same manner as Sample 12 except that lithium fluoride was added such that the number of molecules of lithium fluoride was 1.17 with the number of cobalt atoms in the composite oxide containing impurities regarded as 100.

Sample 14 was formed in the same manner as Sample 12 except that lithium fluoride was added such that the number of molecules of lithium fluoride was 2.33 with the number of cobalt atoms in the composite oxide containing impurities regarded as 100.

As in Step S11 to Step S14 and Step S26 in FIG. 10, lithium fluoride and magnesium fluoride were added to the composite oxide containing impurities by a solid phase method. As the composite oxide containing impurities, a composite oxide containing titanium, aluminum, and magnesium as the impurities was used. Lithium fluoride and magnesium fluoride were added such that the number of molecules of lithium fluoride was 0.17 and the number of molecules of magnesium fluoride was 0.5 with the number of cobalt atoms in the composite oxide containing impurities regarded as 100. Then, the heating was performed as in Step S34. The heating was performed at 900° C. for 10 hours in an oxygen atmosphere (flow rate: 10 L/min). The positive electrode active material containing cobalt as the transition metal M and magnesium, fluorine, aluminum, and titanium as the impurities was Sample 15.

As in Step S11 to Step S20 and Step S26 in FIG. 10, lithium fluoride, magnesium fluoride, nickel hydroxide, and aluminum hydroxide were added to the composite oxide containing impurities by a solid phase method. As the composite oxide containing impurities, a composite oxide containing titanium, aluminum, and magnesium as the impurities was used. Lithium fluoride, magnesium fluoride, nickel hydroxide, and aluminum hydroxide were added such that the number of molecules of lithium fluoride was 0.33, the number of molecules of magnesium fluoride was 1, the number of nickel atoms was 0.5, and the number of aluminum atoms was 0.5 with the number of cobalt atoms in the composite oxide containing impurities regarded as 100. Then, the heating was performed as in Step S34. The heating was performed at 900° C. for 10 hours. The positive electrode active material containing cobalt and nickel as the transition metals M and magnesium, fluorine, aluminum, and titanium as the impurities was Sample 16.

Sample 17 was formed in the same manner as Sample 13 except that the heating time was 2 hours.

Sample 18 was formed in the same manner as Sample 13 except that the heating time was 60 hours.

Sample 19 was formed in the same manner as Sample 13 except that nickel hydroxide and aluminum hydroxide, in addition to lithium fluoride, were added to the composite oxide containing impurities. Note that nickel hydroxide and aluminum hydroxide were added such that the number of nickel atoms and the number of aluminum atoms were each 0.5 with the number of cobalt atoms in the composite oxide containing impurities regarded as 100.

Table 2 shows the formation conditions of Sample 1 and Samples 11 to 19.

TABLE 2

| Sample | Element in composite oxide | Addition | Annealing |
|---|---|---|---|
| Sample 1 (Comparative example) | Li, Co, O | No | No |
| Sample 11 | Li, Co, O | LiF 0.33<br>MgF$_2$ 1<br>Al(OH)$_3$ 0.5<br>Ni(OH)$_2$ 0.5 | 850° C., 60 h |
| Sample 12 | Li, Co, Ti, Al, Mg, O | LiF 0.17 | 850° C., 20 h |
| Sample 13 | Li, Co, Ti, Al, Mg, O | LiF 1.17 | 850° C., 20 h |
| Sample 14 | Li, Co, Ti, Al, Mg, O | LiF 2.33 | 850° C., 20 h |
| Sample 15 | Li, Co, Ti, Al, Mg, O | LiF 0.17<br>MgF$_2$ 0.5 | 900° C., 10 h |
| Sample 16 | Li, Co, Ti, Al, Mg, O | LiF 0.33<br>MgF$_2$ 1<br>Al(OH)$_3$ 0.5<br>Ni(OH)$_2$ 0.5 | 900° C., 10 h |
| Sample 17 | Li, Co, Ti, Al, Mg, O | LiF 1.17 | 850° C., 2 h |
| Sample 18 | Li, Co, Ti, Al, Mg, O | LiF 1.17 | 850° C., 60 h |
| Sample 19 | Li, Co, Ti, Al, Mg, O | LiF 1.17<br>Al(OH)$_3$ 0.5<br>Ni(OH)$_2$ 0.5 | 850° C., 20 h |

FIG. 45 is a surface SEM image of Sample 13, in which a crack is not observed; thus, Sample 13 is found to have a smooth surface with little unevenness.

FIG. 46A is a surface SEM image of another part of Sample 13. FIGS. 46B to 46G are EDX mapping images of the same region as that in FIG. 46A. FIG. 46B, FIG. 46C, FIG. 46D, FIG. 46E, FIG. 46F, and FIG. 46G are the mapping images of cobalt, titanium, oxygen, magnesium, carbon, and aluminum, respectively.

FIGS. 46B to 46G revealed that Sample 13 was a positive electrode active material including a region where titanium is unevenly distributed, a region where magnesium is unevenly distributed, and a region where aluminum is unevenly distributed. The region where titanium is unevenly distributed and the region where magnesium is unevenly distributed partly overlapped with each other.

FIG. 47A is a surface SEM image of Sample 19, in which a crack is not observed; thus, Sample 19 is found to have a smooth surface with little unevenness.

FIGS. 47B to 47H are SEM-EDX mapping images of the same region as that in FIG. 47A. FIG. 47B, FIG. 47C, FIG. 47D, FIG. 47E, FIG. 47F, FIG. 47G, and FIG. 47H are the mapping images of nickel, cobalt, titanium, oxygen, magnesium, carbon, and aluminum, respectively. In FIG. 47B, nickel was at a background level. Note that carbon was contained in a conductive tape for fixing the sample and thus might be detected. Although not shown, fluorine was also at a background level.

As shown in FIGS. 47B to 47H, cobalt and oxygen were detected from almost the entire region, whereas titanium, magnesium, and aluminum were unevenly distributed. Titanium and magnesium existed in the same region, whereas aluminum was observed in another region. The above results demonstrate that Sample 19 is also a positive electrode active material including the region where titanium is unevenly distributed, the region where magnesium is unevenly distributed, and the region where aluminum is unevenly distributed.

Although nickel hydroxide was added to Sample 19 as in Step S13 to Step S17, the nickel concentration was at a background level in the SEM-EDX. It is probable that nickel forms a solid solution in the inner portion 101b of the positive electrode active material 101 more easily than the other impurity elements.

<Formation of Secondary Battery>

Secondary batteries were formed using the positive electrode active materials of Sample 1 and Samples 11 to 18 formed above, in a manner similar to that in Example 1. Note that pressurization was not performed in the formation process of the positive electrodes. In the positive electrodes, the carried amount was more than or equal to 20 mg/cm$^2$ and less than or equal to 21 mg/cm$^2$.

<Crystal Structure after Charging>

The crystal structures in the secondary batteries of Samples 11, 13, and 15 after charging were analyzed by XRD. First, charging and discharging were performed once to check the capacity. The CC/CV charging (0.2 C, 4.5 V, 0.05 C cut) and the CC discharging (0.2 C, 3.0 V cut) were performed. Next, charging was performed at 4.50 V, 4.55 V, or 4.6 V to analyze the structures after charging. The CC/CV charging (0.2 C, each voltage, 0.02 C cut) was performed. Note that 1 C was 191 mA/g in the measurement of the crystal structures after charging in this example and the like. The charging and discharging and the XRD measurement were performed at 25° C.

Table 3 shows the charge capacity for the analysis of the structures after charging.

TABLE 3

| Sample | Charge voltage | Charge capacity (mAh/g) |
|---|---|---|
| Sample 11 | 4.50 V | 190.2 |
| Sample 11 | 4.55 V | 205.6 |
| Sample 11 | 4.60 V | 218.0 |
| Sample 13 | 4.60 V | 224.4 |
| Sample 15 | 4.60 V | 223.1 |

Then, the secondary battery in the charged state was disassembled in a glove box with an argon atmosphere to take out the positive electrode, and the positive electrode was washed with dimethyl carbonate (DMC) to remove the electrolyte solution. Then, analysis was performed by powder XRD with the CuKα1 ray. As the XRD apparatus, D8 Advance (manufactured by Bruker AXS.) was used. The XRD apparatus was set for a powder sample, and the height of the sample was set in accordance with the measurement surface required by the apparatus. The samples were set to be flat without any curve.

FIG. 48 shows powder XRD patterns of Samples 11, 13, and 15 after charging. FIG. 49A shows the patterns enlarged at around 2θ=20°, FIG. 49B shows the patterns enlarged at around 2θ=38°, FIG. 50A shows the patterns enlarged at around 2θ=45°, and FIG. 50B shows the patterns enlarged at around 2θ=61°. For comparison, the XRD patterns of a pseudo-spinel crystal structure, an H1-3 type structure, and CoO$_2$ are also shown.

Samples 11 and 13 charged at 4.6 V were found to have the pseudo-spinel crystal structure. In addition, they had sharp peaks and thus probably had high crystallinity.

The lattice constants of Sample 11 charged at 4.6 V, which were calculated from the XRD patterns, were 2.818 Å for the a-axis and 13.79 Å for the c-axis. The lattice constants of Sample 13 were 2.816 Å for the a-axis and 13.74 Å for the b-axis. Note that 1 Å is 10$^{-10}$ m.

Sample 15 charged at 4.6 V had a crystal structure different from the pseudo-spinel crystal structure and the H1-3 type structure. Sample 15 had main peaks at around 2θ of 19.27°, 37.37°, 45.11°, 66.37°, and 69.64°.

<Cycling Performance>

FIG. 51A is a graph showing the cycling performance of Sample 1 and Samples 11 to 14. FIG. 51B is a graph showing the cycling performance of Samples 1, 11, 15, and 16. FIG. 52 is a graph showing the cycling performance of Samples 1, 11, 13, 17, and 18. FIGS. 53A and 53B are graphs showing the cycling performance of Samples 1, 13, and 19.

The measurement was performed at 45° C. The CC/CV charging (0.5 C, 4.6 V, 0.05 C cut) and the CC discharging (0.5 C, 2.5 V cut) were performed. Note that 1 C was set to 200 mA/g in the measurement of the cycling performance in this example and the like.

FIG. 51A revealed that the cycling performance of Samples 11 to 14 containing impurities such as titanium, magnesium, and fluorine was much better than that of Sample 1 not containing impurities. Note that the cycling performance of Sample 14 was evaluated only up to 28 cycles because of defects due to the formation process of the secondary battery; however, Sample 14 exhibited excellent performance before the occurrence of the defects.

Samples 12 to 14 in which the number of molecules of lithium fluoride varied from 0.17 to 2.33 with the number of cobalt atoms regarded as 100 exhibited excellent cycling performance. Sample 13 in which the number of molecules of lithium fluoride was 1.17 had the best performance among them.

FIG. 51B revealed that the cycling performance of Samples 15 and 16 containing impurities such as magnesium and fluorine was better than that of Sample 1 not containing impurities.

FIG. 52 revealed that the cycling performance of Samples 11, 13, 17, and 18 containing impurities such as titanium, magnesium, aluminum, and fluorine was better than that of Sample 1 not containing impurities.

Samples 13, 17, and 18 in which the heating time varied from 2 hours to 60 hours exhibited excellent cycling performance. Sample 13 in which the heating time was 20 hours had the best performance among them.

FIG. 53A is a graph showing the discharge capacity, and FIG. 53B is a graph showing the discharge capacity retention rate. Samples 13 and 19 containing impurities such as titanium, magnesium, and fluorine had better cycling performance than Sample 1 not containing impurities. In particular, Sample 19 to which lithium fluoride, the nickel source, and the aluminum source were added had the best performance.

The initial discharge capacity was 215.5 mAh/g for Sample 1, whereas 226.6 mAh/g for Sample 13 and 226.5 mAh/g for Sample 19. The discharge capacity retention rate after 30 cycles was 61.3% for Sample 1, whereas 91.3% for Sample 13 and 93.9% for Sample 19.

This application is based on Japanese Patent Application Serial No. 2019-215105 filed with Japan Patent Office on Nov. 28, 2019, and Japanese Patent Application Serial No. 2019-222975 filed with Japan Patent Office on Dec. 10, 2019, the entire contents of which are hereby incorporated by reference.

What is claimed is:

1. A positive electrode active material comprising a particle comprising oxygen, cobalt, lithium, magnesium, titanium, nickel, aluminum, and fluorine,
wherein the particle comprises a superficial portion, an inner portion, a depression, and a projection on the superficial portion,
wherein the particle comprises a region where a titanium concentration in the depression is higher than a titanium concentration in the superficial portion,
wherein the particle comprises a region where a titanium concentration in the projection is higher than the titanium concentration in the superficial portion,
wherein the particle comprises a region where a magnesium concentration in the projection is higher than a magnesium concentration in the superficial portion,
wherein the particle comprises a region where a nickel concentration in the projection is higher than a nickel concentration in the superficial portion,
wherein the particle comprises a region where a fluorine concentration in the projection in the projection is higher than a fluorine concentration in the superficial portion, and
wherein the particle comprises a region where an aluminum concentration in the superficial portion is higher than an aluminum concentration in the projection.

2. The positive electrode active material according to claim 1,
wherein the particle comprises a region where a magnesium concentration in the depression is higher than the magnesium concentration in the superficial portion, and
wherein the particle comprises a region where a fluorine concentration in the depression is higher than the fluorine concentration in the superficial portion.

3. The positive electrode active material according to claim 1,
wherein the depression comprises a portion,
wherein a depth of the portion is more than 100 nm, and
wherein a width of the portion is more than 20 nm.

4. The positive electrode active material according to claim 1,
wherein the projection comprises a portion, and
wherein a height of the projection is greater than 50 nm.

5. The positive electrode active material according to claim 1, wherein the particle comprises a region where a cobalt concentration in the projection is lower than a cobalt concentration in the inner portion.

6. A secondary battery comprising the positive electrode active material according to claim 1.

7. An electronic device comprising the secondary battery according to claim 6.

8. A positive electrode active material comprising a particle comprising oxygen, cobalt, lithium, magnesium, titanium, nickel, aluminum, and fluorine,
wherein the particle comprises a superficial portion, an inner portion, a depression, and a projection on the superficial portion,
wherein the particle comprises a region where a titanium concentration in the depression is higher than a titanium concentration in the inner portion,
wherein the particle comprises a region where a titanium concentration in the projection is higher than the titanium concentration in the inner portion,
wherein the particle comprises a region where a magnesium concentration in the projection is higher than a magnesium concentration in the inner portion,
wherein the particle comprises a region where a nickel concentration in the projection is higher than a nickel concentration in the inner portion,
wherein the particle comprises a region where a fluorine concentration in the projection is higher than a fluorine concentration in the inner portion, and
wherein the particle comprises a region where an aluminum concentration in the superficial portion is higher than an aluminum concentration in the projection.

9. The positive electrode active material according to claim 8,
wherein the depression comprises a portion,
wherein a depth of the portion is greater than 100 nm, and
wherein a width of the portion is greater than 20 nm.

10. The positive electrode active material according to claim 8,
wherein the projection comprises a portion, and
wherein a height of the projection is greater than 50 nm.

11. The positive electrode active material according to claim 8, wherein the particle comprises a region where a cobalt concentration in the projection is lower than a cobalt concentration in the inner portion.

12. A secondary battery comprising the positive electrode active material according to claim 8.

13. An electronic device comprising the secondary battery according to claim 12.

* * * * *